(12) United States Patent
Nakamura

(10) Patent No.: US 11,579,832 B2
(45) Date of Patent: Feb. 14, 2023

(54) SCREEN SHARING SYSTEM, SCREEN SHARING METHOD, AND DISPLAY APPARATUS

(71) Applicant: Daiki Nakamura, Kanagawa (JP)

(72) Inventor: Daiki Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/669,357

(22) Filed: Feb. 11, 2022

(65) Prior Publication Data
US 2022/0300239 A1 Sep. 22, 2022

(30) Foreign Application Priority Data

Mar. 16, 2021 (JP) .............................. JP2021-042006
Nov. 9, 2021 (JP) .............................. JP2021-182282

(51) Int. Cl.
| | | |
|---|---|---|
| *G06F 3/14* | (2006.01) | |
| *G06F 3/04847* | (2022.01) | |
| *G06F 3/04883* | (2022.01) | |
| *H04N 7/15* | (2006.01) | |
| *G06F 3/0488* | (2022.01) | |

(52) U.S. Cl.
CPC ........ *G06F 3/1454* (2013.01); *G06F 3/04847* (2013.01); *G06F 3/04883* (2013.01); *G06F 3/0488* (2013.01); *G06F 3/14* (2013.01); *H04N 7/15* (2013.01); *H04N 7/152* (2013.01); *H04N 7/155* (2013.01)

(58) Field of Classification Search
CPC ...... G06F 3/14; G06F 3/1454; G06F 3/04847; G06F 3/0488; G06F 3/04883; H04N 7/15; H04N 7/152; H04N 7/155

USPC .......................................................... 345/1.1
See application file for complete search history.

(56) References Cited

U.S. PATENT DOCUMENTS

| | | | | |
|---|---|---|---|---|
| 10,165,022 B1 * | 12/2018 | Hubbard | ............... | G06F 3/1454 |
| 2011/0197263 A1 * | 8/2011 | Stinson, III | ............. | G06F 3/017 715/753 |
| 2012/0297328 A1 * | 11/2012 | Tanaka | .................. | G06F 3/0486 715/769 |
| 2014/0018053 A1 * | 1/2014 | Cho | ...................... | H04M 1/724 455/418 |
| 2020/0128210 A1 * | 4/2020 | Hatada | ................... | H04N 7/147 |

(Continued)

FOREIGN PATENT DOCUMENTS

| | | |
|---|---|---|
| JP | 2009-093274 | 4/2009 |
| JP | 2016-170675 | 9/2016 |

(Continued)

*Primary Examiner* — Tom V Sheng
(74) *Attorney, Agent, or Firm* — Xsensus LLP

(57) ABSTRACT

A screen sharing system includes a first display apparatus including first circuitry; and a second display apparatus including second circuitry. Both of the first display apparatus and the second display apparatus display an input screen. The first circuitry of the first display apparatus is configured to receive first hand drafted input data that is input to the first display apparatus, and set an edit authority, of a user of the second display apparatus, for the first hand drafted input data. The second circuitry of the second display apparatus is configured to restrict editing of the firsthand drafted input data based on the edit authority of the user set by the first display apparatus.

20 Claims, 47 Drawing Sheets

(56) References Cited

U.S. PATENT DOCUMENTS

| | | | |
|---|---|---|---|
| 2020/0176141 A1* | 6/2020 | Kang | H04N 21/436 |
| 2020/0296146 A1* | 9/2020 | Hinohara | G06F 3/0425 |
| 2021/0133055 A1 | 5/2021 | Nakamura et al. | |
| 2021/0191684 A1* | 6/2021 | Zhang | H04L 65/4015 |
| 2022/0059053 A1* | 2/2022 | Ding | G09G 5/395 |

FOREIGN PATENT DOCUMENTS

| | | |
|---|---|---|
| JP | 2017-138770 | 8/2017 |
| JP | 2019-135567 | 8/2019 |
| JP | 2020-156085 | 9/2020 |

* cited by examiner

FIG. 9

USER INFORMATION MANAGEMENT TABLE

| USER ID | USER NAME | PASSWORD | E-MAIL ADDRESS |
|---------|-----------|----------|----------------|
| A001    | userA     | a0101    | userA@xxx.com  |
| A002    | userB     | a0202    | userB@xxx.com  |
| A003    | userC     | a0303    | userC@xxx.com  |
| A004    | userD     | a0404    | userD@xxx.com  |
| A005    | userE     | a0505    | userE@xxx.com  |
| ...     | ...       | ...      | ...            |

FIG. 10

EVENT INFORMATION MANAGEMENT TABLE

| EVENT ID | EVENT NAME | EVENT DATE/TIME | PARTICIPATING USER | FILE STORAGE LOCATION |
|----------|------------|------------------|--------------------|-----------------------|
| G001 | Theme A, Regular meeting | 2021/01/15 13:00 | "userA", "userB", "userC" | C:¥Conf¥20210115¥conf1.pdf |
| G002 | Theme B, Meeting | 2021/01/18 13:00 | "userA", "userC" | C:¥Conf¥20210118¥conf1.pdf |
| G003 | Interview | 2021/01/18 15:00 | "userB", "userD" | C:¥Conf¥20210118¥conf2.pdf |
| G004 | ZZ Seminar | 2021/01/19 15:00 | "userA", "userB", "userC", "userD" | C:¥Conf¥20210119¥conf1.pdf |
| G005 | Negotiation with X company | 2021/01/20 10:00 | "userE", "userD" | C:¥Conf¥20210120¥conf1.pdf |
| ... | ... | ... | ... | ... |

FIG. 11

METADATA FILE 500

```
{
  "Conference" : [
    {
      "Name":"Theme A, Regular meeting 1",
      "Start" : "2021/01/15 13:00",
      "End" : "2021/01/15 15:00",
      "OperationLog" : [
          {
              "Name" : "userA",
              "ViewArea" : [
                      {"X": 10, "Y" : 310 , "Width" : 100, "Height" : 80, "Time" : 100},
                      { "X": 100, "Y" : 210 , "Width" : 100, "Height" : 80, "Time" : 10},
                      { "X": 150, "Y" : 130 , "Width" : 50, "Height" : 20, "Time" : 1000},
                      ]
          },
          {
              "Name" : "userB",
              "ViewArea" : [
                      {"X": 10, "Y" : 310 , "Width" : 100, "Height" : 80, "Time" : 100},
                      { "X": 105, "Y" : 1200 , "Width" : 100, "Height" : 80, "Time" : 20000},
                      ]
          },
          {
              "Name" : "userC",
              "ViewArea" : [
                      { "X": 120, "Y" : 104 , "Width" : 100, "Height" : 80, "Time" : 10},
                      {"X": 130, "Y" : 1300 , "Width" : 100, "Height" : 80, "Time" : 100},
                      ]
          },
      ]
    }
  ]
}
```

FIG. 12

HANDWRITING INPUT DATA FILE 550

```
{
  "BackgroundColor" : "White",
  "Objects" : [
    {
      "Type" : "Stroke",
      "Data" : {
        "Points" : [
          { "X" : 10, "Y" : 10 },
          { "X" : 20, "Y" : 20 },
          { "X" : 30, "Y" : 30 },]
        "Thin" : 5,
        "Color" : "Black",}
      "User" : "userA",
      "Date": "2021/01/15 13:32",
    },
    {
      "Type" : "Stamp",
      "Data" : {
        "Points" : { "X" : 100, "Y" : 200 },
        "Size" : { "Width" : 20, "Height" : 20 },
        "Image" : "Circle.jpg",}
      "User" : "userB",,
      "Date": "2021/01/15 13:40",
    }
  ]
}
```

FIG. 13

AUTHORITY INFORMATION MANAGEMENT TABLE

EVENT ID; G001

| USER ID | USER NAME | EDIT AUTHORITY | VIEWING AUTHORITY |
|---|---|---|---|
| A001 | userA | null | A002(userB) |
| A002 | userB | A003(userC) | A003(userC) |
| A003 | userC | null | null |

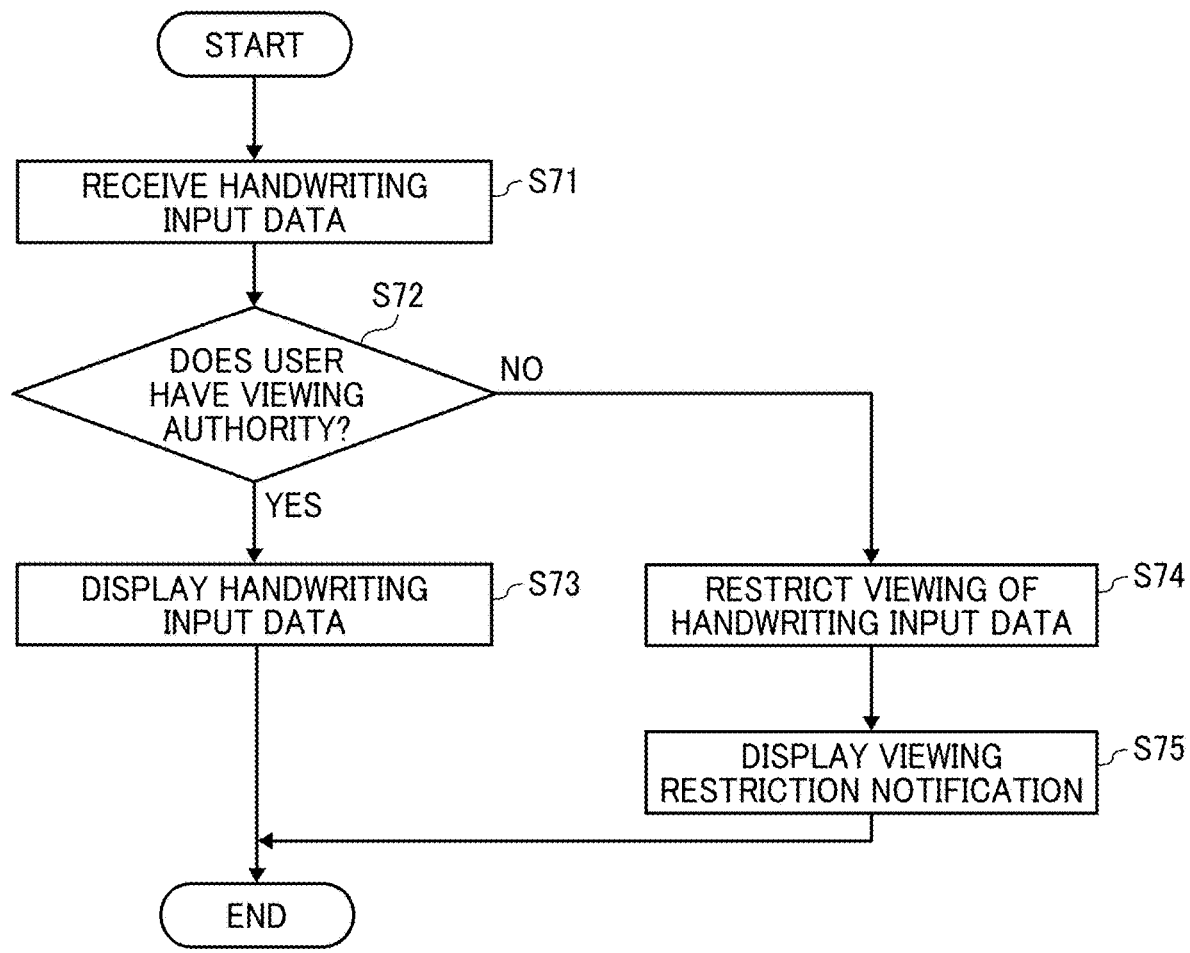

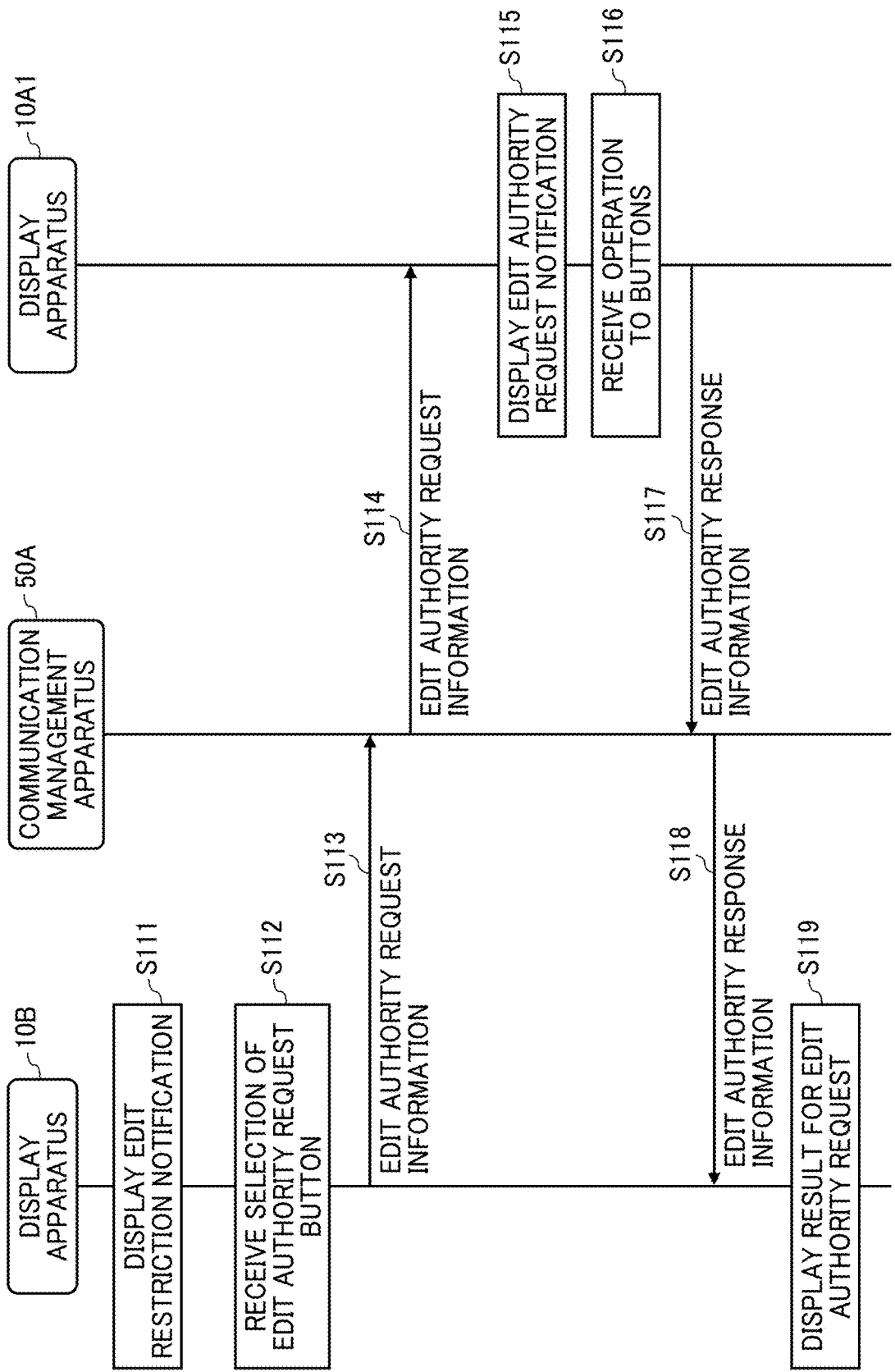

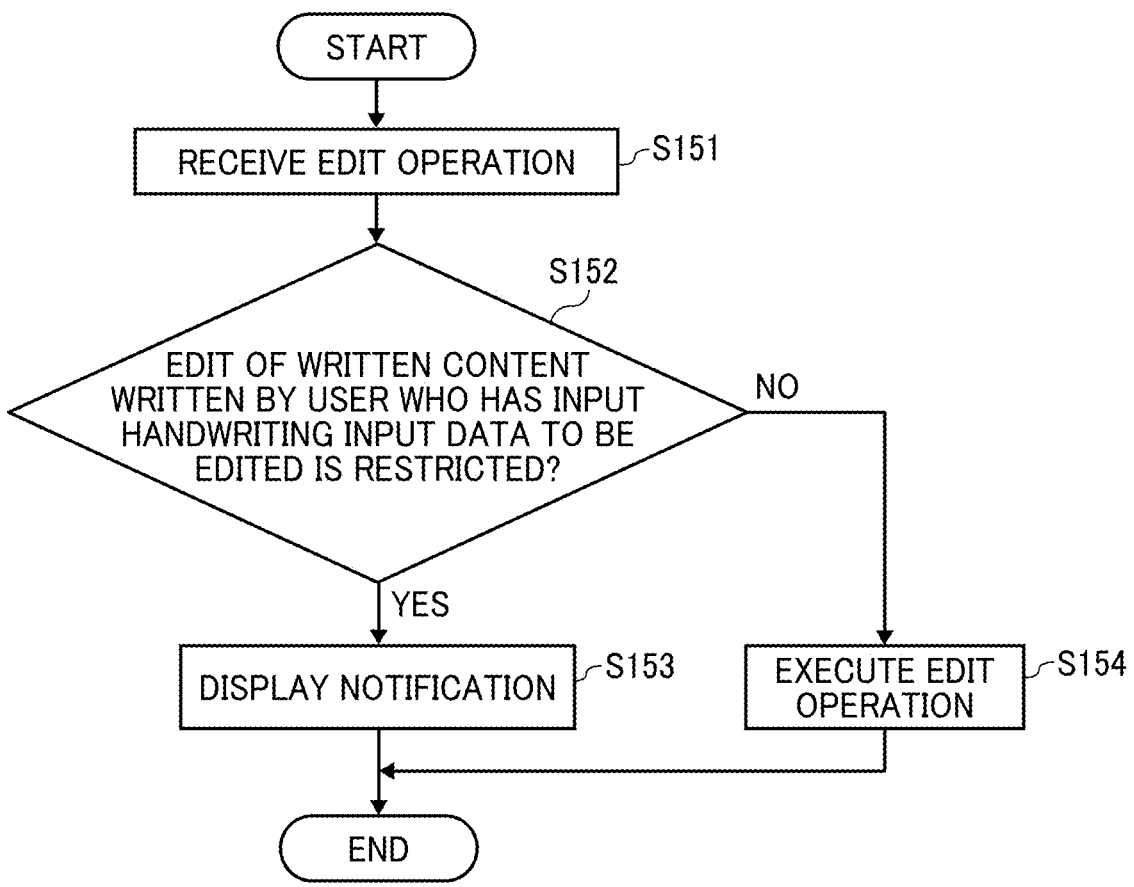

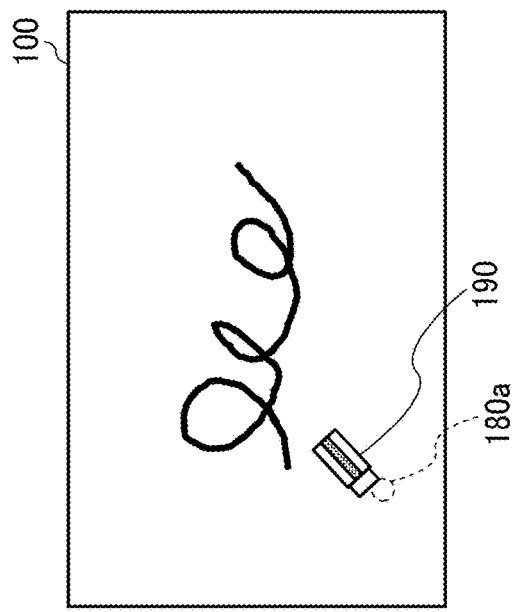
FIG. 40A
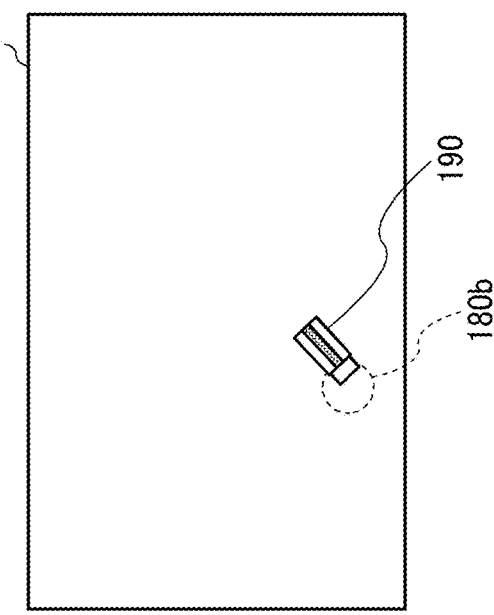
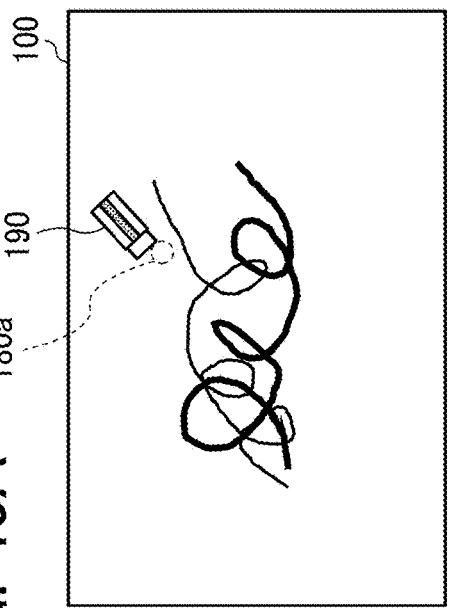
ERASE WHEN WRITING PRESSURE IS WEAK
FIG. 40B
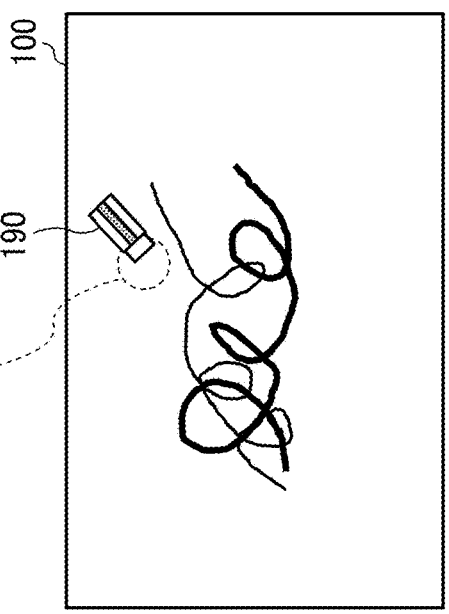
ERASE WHEN WRITING PRESSURE IS STRONG

FIG. 48

METADATA FILE                                                          500a

```
{
  "Conference" : [
    {
      "Name" : "Theme A, Regular meeting 1",
      "Start" : "2021/01/15 13:00",
      "End" : "2021/01/15 15:00",
      "OperationLog" : [
            {
                "Name" : "userA",
                "ViewArea" : [
                        { "Page" : 1, "X": 50, "Y" : 105, "Width" : 60, "Height" : 80, "Time" : 100},
                        { "Page" : 3, "X": 100, "Y" : 210, "Width" : 100, "Height" : 80, "Time" : 40},
                        { "Page" : 6, "X": 50, "Y" : 105, "Width" : 50, "Height" : 20, "Time" : 800},
                            ]
            },
            {
                "Name" : "userB",
                "ViewArea" : [
                        { "Page" : 3, "X": 10, "Y" : 80 , "Width" : 100, "Height" : 80, "Time" : 100},
                        { "Page" : 7, "X": 105, "Y" : 100 , "Width" : 100, "Height" : 80, "Time" : 20000},
                            ]
            },
            {
                "Name" : "userC",
                "ViewArea" : [
                        {"Page" : 8, "X": 84, "Y" : 78, "Width" : 100, "Height" : 80, "Time" : 10},
                            ]
            },
      ]
    }
  ]
}
```

HANDWRITING INPUT DATA FILE

```
{
  "BackgroundColor" : "White",
  "Objects" : [
      {
            "Type" : "Stroke",
            "Data" : {
                  "Points" : [
                        { "Page" : 1, " X" : 10, "Y" : 10 },
                        { "Page" : 1, " "X" : 20, "Y" : 20 },
                        { "Page" : 1, "X" : 30, "Y" : 30 },]
                  "Thin" : 5,
                  "Color" : "Black",}
            "User" : "userA",
            "Date": "2021/01/15 13:32",
      },
      {
            "Type" : "Stamp",
            "Data" : {
                  "Points" : { "Page" : 3,"X" : 100, "Y" : 200 },
                  "Size" : { "Width" : 20, "Height" : 20 },
                  "Image" : "Circle.jpg",}
            "User" : "userB",,
            "Date": "2021/01/15 13:40",
      }
  ]
}
```

FIG. 50

SCREEN INFORMATION MANAGEMENT TABLE

EVENT ID ; G002

EVENT ID ; G001

| ID | SEQUENCE NUMBER | body | parent |
|---|---|---|---|
| G001 | 1 | children : pag01, pag02, pag03 | - |
| pag01 | 2 | - | G001 |
| sr001 | 3 | Color (RGBA) : (0,0,0,0)<br>Width (px) : 10px<br>Vertex (x,y) : (0,0), (10,0), (20,1), (30,10)<br>User : userA | pag01 |
| sr002 | 4 | Color (RGBA) : (128,0,0,0)<br>Width (px) : 14px<br>Vertex (x,y) : (10,50), (15,55), (16,40)<br>User : userB | pag01 |
| ... | ... | ... | ... |
| pag02 | 12 | - | G001 |
| sr010 | 13 | Color (RGBA) : (255,255,255,0)<br>Width (px) : 10px<br>Vertex (x,y) : (100,20), (110,30), (11,40)<br>User : userA | pag02 |
| ... | ... | ... | ... |
| pag03 | 27 | - | G001 |
| sr024 | 28 | Color (RGBA) : (255,255,128,0)<br>Width (px) : 13px<br>Vertex (x,y) : (57,60), (123,43)<br>User : userC | pag03 |
| ... | ... | ... | ... |

SCREEN SHARING SYSTEM, SCREEN SHARING METHOD, AND DISPLAY APPARATUS

CROSS-REFERENCE TO RELATED APPLICATIONS

This patent application is based on and claims priority pursuant to 35 U.S.C. § 119(a) to Japanese Patent Application Nos. 2021-042006, filed on Mar. 16, 2021, and 2021-182282, filed on Nov. 9, 2021, in the Japan Patent Office, the entire disclosures of which are hereby incorporated by reference herein.

BACKGROUND

Technical Field

Embodiments of the present disclosure relate to a screen sharing system, a screen sharing method, and a display apparatus.

Related Art

Display apparatuses that allow multiple users to input handwriting are used in meetings and the like in companies, educational institutions, and administrative institutions, for example. Further, technologies are known that enable multiple users to participate in a teleconference from different locations and to input handwriting to the same screen from their own locations respectively, while sharing display screens, each being displayed at each of the different locations.

Furthermore, technologies are known that restrict editing of handwriting input contents shared by multiple users to prevent unintended editing operations. For example, there is disclosed a method according to which, in a system in which data having multiple objects are shared among multiple apparatuses provided respectively in different locations, a particular terminal apparatus that has selected an object most recently acquires authority for editing the object. Further, there is disclosed a method of prohibiting an operation from another electronic whiteboard on a stroke image designated by a group operation request for the purpose of preventing an operation different from an intention of a user from being performed.

SUMMARY

An embodiment of the present disclosure includes a screen sharing system. The screen sharing system includes a first display apparatus including first circuitry, and a second display apparatus including second circuitry. Both of the first display apparatus and the second display apparatus display an input screen. The first circuitry of the first display apparatus is configured to receive first hand drafted input data that is input to the first display apparatus, and set an edit authority, of a user of the second display apparatus, for the first hand drafted input data. The second circuitry of the second display apparatus is configured to restrict editing of the first hand drafted input data based on the edit authority of the user set by the first display apparatus.

Another embodiment of the present disclosure includes a screen sharing method performed by a screen sharing system including a first display apparatus and a second display apparatus. Both of the first display apparatus and the second display apparatus display an input screen. The screen sharing method includes receiving, by the first display apparatus, first hand drafted input data that is input to the first display apparatus. The screen sharing method includes setting, by the first display apparatus, an edit authority of a user of the second display apparatus for first hand drafted input data. The screen sharing method includes restricting, by the second display apparatus, editing of the first hand drafted input data based on the edit authority of the user set by the First display apparatus.

Another embodiment of the present disclosure includes a display apparatus. The display apparatus includes a display that displays an input screen which is displayed by another display apparatus. The display apparatus includes circuitry. The circuitry is configured to receive authority information from the another display apparatus, the authority information indicating an edit authority of a user of the display apparatus for editing hand drafted input data input to the another display apparatus. The circuitry is configured to restrict editing of the hand drafted input data by the user based on the received authority information.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a conceptual diagram illustrating an example of a user information management table, according to an embodiment of the present disclosure:

FIG. 10 is a conceptual diagram illustrating an example of an event information management table, according to an embodiment of the present disclosure;

FIG. 11 is a view of an example of a metadata file, according to an embodiment of the present disclosure;

FIG. 12 is a view of an example of a handwriting input data file, according to an embodiment of the present disclosure;

FIG. 13 is a conceptual diagram illustrating an example of an authority information management table, according to an embodiment of the present disclosure;

FIG. 20 is a flowchart illustrating an example of an operation of display handwriting input data that is input by another user, according to an embodiment of the present disclosure;

FIG. 30 is a sequence diagram illustrating an example of an operation of requesting edit authority to another user, according to an embodiment of the present disclosure;

FIG. 33 is a flowchart illustrating an example of an operation of restricting edit of handwriting input data that is input by another user, according to an embodiment of the present disclosure;

FIG. 40A and FIG. 40B are illustrations for describing an example of switching of an edit operation based on writing pressure, according to an embodiment of the present disclosure;

FIG. 48 is a view of an example of a metadata file, according to a variation of the embodiments of the present disclosure:

FIG. 50 is a conceptual diagram illustrating an example of a screen information management table, according to a variation of the embodiments of the present disclosure.

Figure 1:
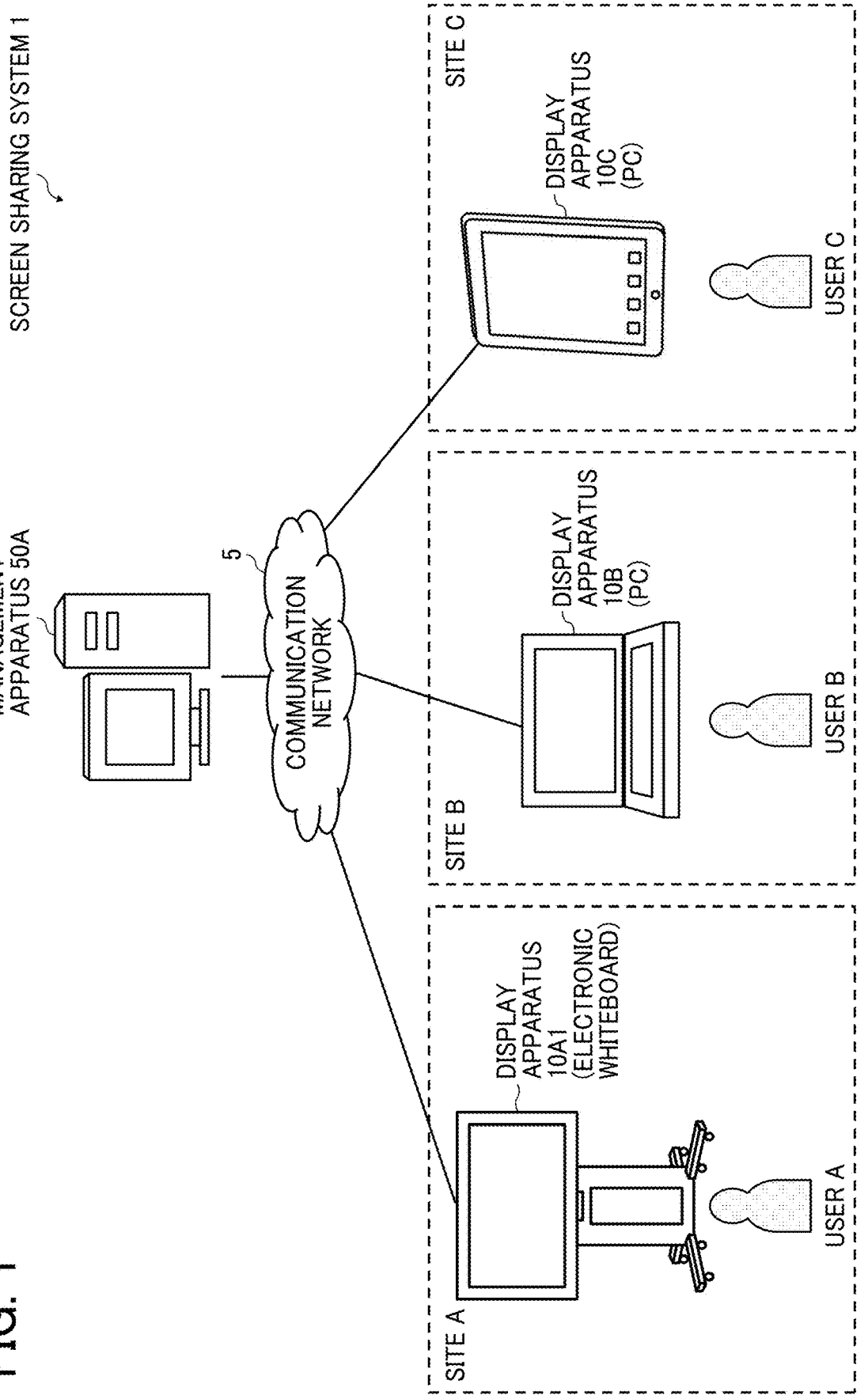
FIG. 1 is a diagram illustrating an example of an overall configuration of a screen sharing system, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described with reference to the drawings. In the description of the drawings, the same elements are denoted by the same reference numerals, and redundant descriptions thereof are omitted.

First Embodiment

System Configuration:

First, referring to FIG. 1, an overview of a screen sharing system 1 is described according to the first embodiment. FIG. 1 is a diagram illustrating an example of an overall configuration of the screen sharing system 1. The screen sharing system 1 illustrated in FIG. 1 is a system that allows a plurality of display apparatuses 10 to share data that can be displayed on the display apparatuses.

As illustrated in FIG. 1, the screen sharing system 1 includes a display apparatus 10A1, a display apparatus 10B, and a display apparatus 10C, which are respectively provided at different sites, e.g., a site A, a site B, and a site C, and a communication management apparatus 50A. The display apparatus 10A1, the display apparatus 10B, and the display apparatus 10C, and the communication management apparatus 50A included in the screen sharing system 1 are communicable with each other through a communication network 5. The communication network 5 is implemented by the Internet, a mobile communication network, a local area network (LAN), etc. The communication network 5 includes a network by not only wired communications but also a network by wireless communications such as 3rd generation (3G), 4th generation (4G), 5th generation (5G), Wireless Fidelity® (Wi-Fi), Worldwide Interoperability for Microwave Access (WiMAX) or Long Term Evolution (LTE).

Each of the display apparatus 10A1, the display apparatus 10B, and the display apparatus 10C is a computer having a user hand drafted input capability, a communication capability, and a display capability. The display apparatus 10A1 is, for example, an electronic whiteboard located at the site A. The display apparatus 10B is, for example, a mobile laptop computer used at the site B. The display apparatus 10C is, for example, a mobile tablet personal computer (PC) used at the site C. The display apparatus 10A1, the display apparatus 10B, and the display apparatus 10C perform remote communication while sharing an object input by user hand drafted input, such as handwriting and drawing. Users A, B, and C conduct an event such as a teleconference while viewing a display screen in which display contents are shared at the sites. The teleconference is merely one example of the event. Examples of the event include, but are not limited to, a distance learning, a remote medical examination, an online meeting, an online consultation, and a simple conversation over the communication network 5.

In the present disclosure, "hand drafted input" relates to a user input such as handwriting, drawing and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user. The following discussion will refer to handwriting input and handwriting input data, but other forms of hand drafted input may be utilized and are within the scope of the present disclosure.

The display apparatus 10A1, the display apparatus 10B, and the display apparatus 10C communicate screen information such as handwriting input data that is input by handwriting with one another. The handwriting input data is data used for displaying (reproducing) a display screen including objects handwritten by the user A, user B, and user C on the display apparatus 10A1, the display apparatus 10B, and the display apparatus 10C, respectively. The handwriting input data includes, for example, coordinate data, line width data, line color data, vector data, and data indicating writing pressure at which a stroke is drawn.

The display apparatus 10A1, the display apparatus 10B, and the display apparatus 10C exchange handwriting input data for displaying an object to be shared, to enable users using the screen sharing system 1 share the same object. The object is an image indicating a line, etc., written by the user by handwriting input with an electronic pen, for example. The object is displayed by the handwriting input data representing points that indicate coordinates on the display.

The electronic whiteboard and the PC are merely examples of the display apparatus 10. The electronic whiteboard can be any suitable apparatus installed with software that execute a handwriting input capability, a communication capability, and a display capability. Further, the PC includes, for example, a smartphone, a wearable terminal, a smartwatch, a car navigation terminal, a game console, a telepresence robot, and a medical device.

FIG. 1 illustrates an example in which the screen sharing system 1 includes the plurality of display apparatuses 10 (i.e., the display apparatus 10A1, the display apparatus 10B, and the display apparatus 10C) at three sites (i.e., the site A, the site B, and the site C). In another example, the screen sharing system 1 may include the plurality of display apparatuses 10 at one site. In another example, the screen sharing system 1 includes the plurality of display apparatus 10 at two sites, in each of which the display apparatus is located or used. In still another example, the screen sharing system 1 includes the plurality of display apparatus 10 at four or more sites, in each of which the display is located or used. In a case where the plurality of display apparatus 10 are located in one site, the number of sites can be one. In the following description, the display apparatus 10A 1, the display apparatus 10B, and the display apparatus 10C are referred to collectively as a "display apparatus 10", unless they need to be distinguished from each other.

The communication management apparatus 50A is a server computer that centrally manages login authentication from the display apparatus 10A1, the display apparatus 10B, and the display apparatus 10C, communication statuses of the display apparatus 10A1, the display apparatus 10B, and the display apparatus 10C, and screen data for sharing. Further, the communication management apparatus 50A relays the screen data to be shared among the display apparatus 10A1, the display apparatus 10B, and the display apparatus 10C.

The communication management apparatus 50A can be implemented by a single server computer or can be implemented by a plurality of server computers. The description is given of an example in which the communication management apparatus 50A is a server computer that resides in a cloud environment. In another example, the communication management apparatus 50A is a server operating on the display apparatus 10 such as an electronic whiteboard. In still another example, the communication management apparatus 50A is a server that resides in an on-premises environment.

Figure 2:
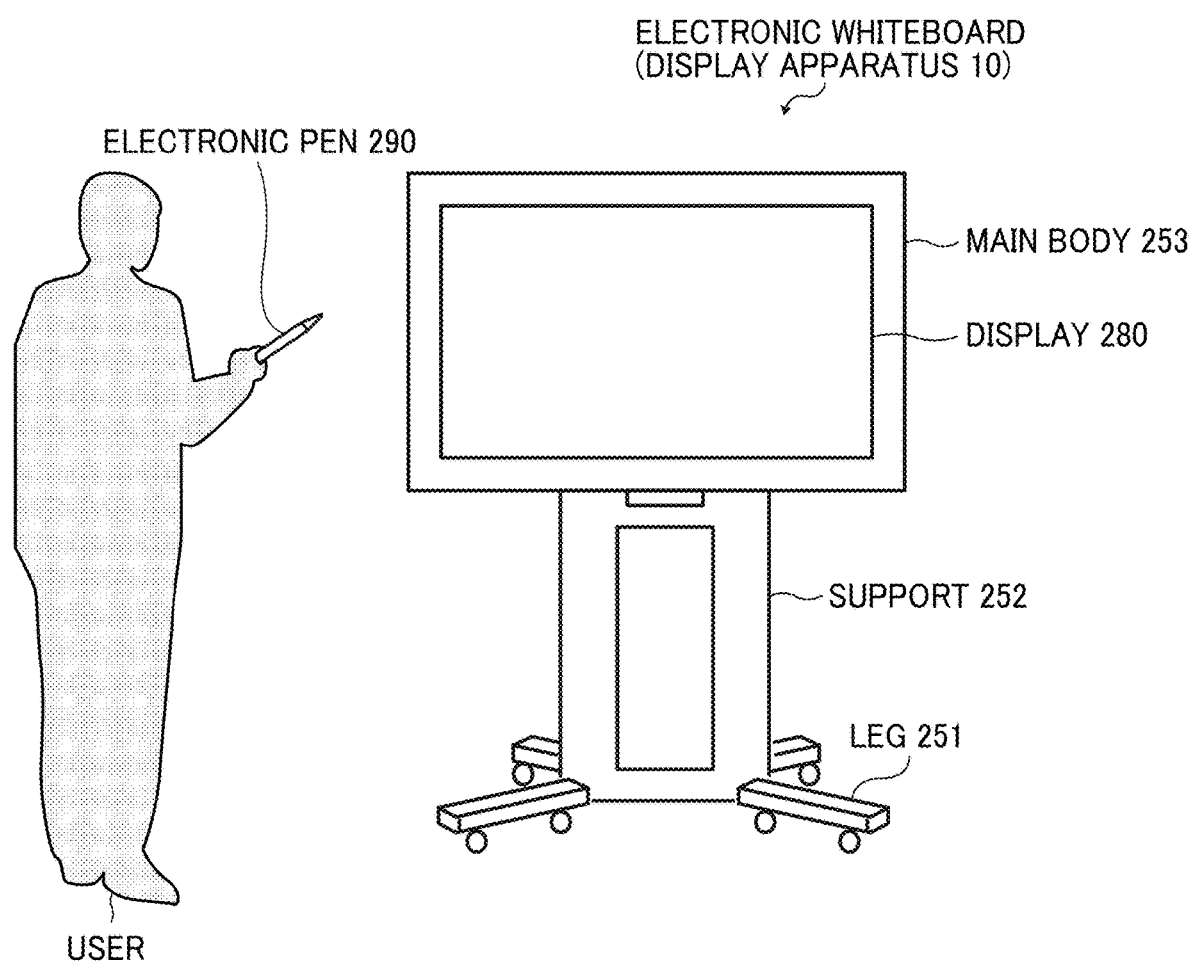
FIG. 2 is a diagram for describing an example of how an electronic whiteboard is used, according to an embodiment of the present disclosure.

Use Scenario of Electronic Whiteboard:

Referring to FIG. 2, a description is provided of how an electronic whiteboard as an example of the display apparatus 10 is used. FIG. 2 is a diagram for describing an example of how the electronic whiteboard is used. As illustrated in FIG. 2, the electronic whiteboard as an example of the display apparatus 10 includes a plurality of legs 251 each having a plurality of casters on the lower side, a support 252 provided on the upper side of the plurality of legs 251, and a main body 253 of the electronic whiteboard provided on top of the support 252, and a display 280 provided on the front surface of the main body 253. The main body 253 includes a central processing unit (CPU) 201 and the like described below. The user can input (draw) an object such as characters on the display 280 using an electronic pen 290. The display 280 is an example of a display (display device).

Figure 3:
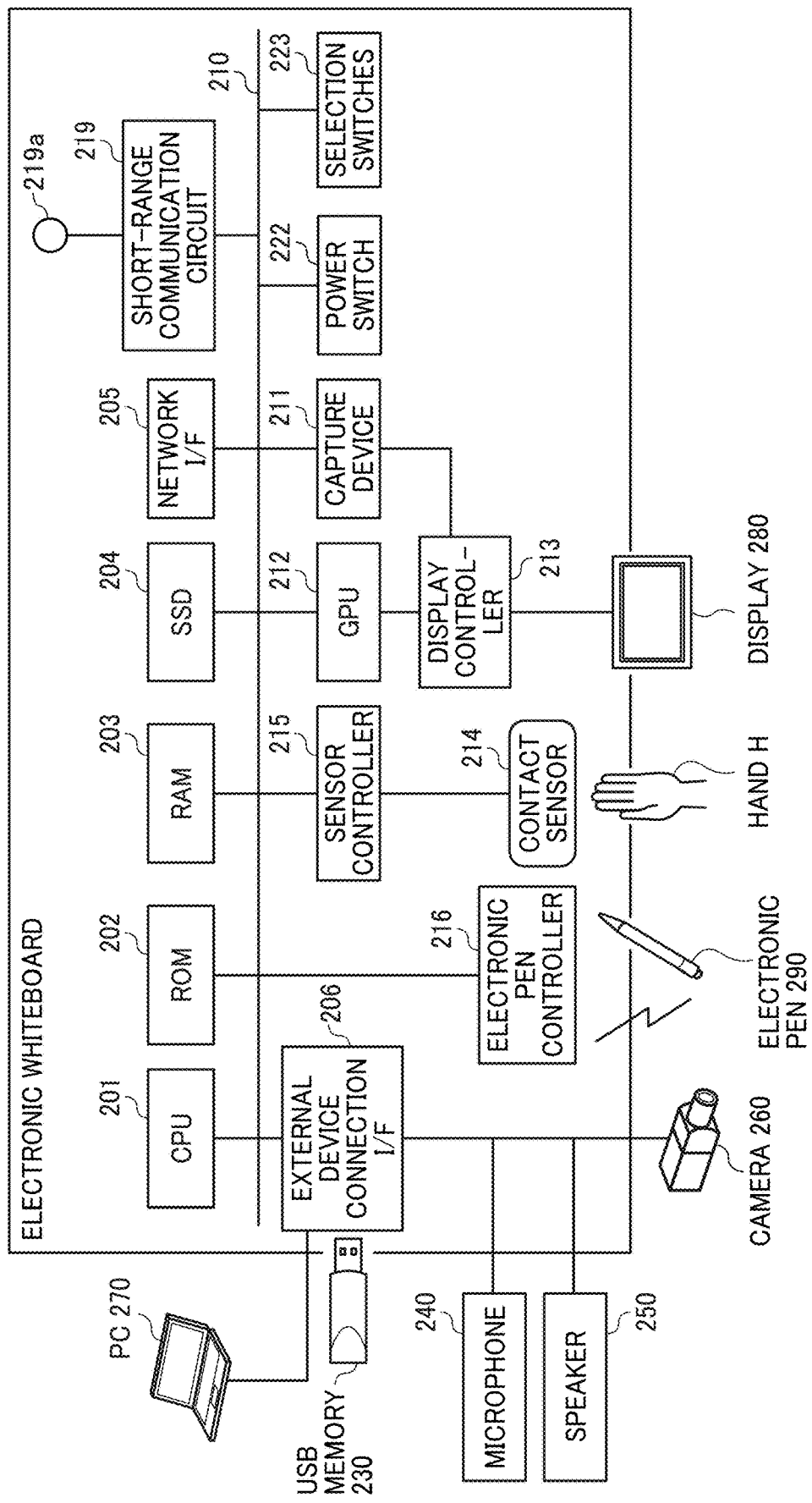
FIG. 3 is a block diagram illustrating an example of a hardware configuration of an electronic whiteboard, according to an embodiment of the present disclosure.
Figure 4:
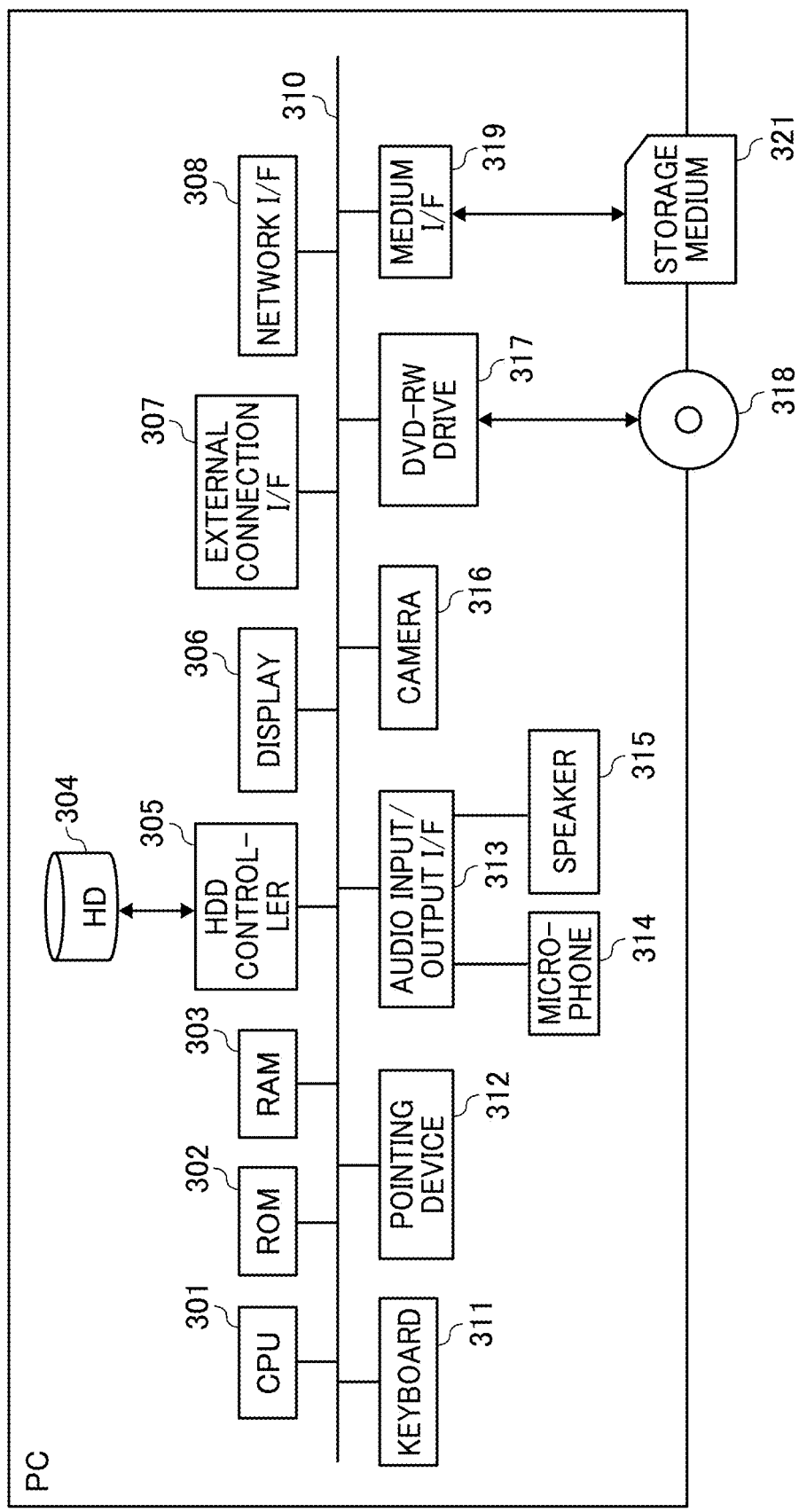
FIG. 4 is a block diagram illustrating an example of a hardware configuration of a personal computer (PC), according to an embodiment of the present disclosure.
Figure 5:
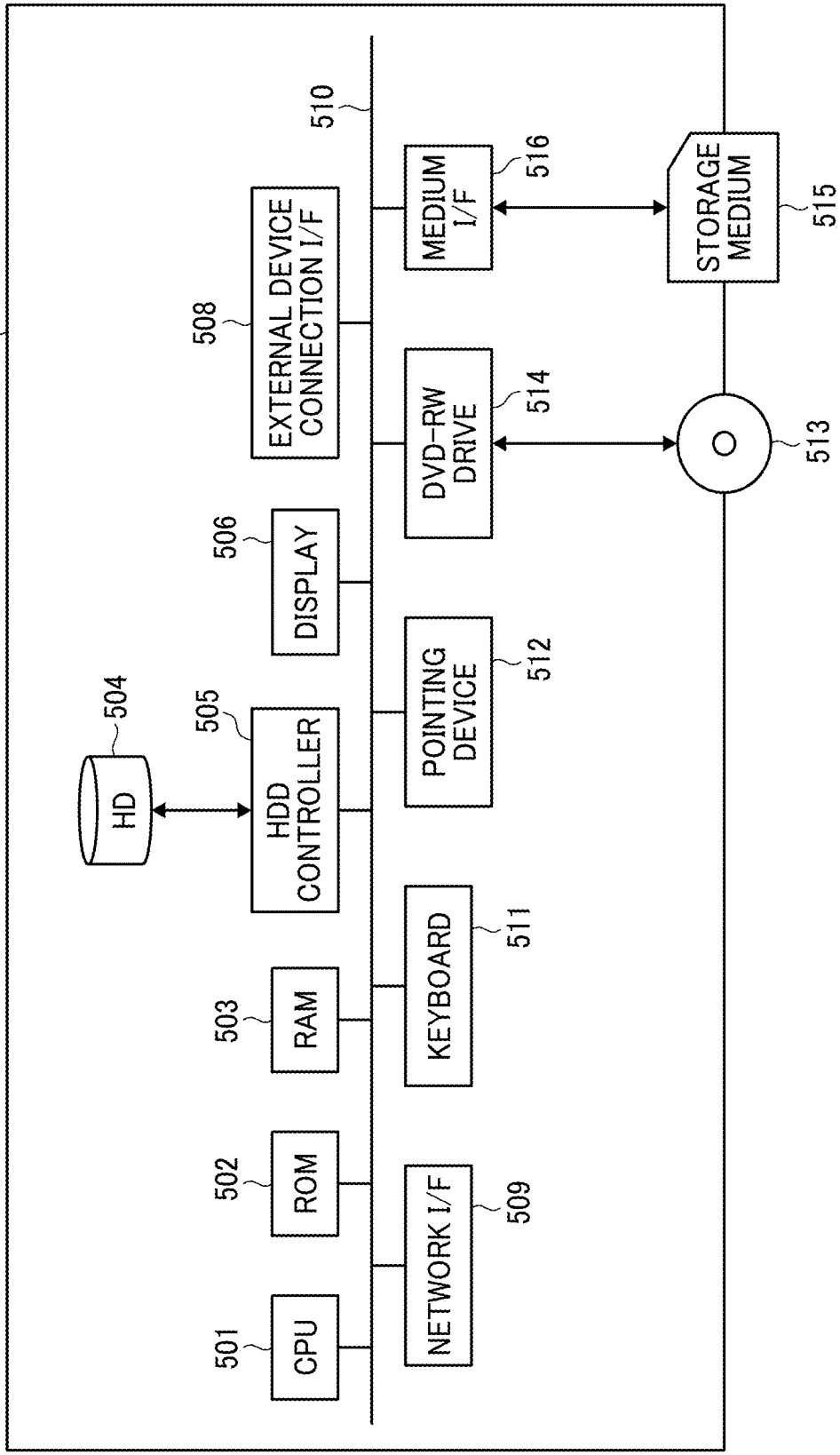
FIG. 5 is a block diagram illustrating an example of a hardware configuration of a communication management apparatus, according to an embodiment of the present disclosure.

Hardware Configuration:

Next, referring to FIG. 3 to FIG. 5, examples of hardware configurations of each apparatus, device, and terminal of the screen sharing system 1 are described, according to the first embodiment. In the hardware configurations illustrated in FIG. 3 to FIG. 5, certain hardware elements may be added or omitted as needed.

Hardware Configuration of Electronic Whiteboard:

Referring to FIG. 3, a hardware configuration of the electronic whiteboard as an example of the display apparatus 10 is described. FIG. 3 is a block diagram illustrating an example of a hardware configuration of the electronic whiteboard. Each hardware element of the electronic whiteboard as an example of the display apparatus 10 is denoted by a reference numeral in 200 series. As illustrated in FIG. 3, the electronic whiteboard includes a CPU 201, a read only memory (ROM) 202, a random access memory (RAM) 203, a solid state drive (SSD) 204, a network interface (I/F) 205, and an external device connection I/F 206.

The CPU 201 controls overall operation of the electronic whiteboard. The ROM 202 stores a control program such as an initial program loader (IPL) to boot the CPU 201. The RAM 203 is used as a work area for the CPU 201. The SSD 204 stores various data such as a control program for the electronic whiteboard. The network I/F 205 controls communication with the communication network 5. The external device connection I/F 206 controls communication with an external device such as a universal serial bus (USB) memory 230, a PC 270, a microphone 240, a speaker 250, or a camera 260.

The electronic whiteboard further includes a capturing device 211, a graphics processing unit (GPU) 212, a display controller 213, a contact sensor 214, a sensor controller 215, an electronic pen controller 216, a short-range communication circuit 219, an antenna 219a of the short-range communication circuit 219, a power switch 222, and selection switches 223.

The capturing device 211 acquires image data of an image displayed on a display 280, as an example of a display (display device), under control of the display controller 213, and stores the image data in the RAM 203, for example. The GPU 212 is a semiconductor chip (processor) dedicated to processing a graphical image. The display controller 213 controls and manages a screen display to output an image output from the capturing device 211 or the GPU 212 to the display 280, for example. The contact sensor 214 detects a touch onto the display 280 with the electronic pen 290 or a user's hand H. The sensor controller 215 controls processing performed by the contact sensor 214. The contact sensor 214 senses a touch input to a specific coordinate on the display 220 using the infrared blocking system. More specifically, the display 280 is provided with two light receiving elements disposed on both upper side ends of the display 280, and a reflector frame surrounding the sides of the display 280. The light receiving elements emit a plurality of infrared rays in parallel to a surface of the display 280. The light receiving elements receive lights passing in the direction that is the same as an optical path of the emitted infrared rays, which are reflected by the reflector frame. The contact sensor 214 outputs an identifier (ID) of the infrared ray that is blocked by an object (such as the user's hand) after being emitted from the two light receiving elements, to the sensor controller 215. Based on the ID of the infrared ray, the sensor controller 215 detects a specific coordinate that is touched by the object. The electronic pen controller 216 communicates with the electronic pen 290 to detect contact by the tip or bottom of the electronic pen with the display 280. The short-range communication circuit 219 is a communication circuit that communicates in compliance with the near field communication (NFC), the Bluetooth®, and the like. The power switch 222 turns on or off the power of the electronic whiteboard. The selection switches 223 are a group of switches for adjusting brightness, hue, etc., of display on the display 280, for example.

The electronic whiteboard further includes a bus line 210. The bus line 210 is an address bus or a data bus that electrically connects the elements illustrated in FIG. 3, such as the CPU 201, to each other.

The contact sensor 214 is not limited to the infrared blocking system type, and may be a different type of detector, such as a capacitance touch panel that identifies the contact position by detecting a change in capacitance, a resistance film touch panel that identifies the contact position by detecting a change in voltage of two opposed resistance films, or an electromagnetic induction touch panel that identifies the contact position by detecting electromagnetic induction caused by contact of an object to a display. In addition to or in alternative to detecting a touch by the tip or bottom of the electronic pen 290, the electronic pen controller 216 may also detect a touch by another part of the electronic pen 290, such as a part held by a hand of the user.

Hardware Configuration of PC:

Referring to FIG. 4, a hardware configuration of the PC as an example of the display apparatus 10 is described. FIG. 4 is a block diagram illustrating an example of a hardware configuration of the PC. Each hardware element of the PC as an example of the display apparatus 10 is denoted by a reference numeral in 300 series. As illustrated in FIG. 4, the PC includes a CPU 301, a ROM 302, a RAM 303, a hard disk (HD) 304, a hard disk drive (HDD) controller 305, a display 306, an external device connection I/F 307, a network I/F 308, a bus line 310, a keyboard 311, a pointing device 312, an audio input/output I/F 313, a microphone 314, a speaker 315, a camera 316, a digital versatile disk-rewritable (DVD-RW) drive 317, and a medium I/F 319.

The CPU 301 controls overall operation of the PC. The CPU 301 is an arithmetic device that reads programs and data stored in, for example, the ROM 302 or the HD 304 to the RAM 303 and executes processing according to the programs or data to implement functions of the PC. The ROM 302 is a nonvolatile memory in which a control program such as an IPL used for booting the CPU 301 are stored. The RAM 303 is a volatile memory used as a work area for the CPU 301. The HD 304 stores various data such as a control program. The HDD controller 305 controls reading or writing of various data to or from the HD 304 under control of the CPU 301. The display 306 displays various information such as a cursor, menu, window, characters, or image. In one example, the display 306 is a touch panel display provided with an input device. The display 306 is an example of a display (display device). The external device connection I/F 307 is an interface that connects the PC to various external devices. Examples of the external devices include, but are not limited to, a USB memory and a printer. The network I/F 308 is an interface that controls communication of data with an external device through the communication network 5. The bus line 310 is an address bus or a data bus, which electrically connects the hardware elements in FIG. 4 such as the CPU 301.

The keyboard 311 is an example of an input device (input means) including a plurality of keys for inputting characters, numerical values, various instructions, and the like. The pointing device 312 is an example of an input device (input means) that allows a user to select or execute a specific instruction, select a target for processing, or move a cursor being displayed. The keyboard 311 and the pointing device 312 are merely examples of the input device (input means). In another example, a touch panel, a voice input device, or the like is used as the input device (input means). The audio input/output I/F 313 is a circuit for inputting or outputting an audio signal to the microphone 314 or from the speaker 315 under control of the CPU 301. The microphone 314 is an example of audio collecting device, which is a built-in type, capable of inputting audio. The speaker 315 is an example of an output device, which is a built-in type, capable of outputting an audio signal. The camera 316 is an example of an imaging device, which is a built-in type, capable of capturing a subject obtain image data. Note that the microphone 314, the speaker 315, and the camera 316 may be an external device in alternative to the built-in device of the PC. The DVD-RW drive 317 controls reading or writing of various data from or to a DVD-RW 318, which is an example of a removable storage medium. In alternative to the DVD-RW, any storage medium may be used such as a digital versatile disk-recordable (DVD-R) and Blu-Ray® disk. The medium I/F 319 controls reading or writing (storing) of data with from or to a storage medium 321 such as a flash memory.

Hardware Configuration of Communication Management Apparatus:

Referring to FIG. 5, a hardware configuration of the communication management apparatus 50A is described. FIG. 5 is a block diagram illustrating an example of a hardware configuration of the communication management apparatus 50A. Each hardware element of the communication management apparatus 50A is denoted by a reference numeral in 500 series. The communication management apparatus 50A is implemented by a computer as illustrated in FIG. 5 including a CPU 501, a ROM 502, a RAM 503, an HD 504, an HDD controller 505, a display 506, an external device connection I/F 508, a network I/F 509, a bus line 510, a keyboard 511, a pointing device 512, a DVD-RW drive 514, and a medium I/F 516.

The CPU 501 controls overall operation of the communication management apparatus 50A. The CPU 501 is an arithmetic device that reads programs and data stored in, for example, the ROM 502 or the HD 504 to the RAM 503 and executes processing according to the programs or data to implement functions of the communication management apparatus 50A. The ROM 502 is a nonvolatile memory in which a control program such as an IPL used for booting the CPU 501 are stored. The RAM 503 is a volatile memory used as a work area for the CPU 501. The HD 504 stores various data such as a control program. The HDD controller 505 controls reading or writing of various data to or from the HD 504 under control of the CPU 501. The display 506 displays various information such as a cursor, menu, window, characters, or image. The external device connection I/F 508 is an interface that connects the communication management apparatus 50A to various external devices. Examples of the external devices include, but are not limited to, a USB memory. The network I/F 509 is an interface that controls communication of data with an external device through the communication network 5. The bus line 510 is, for example, an address bus or a data bus, which electrically connects the elements such as the CPU 501 illustrated in FIG. 5.

The keyboard 511 is an example of an input device including a plurality of keys for inputting characters, numerical values, various instructions, and the like. The pointing device 512 is an example of an input device that allows a user to select or execute a specific instruction, select a target for processing, or move a cursor being displayed. The DVD-RW drive 514 controls reading or writing of various data from or to a DVD-RW 513, which is an example of a removable storage medium. In alternative to the DVD-RW, any storage medium may be used such as a DVD-R and Blu-Ray® disk. The medium I/F 516 controls reading or writing (storing) of data from or to a storage medium 515 such as a flash memory.

Any one of the above-described control programs may be recorded in a file in a format installable or executable on a computer-readable storage medium for distribution. Examples of the storage medium include, but are not limited to, a compact disk-recordable (CD-R), a DVD, a Blu-Ray® disk, a secure digital (SD) card, and a USB memory. In addition, such recording medium may be provided in the form of a program product to users within a certain country or outside that country. For example, the display apparatus 10 executes the control program to implement a display control method according to the present disclosure.

Figure 6:
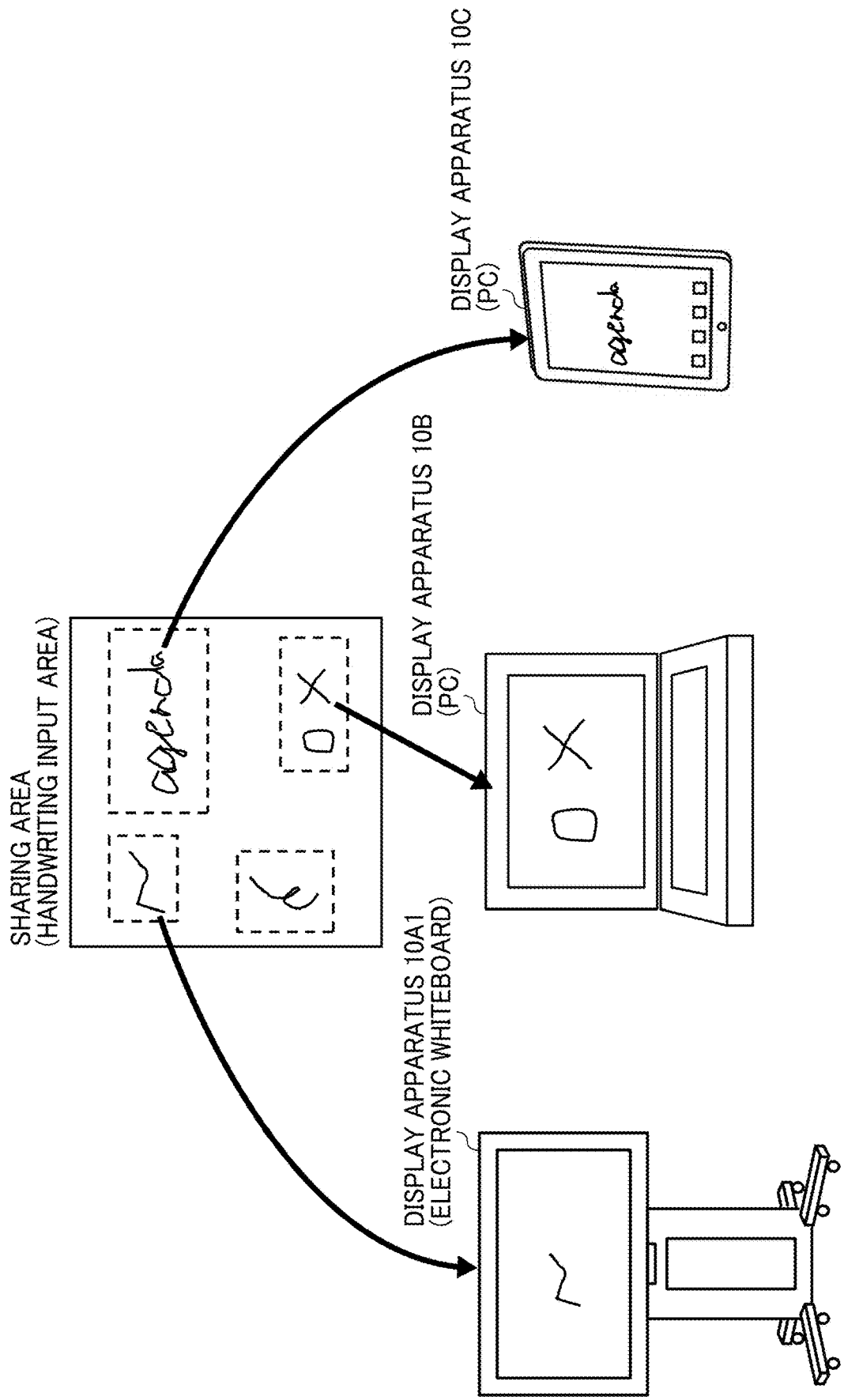
FIG. 6 is a schematic diagram illustrating a relation between a sharing area shared by a plurality of display apparatuses and display screens, each being displayed on each of the display apparatuses, according to an embodiment of the present disclosure.

Overview:

Referring to FIG. 6, a description is provided of a relation between a sharing area and display screens. The sharing area is shared between the display apparatus 10A1, the display apparatus 10B, and the display apparatus 10C. The display screens are displayed by the display apparatus 10A1, the display apparatus 10B, the display apparatus 10C, respectively. FIG. 6 is a schematic diagram illustrating a relation between the sharing area shared by a plurality of display apparatuses 10 and the display screens, each being displayed on each of the display apparatuses.

In FIG. 6, the display apparatus 10A1, the display apparatus 10B, and the display apparatus 10C share objects drawn on their respective displays as a sharing area, to conduct an event such as a teleconference. The sharing area is a handwriting input area that is shared by a plurality of users and receives handwriting inputs by the plurality of users. The sharing area is also referred to as a whiteboard, a shared canvas, a handwriting input area, a drawing area, or a writing area, for example. The display apparatus 10A1, the display apparatus 10B, and the display apparatus 10C exchange handwriting input data for displaying objects drawn on the display apparatuses. Thus, the sharing area is displayed on a display screen as being shared.

The sharing area is an expandable area. In other words, the sharing area is an area in which handwriting can be input without any size restrictions. The sharing area includes, for example, a so-called infinite canvas or a finite canvas. In other words, the sharing area is an area larger than an area that can be displayed on a display screen of the display apparatus 10. Accordingly, as illustrated in FIG. 6, each of the display apparatus 10A1, the display apparatus 10B, and the display apparatus 10C displays at least a part of the sharing area on the display screen. The display apparatus 10A1, the display apparatus 10B, and the display apparatus 10C displays a part of the sharing area instead of displaying the entire area. This makes it easy for a user to perform handwriting input and to recognize content of an object input by handwriting. Further, since the display apparatus 10A1, the display apparatus 10B, and the display apparatus 10C can display different areas of the sharing area, the user can view a desired area while the event is being conducted.

In a case that a plurality of users performs a collaborative work using the sharing area, writing contents may overlap when the users perform writing to the same area at the same time. If writings overlap unintentionally, one or more writings should be moved or erased. However, if the users are authorized to operate any writings, the operation is cumbersome, and the work efficiency of the collaborative work degrades. For preventing an inadvertent edit in such a collaborative work by a plurality of users, a user has difficulty in using an area for writing extensively and in performing writing using writing by another user. Further, authority for editing handwriting input data that is input to a handwriting input screen cannot be set on a user-by-user basis. Also, an operation for setting the restriction of editing is complicated. These may cause a problem in user's operability.

To address the above issues, the screen sharing system 1 can set authority such as edit authority and viewing authority based on which other users are authorized to edit and view handwriting input data (written content) input by a user. Only a user having the authority is permitted to perform an editing operation or view the handwriting input data. The screen sharing system 1 restricts a user who does not have the authority from performing the editing operation or viewing handwriting input data that is input. Thus, the screen sharing system 1 sets, for each of multiple users, user's authority with respect to handwriting input data that is input. Further, the screen sharing system 1 allows a user to extensively use the handwriting input screen without worrying about operations by other users, and at the same time, prevents inadvertent editing.

Figure 7:
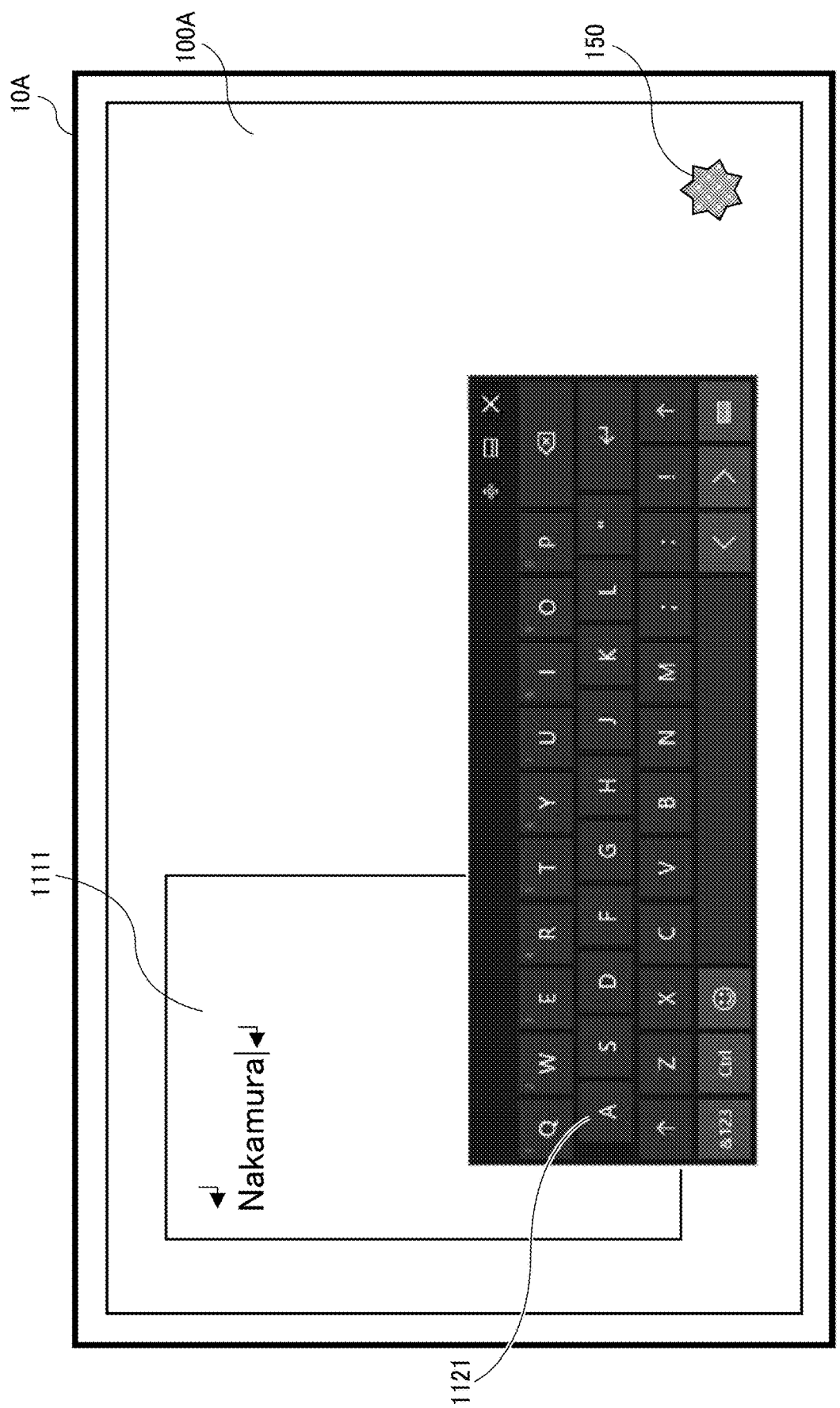
FIG. 7 is a diagram illustrating an example of data input using a virtual keyboard, according to an embodiment of the present disclosure.

In another example, in the screen sharing system 1, data may be input using input means such as a keyboard instead of or in addition to handwriting input data. FIG. 7 is a diagram illustrating an example of data input using a virtual keyboard. First, a text editor application is activated in the display apparatus 10A 1 configured to display the sharing area (handwriting input area) as illustrated in FIG. 6. At this time, it is assumed that a predetermined text editor area 1111 is displayed on a display screen 100A of the display apparatus 10A1. Any suitable text editor that is generally know can be used. In the state in which the text editor area 1111 is being displayed, when a predetermined selection is received by an operation to a setting button 150 displayed on the display screen 100A, the virtual keyboard 1121 as illustrated in FIG. 7 is displayed at a certain position on the display screen 100A. Specifically, the CPU 201 illustrated in FIG. 3 may control the GPU 212 and the display controller 213 to read out a template of the virtual keyboard stored in advance in a predetermined area of the ROM 202 or the SSD 204, to display the template as the virtual keyboard 1121 in a certain area of the display 280.

Then, for example, when the user of the display apparatus 10A1 enters a desired word, character string, number, sentence, or the like using the virtual keyboard 1121, the desired word, character string, number, sentence, or the like is input at a position of a cursor displayed in the text editor area 1111 in synchronization with the timing when the desired word, character string, number, sentence, or the like is entered. In another example, when a predetermined selection is received by an operation to the setting button 150 displayed on the display screen 100A, the activation of the predetermined text editor area 1111 and the displaying of the virtual keyboard 1121 are performed concurrently. The above-described data input using the input means such as the virtual keyboard can be performed at any other site such as the site C illustrated in FIG. 1 than at the site A where the display apparatus 10A1 is used.

In a case that the display apparatus 10B and the display apparatus 10A1 illustrated in FIG. 6 are connected by wire or wirelessly, the keyboard 311 of the display apparatus 10B may function as the input device (input means) that allows a user to input the desired word, character string, number, sentence, or the like in the text editor area 1111, instead of the virtual keyboard 1121 illustrated in FIG. 7. Specifically, keys of the keyboard 311 of the display apparatus 10B may cooperate (synchronize) with keys of the virtual keyboard 1121 displayed on the display apparatus 10A1, so that the desired word, character string, number, sentence, or the like input at the display apparatus 10B are input at a position where the cursor is being displayed in the text editor area 1111 displayed on the display apparatus 10A1. In one example, the providing a user interface (UI) as described above allows a user to set predetermined edit authority.

Figure 8:
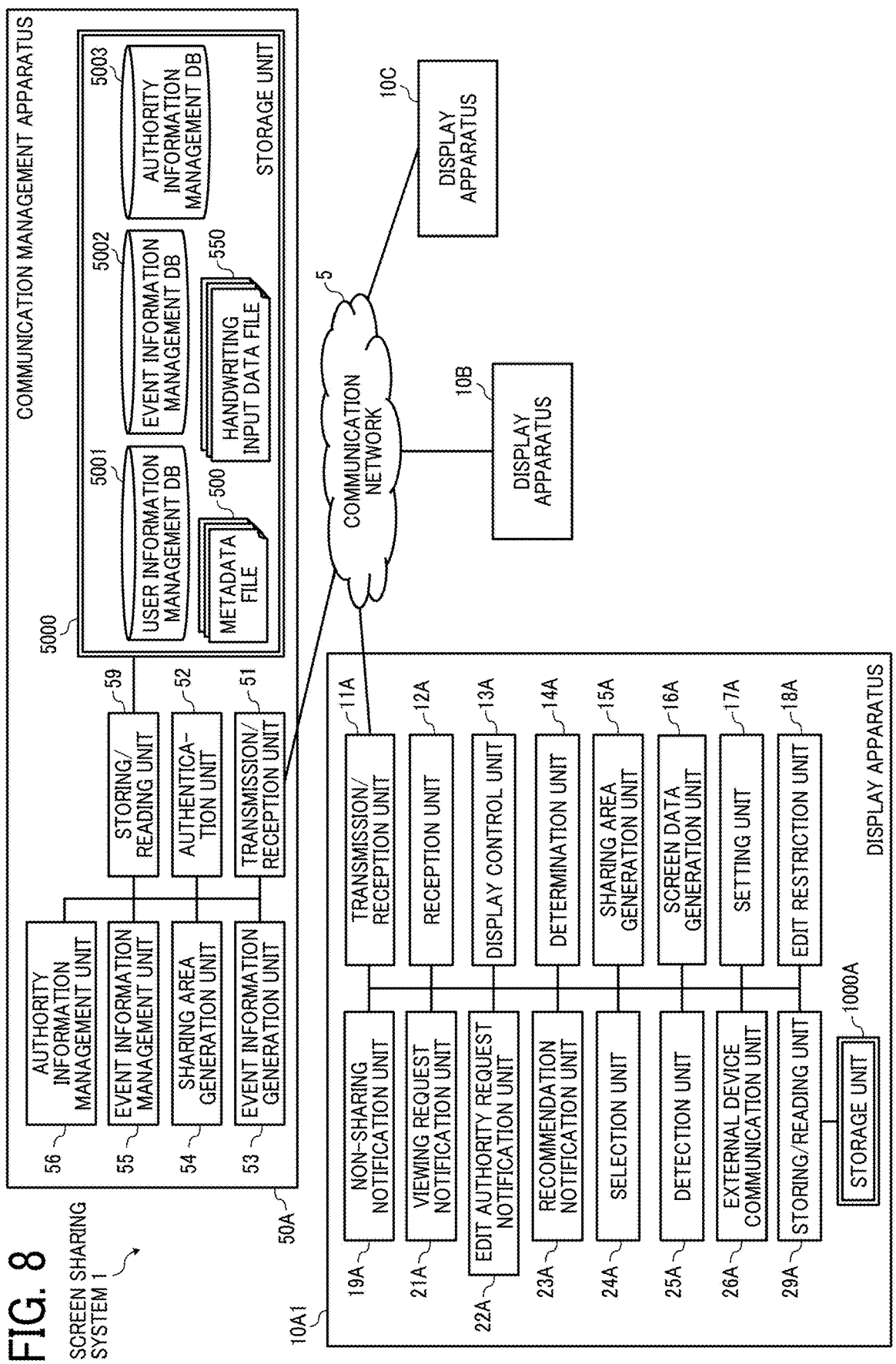
FIG. 8 is a diagram illustrating an example of a functional configuration of the screen sharing system, according to an embodiment of the present disclosure.

Functional Configuration:

Referring to FIG. 8 to FIG. 13, a functional configuration of the screen sharing system 1 is described according to the first embodiment. FIG. 8 is a diagram illustrating an example of a functional configuration of the screen sharing system 1. FIG. 8 illustrates a part of apparatuses and terminals of FIG. 1, which are related to processing or operation described below.

Functional Configuration of Display Apparatus:

Referring to FIG. 8, functional configurations of the display apparatus 10A1, the display apparatus 10B, and the display apparatus 10C are described. Since the display apparatus 10A1, the display apparatus 10B, and the display apparatus 10C have the same or substantially the same functions, the functions of the display apparatus 10 are described below. The display apparatus 10 includes a transmission/reception unit 11, a reception unit 12, a display control unit 13, a determination unit 14, a sharing area generation unit 15, a screen data generation unit 16, a setting unit 17, an edit restriction unit 18, a non-sharing notification unit 19, a viewing request notification unit 21, an edit authority request notification unit 22, a recommendation notification unit 23, a selection unit 24, a detection unit 25, an external device communication unit 26, and a storing/reading unit 29. These units are functions that are implemented by or that are caused to function by operating any of the hardware elements illustrated in FIG. 3 or FIG. 4 in cooperation with the instructions of the CPU 201 according to the control program expanded from the SSD 204 to the RAM 203 or the instruction of the CPU 301 according to the control program expanded from the HD 304 to the RAM 303. The display apparatus 10 further includes a storage unit 1000 that is implemented by the ROM 202, the SSD 204, or the USB memory 230 illustrated in FIG. 3, or the ROM 302, the HD 304, or the storage medium 321 illustrated in FIG. 4.

The transmission/reception unit 11 is mainly implemented by the network I/F 205 that operates according to instructions of the CPU 201, or the network I/F 308 that operates according to instructions of the CPU 301. The transmission/reception unit 11 transmits or receives various data or information to or from other apparatuses or terminals through the communication network 5.

The reception unit 12 is mainly implemented by the contact sensor 214 and the electronic pen controller 216 that operate according to instructions of CPU 201, or the pointing device 312 or the touch panel 309 that operates according to instructions of the CPU 301. The reception unit 12 receives various inputs from a user.

The display control unit 13 is mainly implemented by the display controller 213 that operates according to instructions of the CPU 201, or instructions of the CPU 301. The display control unit 13 controls the display 280 or the display 306 to display a drawn-image, or to access the communication management apparatus 50A using a web browser or the like to display various screen data. Specifically, the display control unit 13 activates and executes various applications that operate on an operating system (OS), to control the display 280 or the display 306 to display various screens drawn by an application programming interface (API) provided by the OS.

The determination unit 14A, which is mainly implemented by instructions of the CPU 201 or the CPU 301, performs various determinations. The sharing area generation unit 15, which is mainly implemented by instructions of the CPU 201 or the CPU 301, generates the sharing area that is displayed as being shared with the other display apparatuses 10.

The screen data generation unit 16, which is mainly implemented by instructions of the CPU 201 or the CPU 301, generates screen data of the sharing area. The screen data generation unit 16 generates handwriting input data and an image of an object based on a handwriting input received by the reception unit 12. Further, the screen data generation unit 16 generates an image of an object based on handwriting input data received by the transmission/reception unit 11. The screen data generation unit 16 converts an object obtained by, for example, a handwriting input on the display by a user into coordinate data. For example, when the display apparatus 10 at a certain site transmits coordinate data to the display apparatuses 10 at other sites, each of the display apparatuses 10 at other sites displays an object of the same content on the own display based on the coordinate data. Further, the screen data generation unit 16 generates metadata relating to a display log of the display screen. The metadata and the handwriting input data generated by the screen data generation unit 16 are examples of log data indicating a conduct history of conducted events.

The setting unit 17, which is mainly implemented by instructions of the CPU 201 or the CPU 301, sets various authorities for handwriting input data input by a user who uses the display apparatus 10 to another user who use another display apparatus 10. For example, the setting unit 17 sets edit authority based on which another user is authorized to edit handwriting input data input by the user using the display apparatus 10. Further, for example, the setting unit 17 sets viewing authority based on which another user is authorized to view handwriting input data input by the user using the display apparatus 10. Furthermore, for example, the setting unit 17 sets edit authority based on which the user who uses the display apparatus 10 is authorized to edit handwriting input data input by another user who uses another display apparatus 10.

The edit restriction unit 18, which is mainly implemented by instructions of the CPU 201 or the CPU 301, restricts edit of handwriting input data that is input by another user who does not have the edit authority based on authority information set by the setting unit 17. Furthermore, for example, when the user does not have the edit authority for editing handwriting input data that is input by another user, the edit restriction unit 18 displays, on the display screen, an edit restriction notification indicating that the user does not have the edit authority. In the present disclosure, the term "edit" refers to selecting, inputting, adding, changing, deleting, enlarging, reducing, or moving an image, text, or handwriting input data displayed on the display screen of the display apparatus 10 according to an input operation received by the reception unit 12.

The non-sharing notification unit 19 is mainly implemented by the display controller 213 that operates according to instructions of the CPU 201, or instructions of the CPU 301. The non-sharing notification unit 19 displays, on the display screen, a non-sharing notification indicating that handwriting input data by the user using the display apparatus 10 is not shared by another user using another display apparatus 10.

The viewing request notification unit 21 is mainly implemented by the display controller 213 that operates according to instructions of the CPU 201, or instructions of the CPU 301. The viewing request notification unit 21 displays, on the display screen, a viewing request notification indicating that a viewing request requesting permission to view handwriting input data that is input by the user who uses the display apparatus 10 has been transmitted from another display apparatus 10.

The edit authority request notification unit 22 is mainly implemented by the display controller 213 that operates according to instructions of the CPU 201, or instructions of the CPU 301. The edit authority request notification unit 22 displays, on the display screen, an edit authority request notification indicating that an edit authority request requesting permission to edit handwriting input data that is input by the user using the display apparatus 10 has been transmitted from another display apparatus 10.

The recommendation notification unit 23 is mainly implemented by the display controller 213 that operates according to instructions of the CPU 201, or instructions of the CPU 301. When the handwriting input data that is input by the user using the display apparatus 10 overlaps with second handwriting data input that is input by another user using another display apparatus 10, the recommendation notification unit 23 displays, on the display screen, an authority change recommendation notification indicating recommendation for a change in the edit authority.

The selection unit 24, which is mainly implemented by instructions of the CPU 201 or the CPU 301, selects handwriting input data to be edited for each user who has input the handwriting input data.

The detection unit 25, which is mainly implemented by instructions of the CPU 201 or the CPU 301, detects writing pressure of an input to the display screen as the handwriting input screen.

The external device communication unit 26 is mainly implemented by the external device connection I/F 206 that operates according to instructions of the CPU 201, or the external device connection I/F 307 that operates according to instructions of the CPU 301. The external device communication unit 26 receives input of various types of information from the external device connected to the display apparatus 10.

The storing/reading unit 29, which is implemented by instructions of the CPU 201 or the CPU 301, stores various data or information in the storage unit 1000 or reads out various data or information from the storage unit 1000.

Functional Configuration of Communication Management Apparatus:

Referring to FIG. 8, a functional configuration of the communication management apparatus 50A is described according to the embodiment. The communication management apparatus 50A includes a transmission/reception unit 51, an authentication unit 52, an event information generation unit 53, a sharing area generation unit 54, an event information management unit 55, an authority information management unit 56, and a storing/reading unit 59. These units are functions that are implemented by or that are caused to function by operating any of the hardware elements illustrated in FIG. 5 in cooperation with the instructions of the CPU 501 according to the control program for the communication management apparatus, the control program being expanded from the HD 504 to the RAM 503. The communication management apparatus 50A further includes a storage unit 5000 that is implemented by the ROM 502, the HD 504, or the storage medium 515 illustrated in FIG. 5.

The transmission/reception unit 51 is mainly implemented by the network I/F 509 that operates according to instructions of the CPU 501. The transmission/reception unit 51 transmits or receives various data or information to or from other apparatuses or terminals through the communication network 5.

The authentication unit 52, which is implemented by instructions of the CPU 501, performs authentication processing of a user who participates in an event using the display apparatus 10.

The event information generation unit 53, which is mainly implemented by instructions of the CPU 501, generates event information relating to an event conducted by a user.

The sharing area generation unit 54, which is mainly implemented by instructions of the CPU 501, generates the sharing area that is displayed as being shared by the plurality of display apparatuses 10.

The event information management unit 55, which is mainly implemented by instructions of the CPU 501, manages the event information generated by the event information generation unit 53.

The authority information management unit 56, which is mainly implemented by instructions of the CPU 501, manages authority information indicating various authorities for handwriting input data that is input by a certain user, the authorities being assigned to other users.

The storing/reading unit 59, which is implemented by instructions of the CPU 501, stores various data or information in the storage unit 5000 or reads out various data or information from the storage unit 5000.

User Information Management Table:

FIG. 9 is a conceptual diagram illustrating an example of a user information management table according to the embodiment. The user information management table stores user information identifying users who participate in an event. In the storage unit 5000, a user information management database (DB) 5001 is stored, for example, in the form of the user information management table as illustrated in FIG. 9. The user information management table stores the user information associating a user ID identifying a user, a user name, a password, and an e-mail address with each other. The e-mail address is an example of destination information indicating a user destination.

Event Information Management Table:

FIG. 10 is a conceptual diagram illustrating an example of an event information management table according to the embodiment. The event information management table stores the event information relating to an event conducted by a user. In the storage unit 5000, an event information management DB 5002 is stored, for example, in the form of the event information management table as illustrated in FIG. 10. The event information management table stores the event information associating an event ID identifying an event, an event name, an event date/time when the event is conducted, a participating user who participates in the event, and a file storage location where an event file generated in the event is stored with each other.

The event date/time indicates, for example, the date and time when the event file was updated most recently. In another example, the event date/time indicates the date and time when the corresponding event is first conducted. In still another example, the start date/time and the end date/time of the event are be stored. The participating user indicates a user name of a user who has participates in the event. Further, the rile storage location indicates information of a storage destination in which various event files are stored. For example, the file storage location is a data path in the communication management apparatus 50A. In another example, the file storage location is a uniform resource locator (URL) or a uniform resource identifier (URI) external to the communication management apparatus 50A. Example of the event file stored in the file storage location includes, but are not limited to, a metadata file 500, a handwriting input data file 550, and sharing area data of an event generated by the sharing area generation unit 54.

Metadata File:

FIG. 11 is a view of an example of the metadata file 500 according to the embodiment. The metadata file 500 illustrated in FIG. 11 is an event file generated in a conducted event. The metadata file 500 indicates, as metadata, a log of operations performed on the display screen, such as moving, enlarging, or reducing the display screen, for each user. The metadata file 500 illustrated in FIG. 11 includes an event name ("Name") a start time ("Start") and an end time ("End") of an event, and an operation log ("OperationLog") for each user. The operation log includes, as a display area ("ViewArea") for each user, area information indicating a coordinate position ("X", "Y") and a size ("Width", "Height") of the display area, and display log data indicating a display time ("Time").

The example illustrated in FIG. 11 indicates that an event named "Theme A, Regular meeting 1" was held from "2021/01/15, 13:00" to "2021/01/15, 15:00". Further, the example of FIG. 11 indicates that the display apparatus 10 used by a participant "userA" first displays an area whose upper left corner is at (X, Y)=(10, 310) of the sharing area and having a width of 100 pixels and a height of 80 pixels for 100 seconds, and the displayed area moves to an area whose upper left corner is (X, Y)=(100, 210) according to an operation by "user A". The area last displayed by the display apparatus 10 used by "userA" is an area of (X, Y)=(150, 130). Furthermore, the example of FIG. 11 indicates that an area last displayed by the display apparatus 10 used by "userB" is an area of (X, Y)=(105, 1200). Moreover, the example of FIG. 11 indicates that an area last displayed by the display apparatus 10 used by "userC" is an area of (X, Y)=(130, 1300). The metadata file 500 stores such an operation log for each user. Although FIG. 11 illustrates an example in which a data format of the metadata file 500 is a JavaScript Object Notation (Json) format, the metadata file 500 is in any other data format.

Handwriting Input Data File:

FIG. 12 is a view of an example of the handwriting input data file 550 according to the embodiment. The handwriting input data file 550 illustrated in FIG. 12 is an event file generated in a conducted event. The handwriting input data file 550 indicates, as object data, an operation log of handwriting input objects such as a stroke or a stamp. The handwriting input data file 550 illustrated in FIG. 12 includes a background color ("BackgroundColor") of the sharing area and object data ("Objects") indicating an input log of objects input by handwriting. The object data includes an object type ("Type"), detailed data information ("Data") indicating content of an object, a user name ("User") who has input the object, and a date/time ("Date") when the object has been input. Examples of the object type include, but are not limited to, a stroke and a stamp. When the object type is a stroke, for example, the detailed data information includes data of a trajectory ("Points") of coordinate positions of the stroke, a line thickness ("Thin"), and a line color ("Color"). When the object type is a stamp, for example, the detailed data information includes data of a coordinate position ("Points"), a size ("Size"), and an image file ("Image") of the stamp.

The example illustrated in FIG. 12 indicates that "userA" inputs, to the sharing area having a background color (BackgroundColor) of white, a black stroke having a thickness of five pixels from the coordinates (X, Y)=(10, 10) to (X, Y)=(30, 30) at "2021/01/15, 13:32". The example of FIG. 12 further indicates that, after the above input of the stroke. "userB" inputs an image file "Circle. jpg" having a size of 20 pixels×20 pixels at a position with coordinates (X, Y)=(100, 200) as the left upper corner at "2021/01/15, 13:40". The handwriting input data file 550 stores such object data for each object that is input. Although FIG. 12 illustrates an example in which a data format of the handwriting input data file 550 is a Json format, the handwriting input data file 550 is in any other data format. The stroke and the stamp merely examples of the object type. In another example, the object type includes texts obtained by applying optical character reader (OCR) processing to strokes representing symbols such as characters or numbers, system-generated characters such as date or time, certain figures such as triangles, stars or circles, or lines such as arrows, line segments, or Bezier curves.

In another example, the metadata file 500 and the handwriting input data file 550 are stored in the storage unit 1000 of the display apparatus 10 participating in the event, in addition to in the storage unit 5000 of the communication management apparatus 50A. In this case, the display apparatus 10 stores the log data including metadata indicating an operation log of operations by a user who uses the display apparatus 10 and handwriting input data in the storage unit 1000. In another example, in a case the display apparatus 10 has a server function, metadata including operation logs of operations by all users participating in an event and handwriting input data are stored in the storage unit 1000.

Authority Information Management Table:

FIG. 13 is a conceptual diagram illustrating an example of an authority information management table according to the embodiment. The authority information management table stores the authority information indicating various authorities of other users for handwriting input data input by a certain user. In the storage unit 5000, an authority information management DB 5003 is stored, for example, in the form of the authority information management table as illustrated in FIG. 13. The authority information management table stores, for each event ID identifying an event, the authority information associating a user ID identifying a user who has input handwriting input data, a user name of the user, and the edit authority and the viewing authority as examples of various authorities for the handwriting input data with each other. The authority information stored in the authority information management DB 5003 is shared as authority information common to the display apparatuses 10 used respectively by the users participating in the event. The shared authority information is stored in the storage unit 1000 of the display apparatus 10 while the event is being conducted.

The example of FIG. 13 indicates a setting state in which no user ("null") has the edit authority for handwriting input data input by "userA", and only "userB" has the viewing authority for handwriting input data input by "userA". Further, the example of FIG. 13 indicates a setting state in which only "userC" has the edit authority and the viewing authority for handwriting input data input by "userB". Furthermore, the example of FIG. 13 indicates a setting state in which no user ("null") has the edit authority and the viewing authority for the handwriting input data input by "userC".

Figure 14:
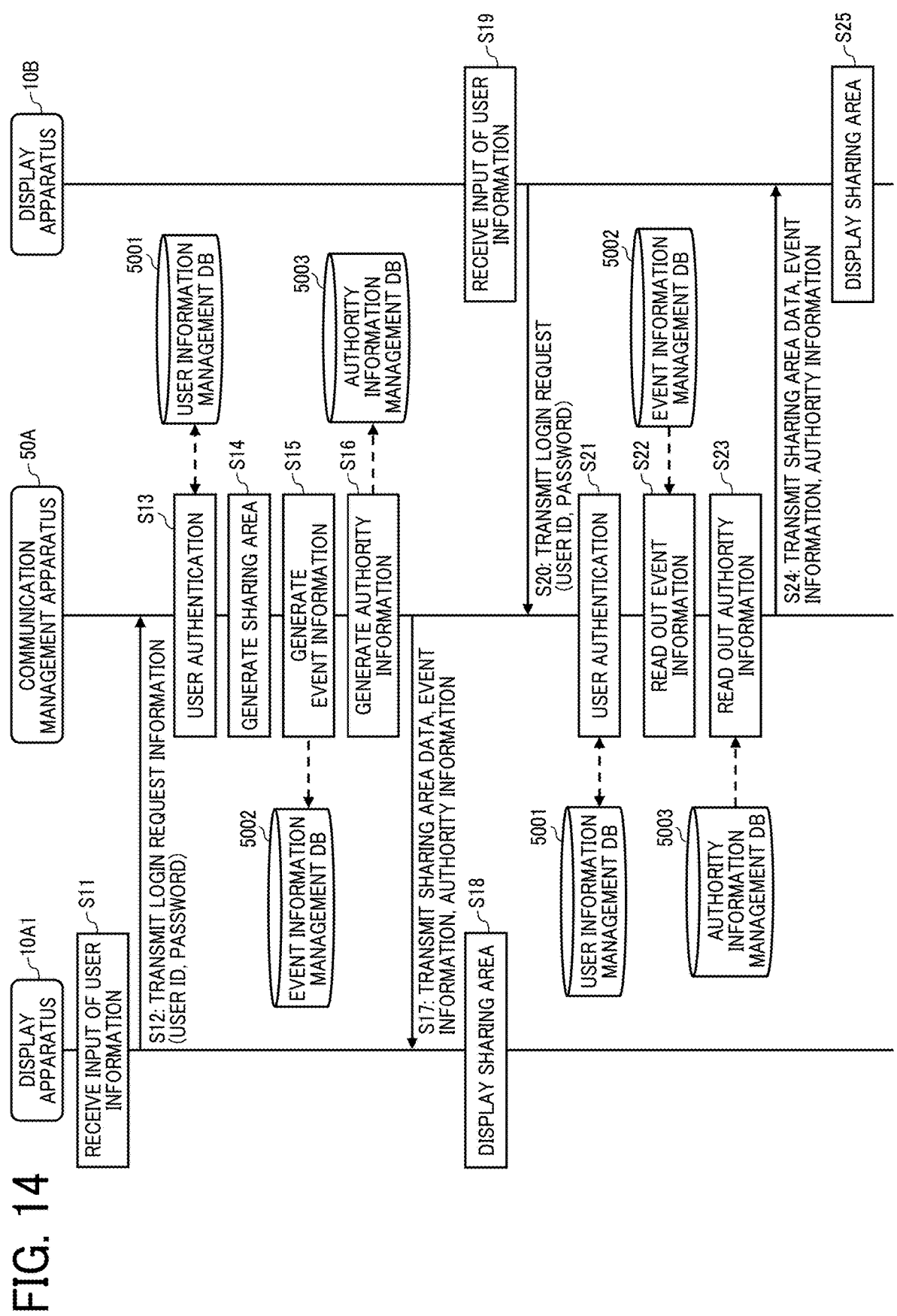
FIG. 14 is a sequence diagram illustrating an example of an operation of displaying a screen at the start of an event, according to an embodiment of the present disclosure.
Figure 15:
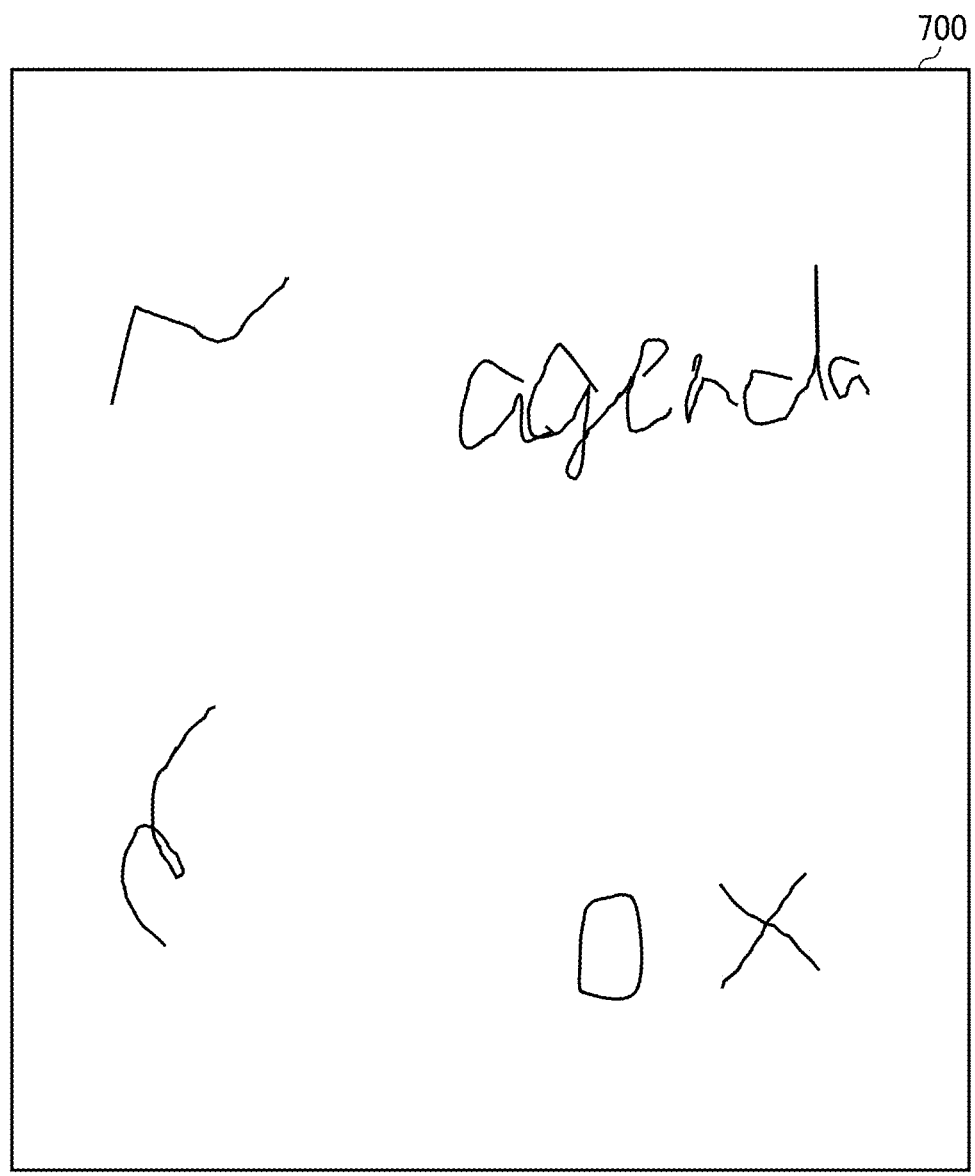
FIG. 15 is an illustration of an example of the sharing area, according to an embodiment of the present disclosure.

Processes or Operation of Embodiment:

Operation at Event Start:

Referring to FIG. 14 to FIG. 40, processes and operations by the screen sharing system 1 according to the first embodiment are described. The following description is provided of an example of an operation performed by the display apparatus 10A1 used by the user A and the display apparatus 10B used by the user B. The same or substantially the same operation is performed by the display apparatus 10C used by the user C illustrated in FIG. 1. Referring to FIG. 14 and FIG. 15, a display screen displayed on the display apparatus 10 at the start of an event is described. FIG. 14 is a sequence diagram illustrating an example of an operation of displaying a screen at the start of an event.

First, in response to an operation by the user A to the input device of the display apparatus 10A1, the reception unit 12A of the display apparatus 10A1 receives an input of a user ID and a password (step S11). Next, the transmission/reception unit 11A transmits login request information to the communication management apparatus 50A (step S12). The login request information includes the user ID and password received in step S11. Thereby, the transmission/reception unit 51 of the communication management apparatus 50A receives the login request information transmitted by the display apparatus 10A1.

Next, the authentication unit 52 of the communication management apparatus 50A performs user authentication using the user ID and password received in step S12 (step S13). Specifically, the storing/reading unit 59 searches the user information management DB 5001 (see FIG. 9) using a set of the user ID and the password received in step S12 as a search key, to determine whether the same set of the user ID and the password is stored. When the same set of the user ID and the password is stored, the authentication unit 52 determines that the user A who has sent the login request is an authorized user. When the same set of the user ID and the password is not stored, the authentication unit 52 determines that the user A who has sent the login request is not authorized (unauthorized) user. When the user A is an unauthorized user, the transmission/reception unit 51 transmits, to the display apparatus 10A1, a notification indicating that the user A is an unauthorized user. In the following, an example in which the user A is an authorized user is described.

Next, the sharing area generation unit 54 newly generates a sharing area, which is a handwriting input area that is displayed as being shared by a plurality of display apparatuses (step S14). Next, the event information management unit 55 generates event information relating to an event to be started (step S15). Specifically, the event information generated in step S15 is information indicating an event TD identifying the event, an event name, a start time of the event, and a storage location where an event file generated in the event is stored. The event information management unit 55 stores the generated event information in an event information management DB 5002 (see FIG. 10) via the storing/reading unit 59.

In addition, the authority information management unit 56 generates, for each user, authority information indicating edit authority and viewing authority for handwriting input data that input in the event (step S16). At the start of event, the authority information is set such that, for example, all users have the edit authority and the viewing authority for handwriting input data that is input by other users. The authority information management unit 56 stores the generated authority information in the authority information management DB 5003 (see FIG. 13) via the storing/reading unit 59.

Next, the transmission/reception unit 51 transmits data of the sharing area generated in step S14, the event information generated in step S15, and the authority information generated in step S16 to the display apparatus 10A1 (step S17). Thereby, the transmission/reception unit 11A of the display apparatus 10A1 receives the data of the sharing area, the event information, and the authority information transmitted by the communication management apparatus 50A.

Then, the display control unit 13A of the display apparatus 10A1 controls the display (e.g., the display 280 or the display 306) to display a sharing area 700 represented by the data of the sharing area received in step S17 (step S18). FIG. 15 is an illustration of an example of the sharing area 700.

The sharing area 700 illustrated in FIG. 15 is a handwriting input screen that is displayed as being shared with one or more other display apparatuses 10 in the event. The sharing area 700 is a state in which multiple objects are input by handwriting input operations performed by users participating in the event on the display screen. Since the sharing area 700 is larger than a display area of the display screen of the display apparatus 10, at least a part of the sharing area 700 is displayed as the display area on the display screen of the display apparatus 10. The user participating in the event displays a desired area of the sharing area 700 in the event, to perform handwriting input and viewing of an object.

Further, in substantially the same manner as the above-described processing by the display apparatus 10A1, in response to an operation by the user B to the input device of the display apparatus 10B, the reception unit 12B of the display apparatus 10B receives an input of user information including a user ID and a password (step S19). Next, the transmission/reception unit 11B transmits login request information to the communication management apparatus 50A (step S20). The login request information includes the user ID and password received in step S19. Thereby, the transmission/reception unit 51 of the communication management apparatus 50A receives the login request information transmitted by the display apparatus 10B.

Next, the authentication unit 52 of the communication management apparatus 50A performs user authentication using the user ID and password received in step S20 in substantially the same manner as processing of step S13 (step S21). Next, based on the completion of authentication of the user B by the authentication unit 52, the event information management unit 55 reads the event information generated in the step S15 from the event information management DB 5002 via the storing/reading unit 59 (step S22). Further, the authority information management unit 56 reads the authority information generated in the step S16 from the authority information management DB 5003 via the storing/reading unit 59 (step S23).

Next, the transmission/reception unit 51 transmits, to the display apparatus JOB, data of the sharing area generated in step S14, the event information read in step S22, and the authority information read in step S23 (step S24). Thereby, the transmission/reception unit 11B of the display apparatus 10B receives the data of the sharing area, the event information, and the authority information transmitted by the communication management apparatus 50A. Then, the display control unit 13B of the display apparatus 10B controls the display device to display the sharing area 700 represented by the received data of the sharing area, in substantially the same manner as processing by the display apparatus 10A1 in step S17 (step S25).

Thus, the screen sharing system 1 allows the plurality of display apparatuses 10 participating in the event to share and display the sharing area 700 as the handwriting input screen.

Figure 16:
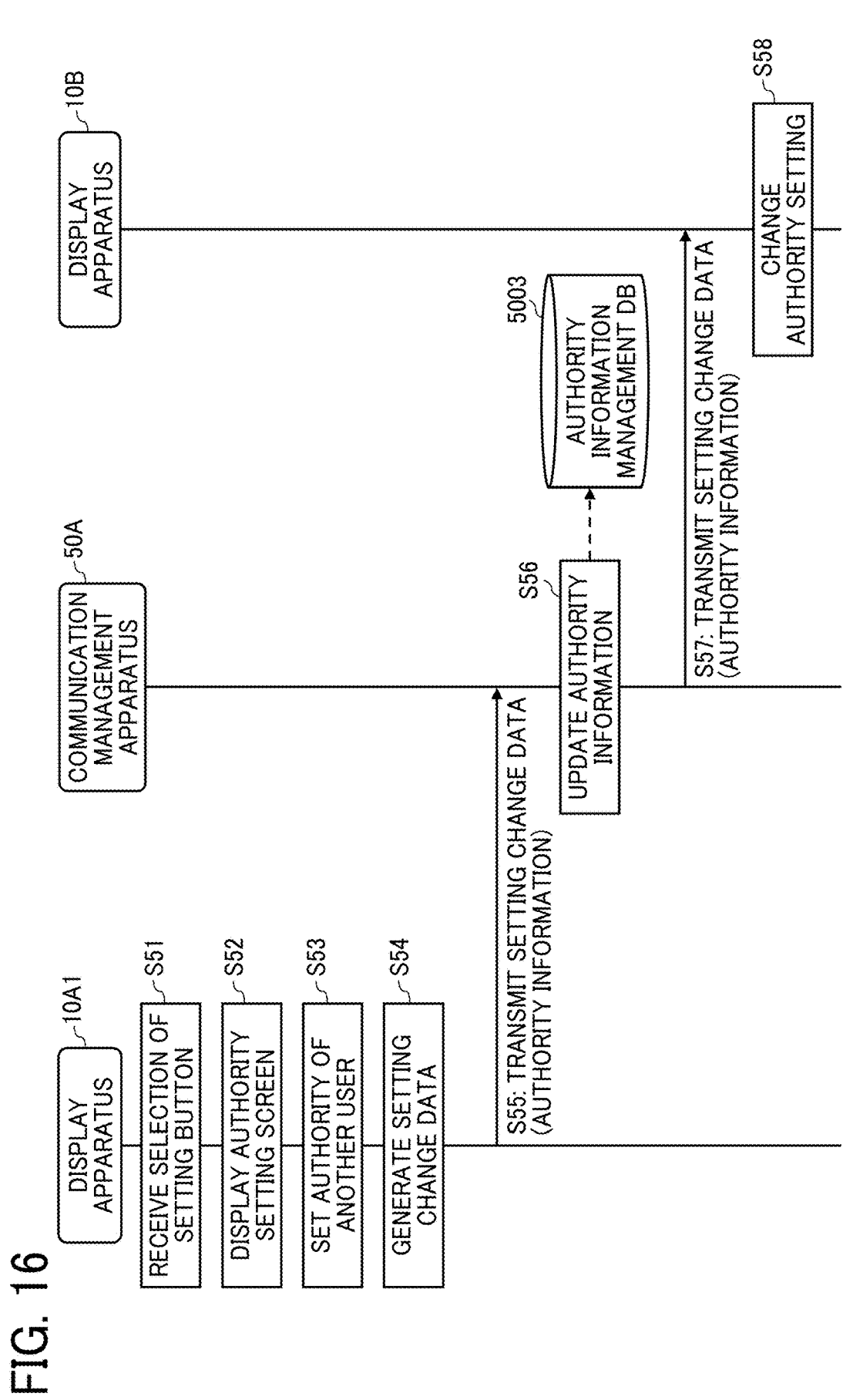
FIG. 16 is a sequence diagram illustrating an example of an operation of setting authority for another user, according to an embodiment of the present disclosure.

Operation of Setting Authority:

Referring to FIG. 16 to FIG. 19, an operation of setting the edit authority and the viewing authority assigned to another user is described, the edit authority and the viewing authority authorizing another user to edit and view handwriting input data input by a user. FIG. 16 is a sequence diagram illustrating an example of an operation of setting authority for another user.

Figure 17A:
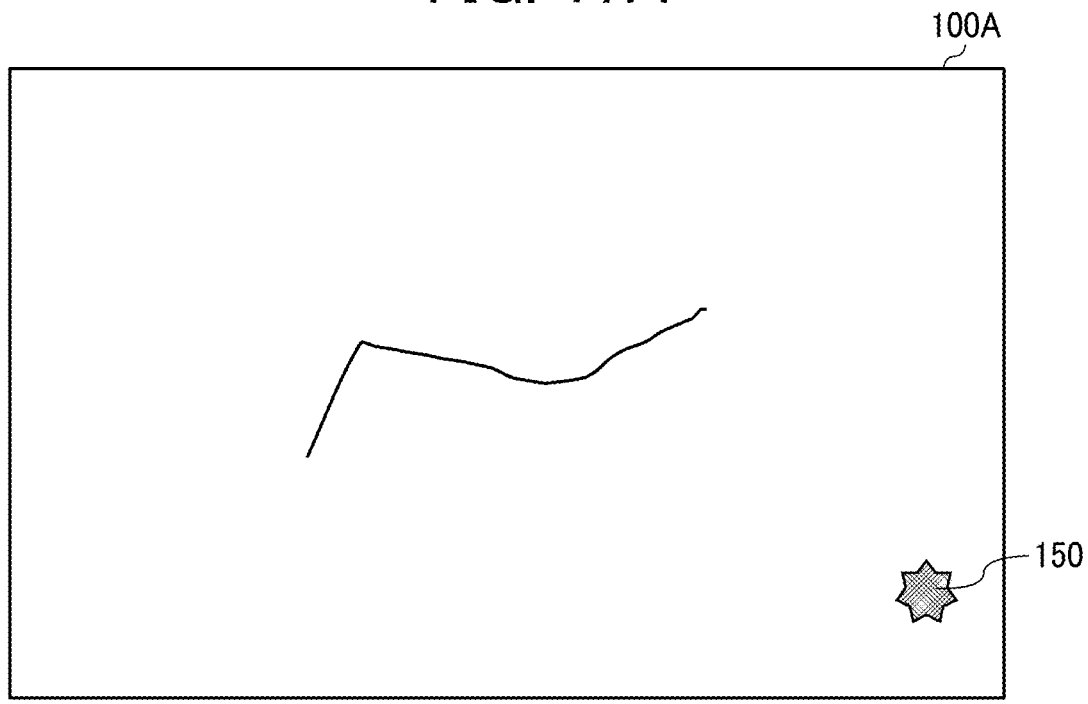
FIG. 17A is an illustration of an example of a display screen, according to an embodiment of the present disclosure.

First, the reception unit 12A of the display apparatus 10A1 receives selection of a setting button 150 displayed on the display screen 100A displayed on the display (step S51). FIG. 17A is an illustration of an example of the display screen 100A. The display screen 100A illustrated in FIG.

17a is a screen displayed on the display of the display apparatus 10A1. On the display screen 100A, at least apart of the sharing area 700 illustrated in FIG. 15 is displayed. Further, the display screen 100A includes the setting button 150, which is pressed to perform an authority setting. The reception unit 12 receives selection of the setting button 150 by an input operation by the user A on the display screen 100A, for example.

Figure 17B:
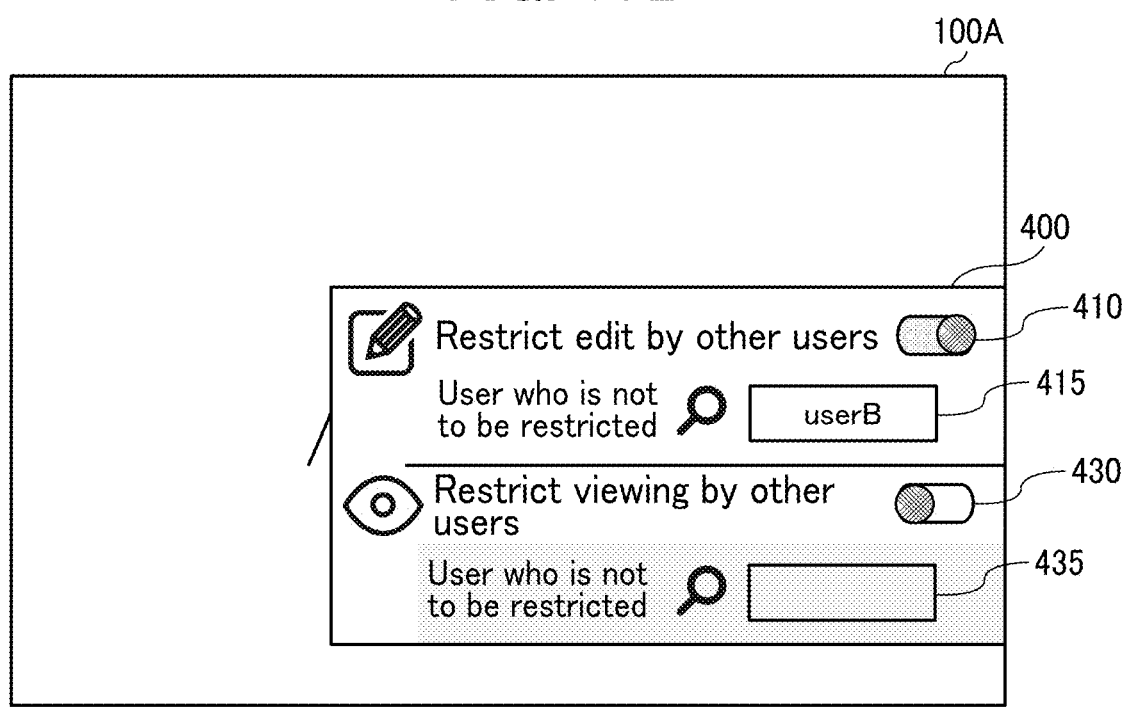
FIG. 17B is an illustration of an example of an authority setting screen, according to an embodiment of the present disclosure.

Next, in response to receiving the selection of the setting button 150 by the reception unit 12A in step S51, the display control unit 13A displays an authority setting screen 400 on the display screen 10A (step S52). FIG. 17B is an illustration of an example of the authority setting screen 400. The display screen 100A illustrated in FIG. 17B displays the authority setting screen 400 for setting the edit authority and the viewing authority based on which one or more users other than the user A are permitted to edit and view handwriting input data that input by the user A. The authority setting screen 400 includes an edit authority setting button 410 and a user information input area 415. The edit authority setting button 410 allows, when selected, the user A to set the editing authority of one or more other users for the handwriting input data that is input by the user A. The user information input area 415 is an area in which the user A enters a user who is to be permitted to edit the handwriting input data that is input by the user A. The authority setting screen 400 further includes a viewing authority setting button 430 and a user information input area 435. The viewing authority setting button 430 allows, when selected, the user A to set the viewing authority of another user for the handwriting input data that is input by the user A. The user information input area 435 is an area in which the user A enters a user who is to be permitted to view the handwriting input data that is input by the user A.

The example of FIG. 17B illustrates an example state in which users except for the user B are restricted from editing the handwriting input data input by the user A. Further, FIG. 17B illustrates an example state in which no restriction for viewing the handwriting input data that input by the user A is set, and therefore all the users are permitted to view the handwriting input data that is input by the user A. A user for whom settings of not restricting edit or viewing are configured can edit or view the handwriting input data (written content) of the user A. By contrast, a user for whom settings of restricting edit or viewing are configured cannot edit or view the handwriting input data (written content) of the user A. Thus, the user A can set authority for the user A's writing by an input operation on the authority setting screen 400.

Figure 18:
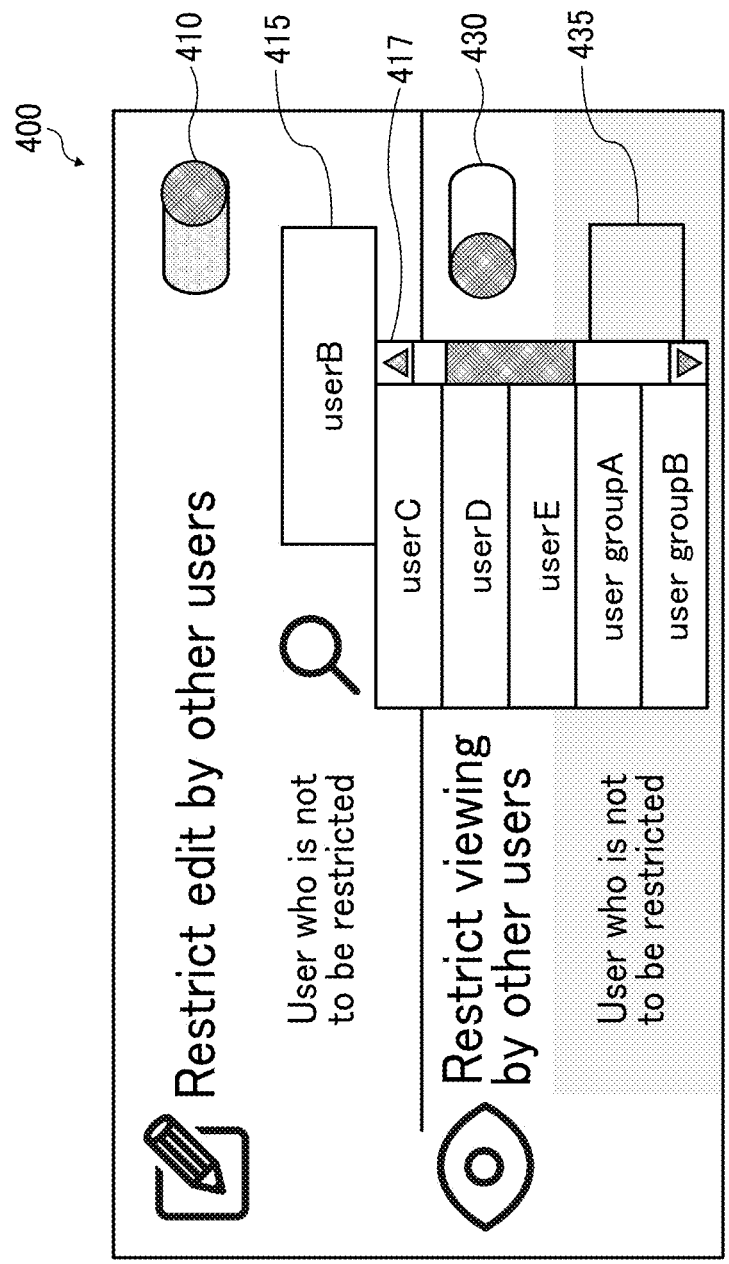
FIG. 18 is an illustration of an example of an authority setting screen, according to an embodiment of the present disclosure.

Further, as illustrated in FIG. 18, in the user information input area 415 of the authority setting screen 400, a user or a user group selected by the user A from candidates of other users or user groups each including multiple users retrieved from a list of participants of the event is set. When a particular user group is set, all users belonging to the particular user group are set user group are authorized to edit the handwriting input data that is input by the user A. In another example, in the user information input area 415, the user A directly enters a desired user name or user group name as a search key to set a particular user or user group in the user information input area 415. The above setting of the user or user group also applies to the user information input area 435. The description provided above with reference to FIG. 17B and FIG. 18 is of an example in which a user who is to be permitted to edit or view is entered in the user information input area 415 or the user information input area 435 in a state in which edit or viewing is restricted. However, in another example, a user who is to be restricted from editing or viewing is entered in a state in which edit or viewing is permitted.

Next, in response to a predetermined operation by the user A on the authority setting screen 40), the setting unit 17A sets the authority of another user for the handwriting input data input by the user A (step S53). The authority setting changed by the setting unit 17A is stored in the storage unit 1000A as the authority information in the event being conducted. Then, the setting unit 17A generates setting change data relating to the authority changed in step S53 (step S54). The setting change data is generated in the data format of json format, for example. For example, the setting data is in the format of {"authority":[{"userA":[{"edit": [null],"view":["userB", "userC"]}]}]}. Specifically, the setting unit 17A designates a user who changes the setting with "userA", and designates users who are restricted from viewing and editing with "edit" and "view" respectively.

Then, the transmission/reception unit 11A transmits the setting change data generated in step S54 to the communication management apparatus 50A (step S55). The setting change data includes an event ID identifying the event being conducted and the authority information indicating the authority that is set in step S53. Thereby, the transmission/reception unit 51 of the communication management apparatus 50A receives the setting change data transmitted by the display apparatus 10A1.

Next, the authority information management unit 56 of the communication management apparatus 50A searches the authority information management DB 5003 (see FIG. 13) using the event ID included in the setting change data received in step SSS as a search key. Thereby, the authority information management unit 56 updates the authority information associated with the same event ID as the received event ID to the received authority information (step S56). Further, the transmission/reception unit 51 transmits (transfers) the setting change data received in step S55 to the display apparatus 10B (step S57). Thereby, the transmission/reception unit 11B of the display apparatus 10B receives the setting change data transmitted by the display apparatus 10A1.

The setting unit 17B of the display apparatus 10B changes the authority setting based on the authority information included in the setting change data received in step S57 (step S58). The authority setting changed by the setting unit 17B is stored in the storage unit 1000B as the authority information in the event being conducted.

Thus, the screen sharing system 1 sets various authorities for other users using the authority setting screen 400, thereby permitting only one or more particular users to view or edit handwriting input data (written content). Further, the screen sharing system 1 uses the setting change data to share the authority information set by a certain display apparatus 10 with one or more other display apparatuses 10, thereby allowing users participating in an event to share the authority setting for the handwriting input data. Further, the screen sharing system 1 performs authority setting using the authority setting screen 400 displayed on the display screen 100, thereby enhancing user's operability in configuring authority settings. As described above, the screen sharing system 1 can share the authority information that is set in the display apparatus 10 with another display apparatus 10 via the communication management apparatus 50A. In this way, another device such as the communication management apparatus 50A may intervene between the display apparatuses.

Further, the display apparatus 10A1 can set the viewing authority and the edit authority of one or more users for the handwriting input data input by the user A, thereby preventing the one or more other users from viewing the process of writing or correction or preventing the one or more users from editing the user A's writing. For example, the user A cancels the restriction after finishing the work, thereby allowing one or more other users to view and edit the handwriting input data. Accordingly, content of the handwriting input data to be shared by one or more other users is switched flexibly.

Figure 19:
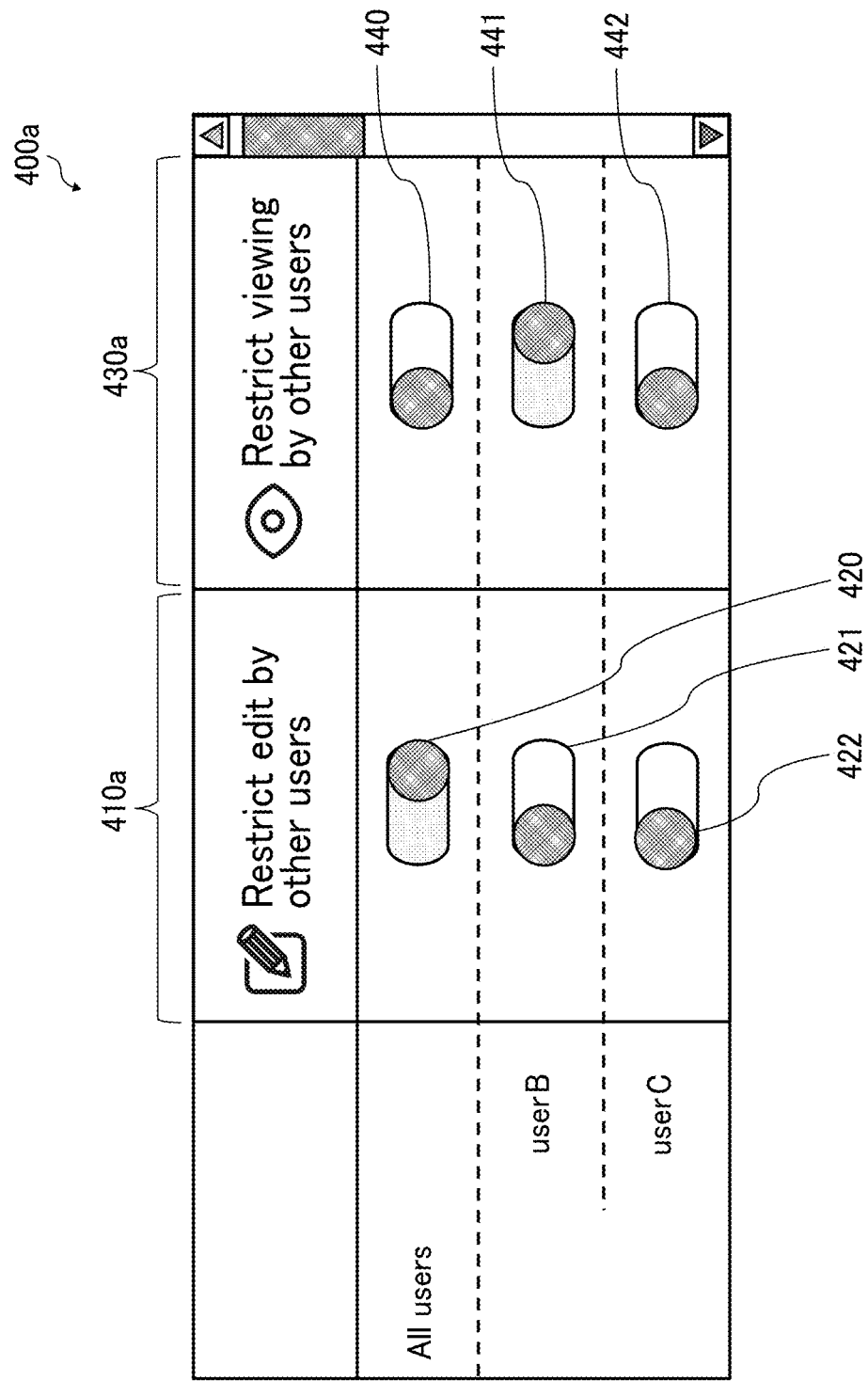
FIG. 19 is an illustration of another example of the authority setting screen, according to an embodiment of the present disclosure.

Referring to FIG. 19, an example of an authority setting screen 400, which is a variation of the authority setting screen 400, is described. FIG. 19 is an illustration of an example of the authority setting screen 400a. The authority setting screen 400a illustrated in FIG. 19 is a screen that allows the user A to set, for each user, authority to edit or view handwriting input data by the user A. The authority setting screen 400a includes an edit authority setting area 410a for setting edit authority of other users for handwriting input data input by the user A and a viewing authority setting area 430a for setting viewing authority of other users for handwriting input data input by the user A. The edit authority setting area 410a includes a batch setting button 420, an individual setting button 421, and an individual setting button 422. The batch setting button 420 allows, when selected, the user A to set edit authority for all users at once. The individual setting button 421 and the individual setting button 422 are buttons, each allowing, when selected, the user A to set edit authority for each user. The edit authority setting area 430a includes a batch setting button 440, an individual setting button 441, and an individual setting button 442. The batch setting button 440 allows, when selected, the user A to set viewing authority for all users at once. The individual setting button 441 and the individual setting button 442 are buttons, each allowing, when selected, the user A to set edit authority for each user. FIG. 19 illustrates an example state in which all the users are restricted from editing the handwriting input data that is input by the user A. Further, FIG. 19 illustrates an example state in which only the user B is restricted from viewing the handwriting input data that is input by the user A. The authority setting screen 400a is displayed on the display screen 100A in response to the user A's pressing of the setting button 150 on the display screen 100A illustrated in FIG. 17A, in substantially the same manner as the authority setting screen 400.

In a case that there is a main user such as an administrator or an owner of an event among a plurality of users who participate in the event, only the main user may refer to the authority setting screen 400 and the authority setting screen 400a, such that the main user sets various authorities. In this case, for example, in an event such as a class in which a teacher as the main user and multiple students as other users participate, the teacher can configure settings such that the students are restricted from viewing and editing. In other words, while editing and viewing are restricted, content written by any student are not shared by other students, and only the teacher can check the written content. Thus, for example, the teacher as the main user cancels the restriction of viewing to allow the students to share and check their written contents, while maintaining the restriction on edit to prevent inadvertent edit by other students.

Display of Handwriting Input Data:

Referring to FIG. 20 to FIGS. 27A and 27B, an operation of displaying handwriting input data input by another user on a display screen according to the viewing authority of each user. FIG. 20 is a flowchart illustrating an example of an operation of display handwriting input data that is input by another user. A description provided with reference to FIG. 20 is of an example in which the display apparatus 10C used by the user C receives handwriting input data that is input to the display apparatus 10A1 used by the user A. However, such a combination of the display apparatus 10C and the display apparatus 10A1 is merely one example of the display apparatuses exchanging the handwriting input data therebetween. The same or substantially the same operation is performed in any other combinations of the display apparatuses 10 used by the users participating the event.

Figure 21A:
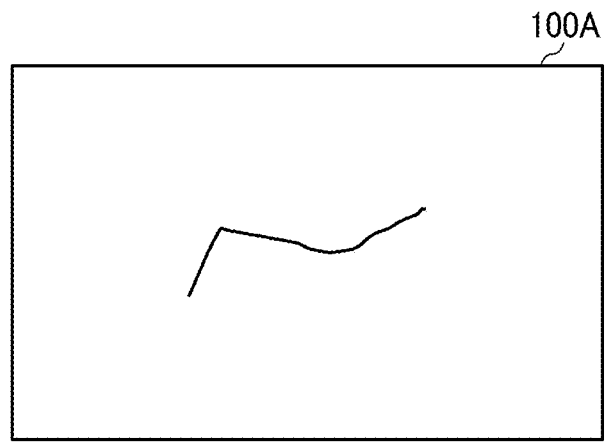
FIG. 21A, FIG. 21B, and FIG. 21C are illustrations of display screens displayed by the plurality of display apparatuses respectively, according to an embodiment of the present disclosure.

First, the transmission/reception unit 11C of the display apparatus 10C receives handwriting input data transmitted by the display apparatus 10A1 (step S71). This handwriting input data is handwriting input data that is input by the user A. As illustrated in FIG. 21A, the handwriting input data that is input by the user A is displayed on the display screen 100A of the display apparatus 10A1.

Next, the determination unit 14C determines whether the viewing authority is assigned for the handwriting input data received in step S71 (step S72). Specifically, the determination unit 14C refers to the authority information set by the setting unit 17C, to determine whether the user C has the viewing authority for the user A who has input the received handwriting input data. When the determination unit 14C determines that the user C has the viewing authority for the received handwriting input data (YES in step S72), the operation proceeds to step S73. Then, the display control unit 13C displays the received handwriting input data on the display screen 100C (step S73).

By contrast, when the determination unit 14C determines that the user C does not have viewing authority for the received handwriting input data (NO in step S72), the operation proceeds to step S74. Then, the display control unit 13C does not display the received handwriting input data on the display screen 100C, thereby restricting viewing the handwriting input data (step S74). Further, the display control unit 13C displays, on the display screen 100C, a viewing restriction notification indicating that viewing of the handwriting input data that is input by the user A is restricted (step S75).

Figure 21B:
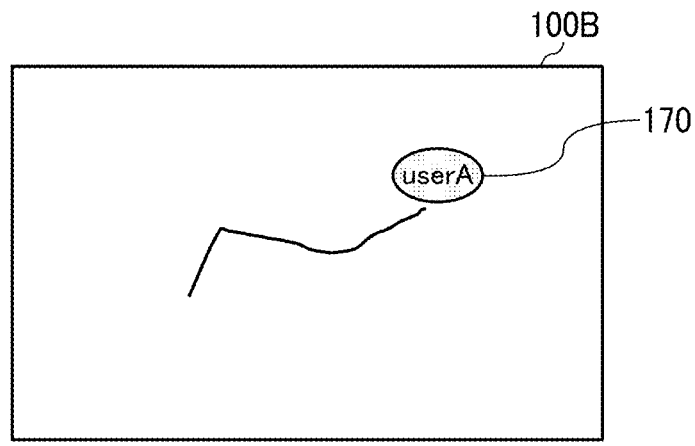

FIG. 21B illustrates the display screen 100B displayed on the display apparatus 10B as an example of a case in which the viewing authority for the handwriting input data that is input by the user A is assigned. Since the user B has the viewing authority for the handwriting input data that is input by the user A, the display screen 100B illustrated in FIG. 21B displays the same handwriting input data as displayed on the display screen 100A illustrated in FIG. 21A. Further, the display screen 10B displays a user indication image 170 identifying a user who has input the displayed handwriting input data together with the handwriting input data.

Figure 21C:
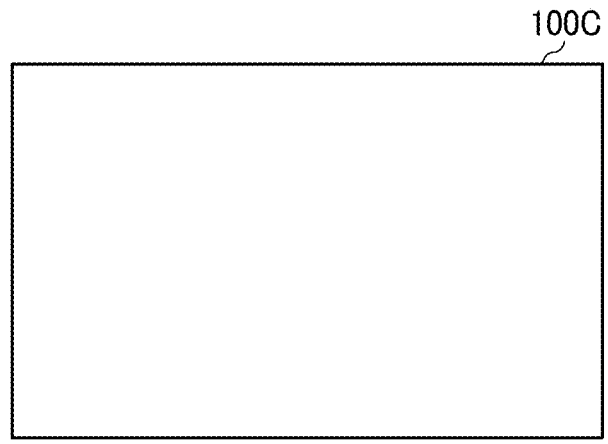

FIG. 21C illustrates the display screen 100C displayed on the display apparatus 10C as an example of a case in which the user C does not have viewing authority for the handwriting input data that is input. Since the user C does not have the viewing authority for the handwriting input data that is input by the user A, the handwriting input data displayed on the display screen 100A as illustrated in FIG. 21A is not displayed on the display screen 100C illustrated in FIG. 21C. Thus, the userC is restricted from viewing the handwriting input data input data that is input by the user A.

As described above, in response to receiving handwriting input data that is input by another display apparatus 10, the display apparatus 10 checks whether the viewing authority for the received handwriting input data is assigned, and displays the handwriting input data on the display screen only when the viewing authority is assigned. Thus, the screen sharing system 1 allows a user to prevent another user who does not have the viewing authority from viewing the user's own written content. Further, when the display apparatus 10 does not have the viewing authority for the received handwriting input data, the display apparatus 10 displays the viewing restriction notification described below on the display screen.

Figure 22A:
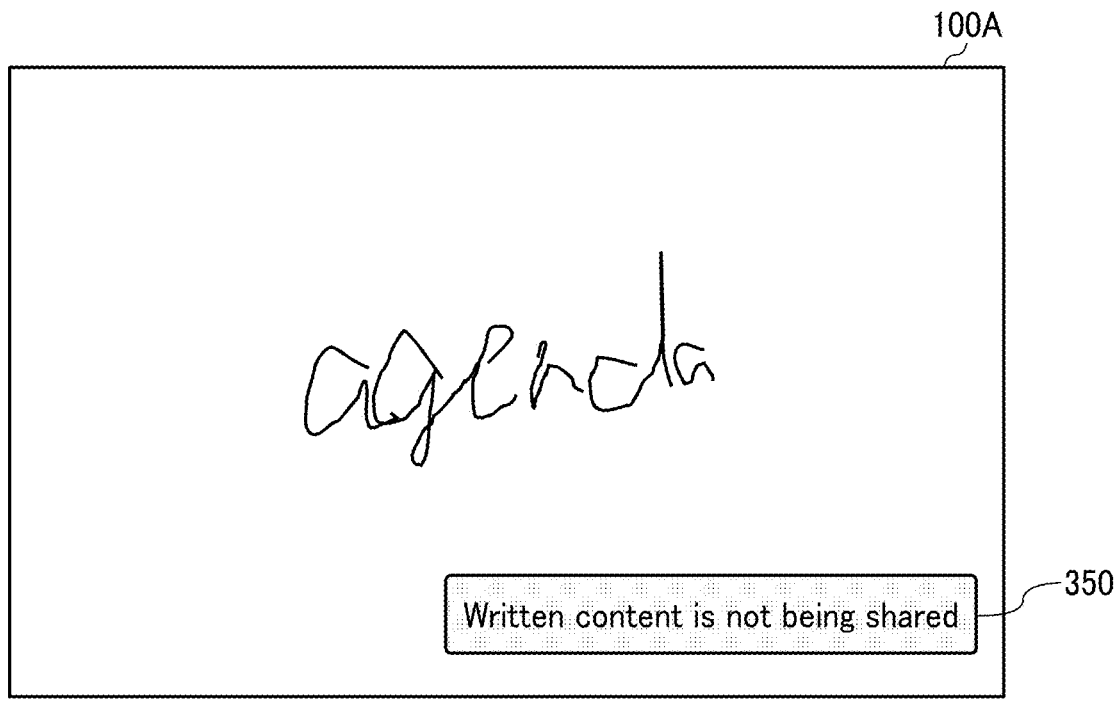
FIG. 22A is an illustration of an example of a non-sharing notification, according to an embodiment of the present disclosure.
Figure 22B:
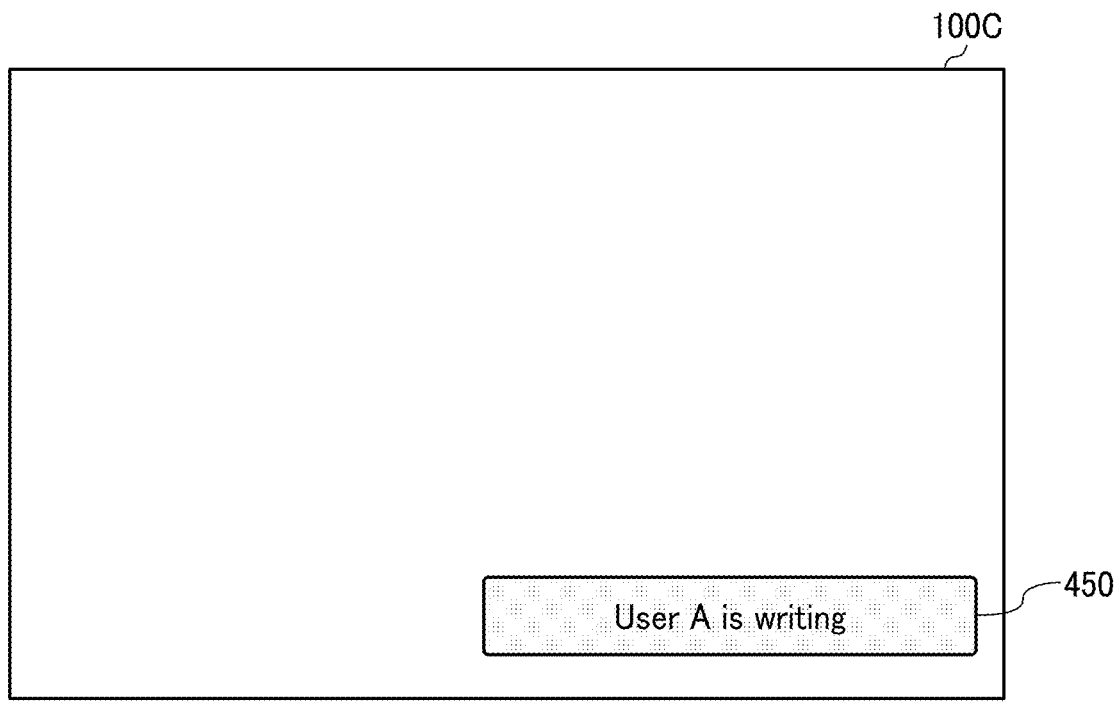
FIG. 22B is an illustration of an example of a viewing restriction notification, according to an embodiment of the present disclosure.
Figure 24:
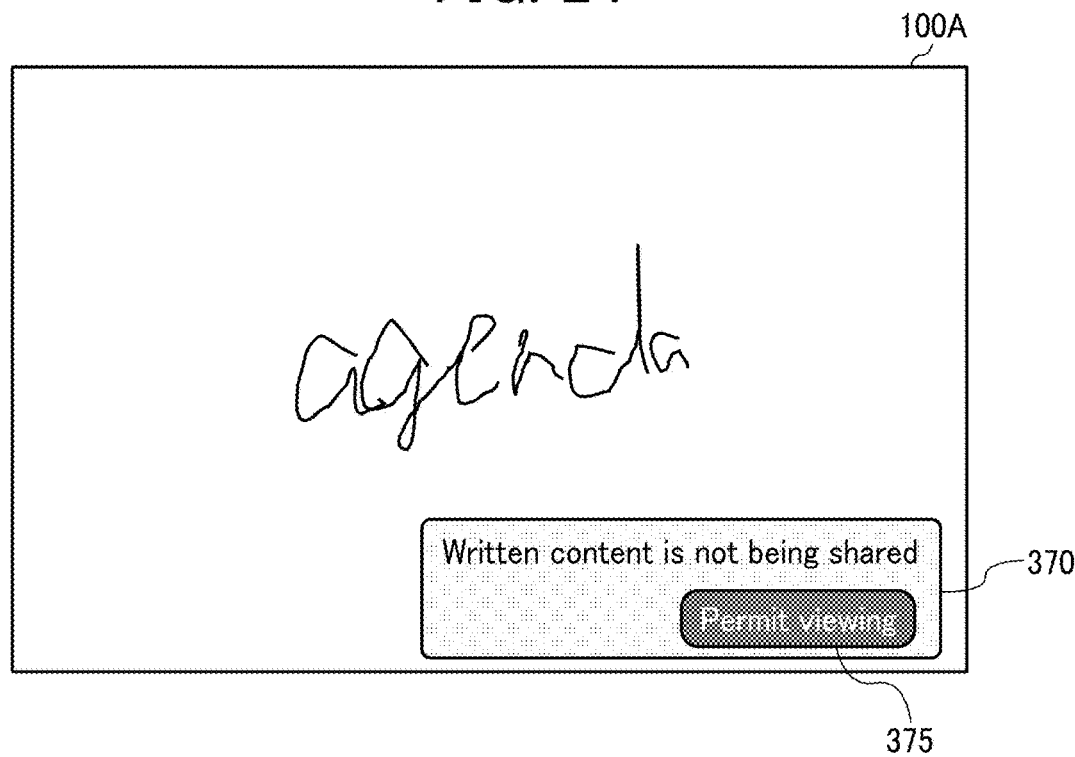
FIG. 24 is an illustration of another example of the non-sharing notification, according to an embodiment of the present disclosure.

Referring to FIGS. 22A to 22B to FIG. 24, notifications to be displayed on the display screen in a case that viewing of handwriting input data is restricted is described. FIG. 22A is an illustration of an example of the non-sharing notification. FIG. 22B is an illustration of an example of the viewing restriction notification.

FIG. 22A illustrates the display screen 100A displayed on the display apparatus 10A1 as an example of a display screen when the user A restricts other users (other display apparatuses) from viewing handwriting input data that is input. The display screen 100A illustrated in FIG. 22A includes a non-sharing notification 350 indicating that the handwriting input data that is input by the user A is not shared by other users. The non-sharing notification unit 19A of the display apparatus 10A1 displays the non-sharing notification 350 on the display screen 100A when any of other users participating in an event does not have viewing authority for the handwriting input data that is input.

FIG. 22B illustrates the display screen 100C displayed on the display apparatus 10C as an example of a display screen displayed when the user C is restricted from viewing handwriting input data that is input by the user A. The display screen 100C illustrated in FIG. 22B includes a viewing restriction notification 450 indicating that viewing of the handwriting input data that is input by the user A is restricted. This viewing restriction notification 450 is displayed on the display screen 100C of the display apparatus 10C in the process of step S75, for example.

In a case that written content written by another user is not shared because the viewing authority is not assigned, a user (e.g., the user A) who inputs the content does not know whether the written content is shared, while a user (e.g., the user C) who is restricted from viewing does not know what kind of work is being performed by another user. To address such as issue, the screen sharing system 1 displays, on the display screen (e.g., the display screen 10A) of a user who restricts other users from viewing the handwriting input data input by the user, a notification indicating that the handwriting input data (written content) is not shared by other users. Further, the screen sharing system 1 displays, on the display screen (e.g., the display screen 100C) of a user who is restricted from viewing, a notification indicating that another user is inputting (writing) handwriting input data. Thus, the screen sharing system 1 allows uses participating in an event to share the status of an operation occurring in the event even when viewing is restricted between the users.

Figure 23:
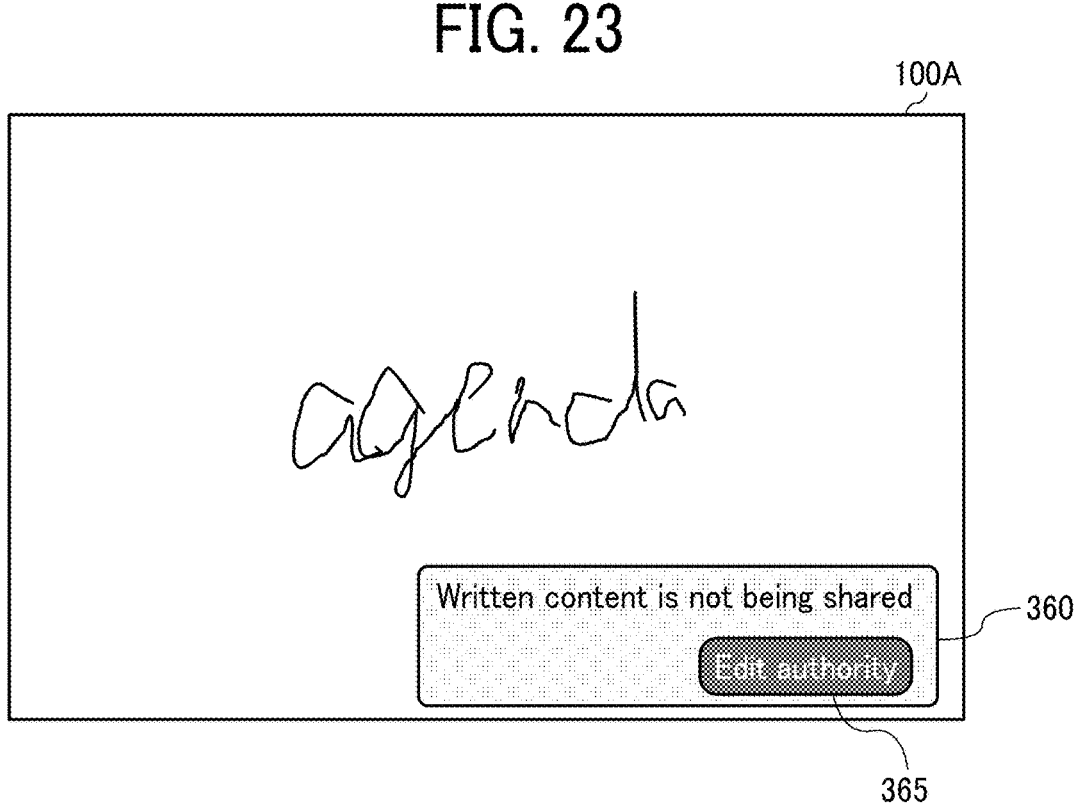
FIG. 23 is an illustration of another example of the non-sharing notification, according to an embodiment of the present disclosure.

FIG. 23 and FIG. 24 are each an illustration of another example of the non-sharing notification displayed on the display screen 100A. A non-sharing notification 360 displayed on the display screen 100A illustrated in FIG. 23 includes an authority edit button 365, which, when selected (pressed), allow the user A to edit the authority of another user for the handwriting input data that is input by the user A. The non-sharing notification unit 19A of the display apparatus 10A1 displays the non-sharing notification 360 on the display screen 100A when any of other users participating in an event does not have the viewing authority for the handwriting input data that is input. In response to pressing of the authority edit button 365 by the user A, the display control unit 13A of the display apparatus 10A1 displays the authority setting screen 400 illustrated in, for example. FIG. 18. Thus, the display apparatus 10A1 allows the user A to change the authority of another user.

The non-sharing notification 370 displayed on the display screen 100A illustrated in FIG. 24 includes a viewing permission button 375, which, when selected (pressed), allow the user A to permit another user who is restricted from viewing to view. The non-sharing notification unit 19A of the display apparatus 10A1 displays the non-sharing notification 370 on the display screen 100A when any of other users participating in an event does not have the viewing authority for the handwriting input data that is input. In response to pressing of the viewing permission button 375 by the user A, the setting unit 17A of the display apparatus 10A1 changes the viewing authority so that viewing is permitted to other users who are restricted from viewing the handwriting input data that is input by the user A. Compared with the non-sharing notification 360 illustrated in FIG. 23, the non-sharing notification 370 illustrated in FIG. 24 allows the user to change the viewing authority directly on the non-sharing notification 370 without performing authority setting processing using the authority setting screen 400, for example, thereby simplifying an operation by the user A.

Figure 25:
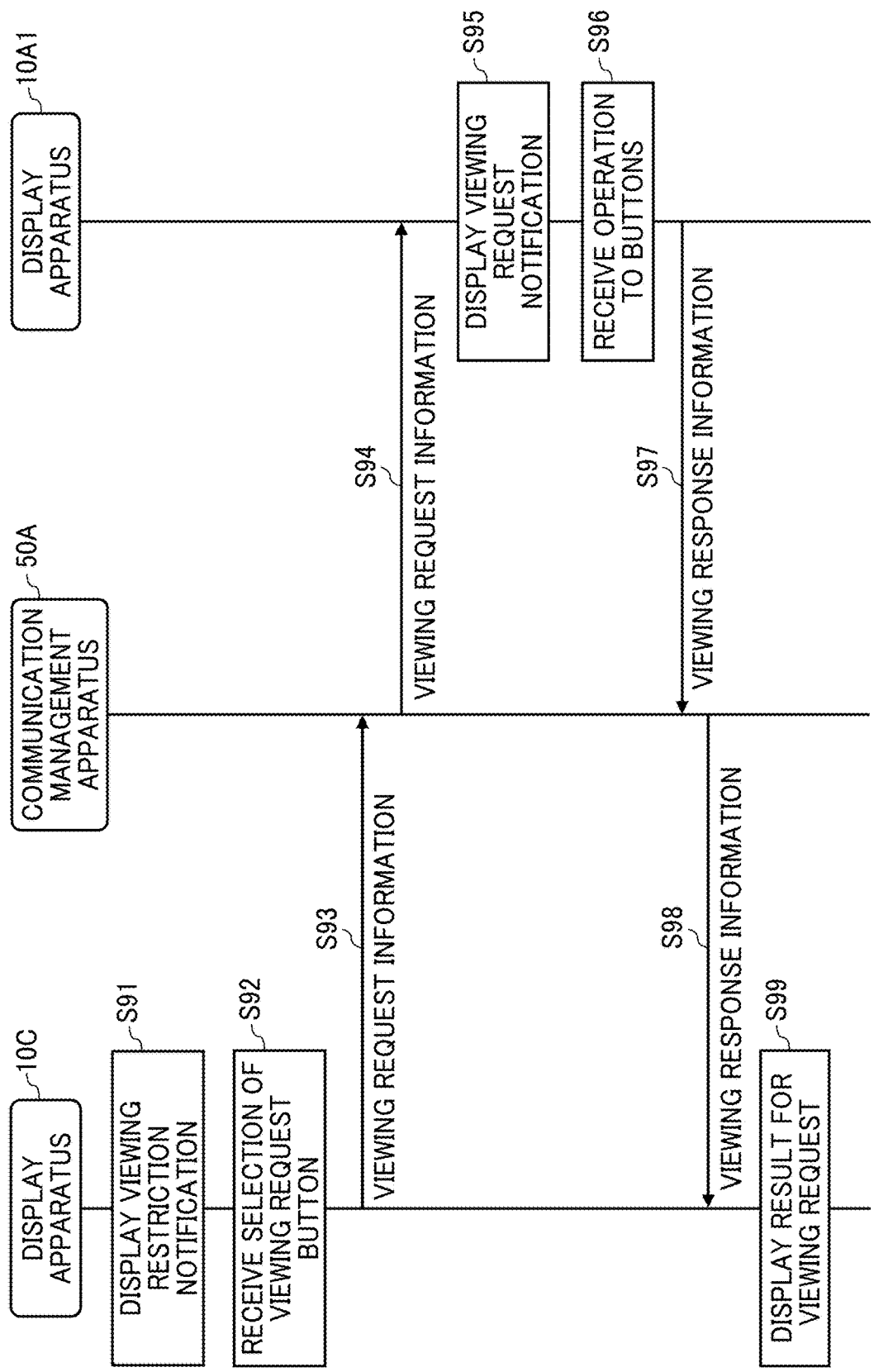
FIG. 25 is a sequence diagram illustrating an example of an operation of requesting viewing to another user, according to an embodiment of the present disclosure.
Figure 26A:
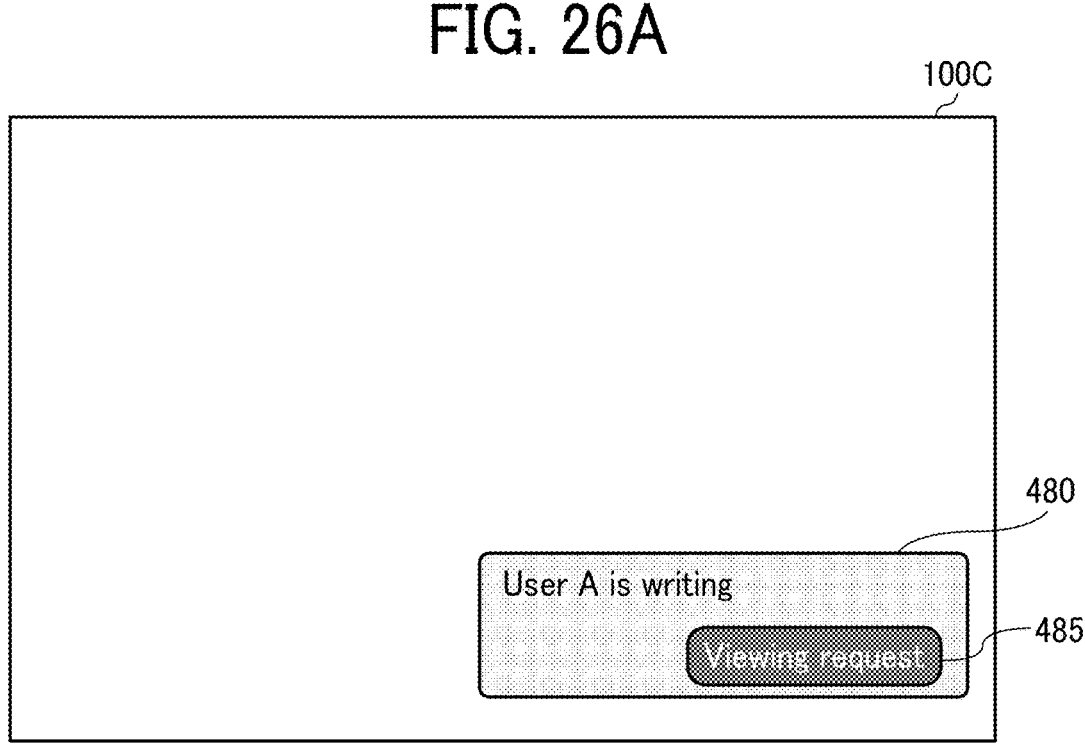
FIG. 26A is an illustration of another example of the viewing restriction notification, according to an embodiment of the present disclosure.
Figure 26B:
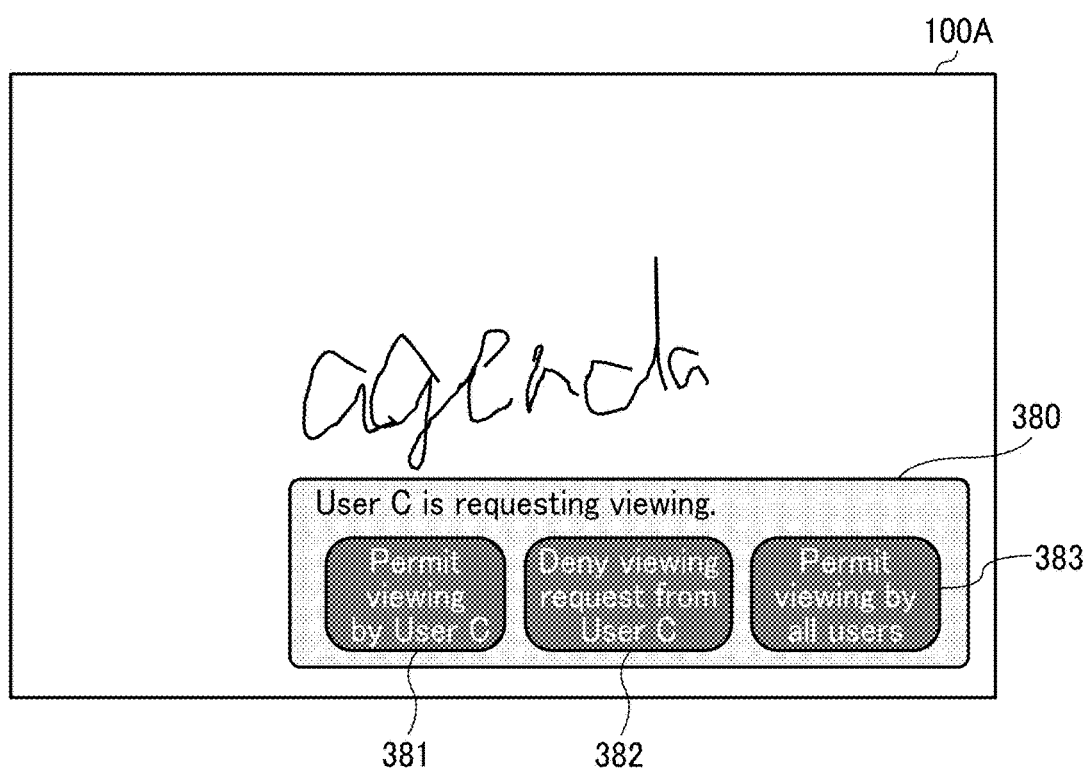
FIG. 26B is an illustration of an example of a viewing request notification, according to an embodiment of the present disclosure.

Operation of Requesting Viewing:

Referring to FIG. 25 and FIGS. 26A and 26B, an operation of requesting viewing of handwriting input data for which viewing is restricted is described. FIG. 25 is a sequence diagram illustrating an example of an operation of requesting viewing to another user. A description provided with reference to FIG. 25 is of an example in which the display apparatus 10C used by the user C who is restricted from viewing handwriting input data that is input by the user A requests the display apparatus 10A1 used by the user A for viewing. However, such a combination of the display apparatus 10C and the display apparatus 10A1 is merely one example of the display apparatuses exchanging the viewing request therebetween. The same or substantially the same operation is performed in any other combinations of the display apparatuses 10 used by the users participating the event.

The display control unit 13C of the display apparatus 10C displays a viewing restriction notification 480 on the display screen 100C (step S91). FIG. 26A is an illustration of an example of the viewing restriction notification 480. The viewing restriction notification 480 illustrated in FIG. 26A includes a viewing request button 485, which, when selected (pressed), allows the user C to request viewing of the handwriting input data for which viewing is restricted.

Next, the reception unit 12C receives selection of the viewing request button 485 included in the viewing restriction notification 480 in response to an input operation by the user C (step S92). The transmission/reception unit 11C transmits, to the communication management apparatus 50A, viewing request information indicating a request to view handwriting input data that is input the user A for which the viewing is restricted (step S93). This viewing request information includes a user ID of a user as a destination user who is to receive the viewing request. In this case, the transmission/reception unit 11C transmits the viewing request information including the user ID of the user A. Thereby, the transmission/reception unit 51 of the communication management apparatus 50A receives the viewing request information transmitted by the display apparatus 10C. Then, the transmission/reception unit 51 of the communication management apparatus 50A transmits (transfers) the viewing request information transmitted by the display apparatus 10C to the display apparatus 10A1 used by the user A as the request destination of the viewing request (step S94). Thereby, the transmission/reception unit 11A of the display apparatus 10A1 receives the viewing request information transmitted by the display apparatus 10C as a request source.

In response to receiving the viewing request information in step S94, the viewing request notification unit 21A of the display apparatus 10A1 displays a viewing request notification 380 indicating that the viewing request has been made by the user C on the display screen 100A (step S95).

Subsequently, the reception unit 12A of the display apparatus 10A1 receives an operation to buttons (step S96). FIG. 26B is an illustration of an example of the viewing request notification 380. The viewing request notification 380 illustrated in FIG. 26B includes an individual viewing permission button 381, an individual viewing denial button 382, and a batch viewing permission button 383. The individual viewing permission button 381 allows, when selected (pressed), the user A to permit viewing by the user C as the request sender. The batch viewing permission button 383 allows, when selected (pressed), the user A to permit viewing by all the users. In response to pressing of the individual viewing permission button 381 or the batch viewing permission button 383 by the user A, the setting unit 17A of the display apparatus 10A1 changes the viewing authority so that a particular user (e.g., the user C) corresponding to the selected button or all the users are permitted to view the handwriting input data that is input by the user A. In another example, the display apparatus 10A1 is configured to display the authority setting screen 400 or the authority setting screen 400a in response to pressing of the individual viewing permission button 381 or the batch viewing permission button 383 by the user A.

By contrast, in response to pressing of the individual viewing denial button 382 by the user A, the setting unit 17A of the display apparatus 10A1 rejects viewing of handwriting input data that is input by the user A by a particular user (e.g., the user C) corresponding to the selected button, and maintains the viewing authority unchanged. In this case, in one example, the user A determines whether to press the individual viewing denial button 382, e.g., whether to reject the viewing request made by another user (e.g., the user C) in view of content of handwriting input that is input by the user A. Further, in another example, the user A determines whether to reject the viewing request in view of an attribute of another user who has sent the viewing request and content of handwritten strokes. Examples of the attribute of another user include, but are not limited to, a department to which another user belongs, work in which another user is charge, and a job title of another user. In still another example, instead of or in addition to the determination by the user A, the determination unit 14A of the display apparatus 10A1 determines whether to reject the viewing request based on the attribute of another user who has sent the viewing request and content of a handwritten stroke. Examples of the attribute of another user include, but are not limited to, a department to which another user belongs, work in which another user is charge, and a job title of another user. The edit restriction unit 18A may reject viewing by another user who has made the viewing based on the determination result. Based on individual viewing rejection information generated by the individual viewing denial button 382 being pressed according to a determination criterion as described above, the setting unit 17A of the display apparatus 10A1 rejects viewing of handwriting input data that is input by the user A by a particular user (e.g., the user C) corresponding to the selected button, and maintains the viewing authority unchanged. When the individual viewing denial button 382 is pressed, a transition to the authority setting screen 400 or the authority setting screen 400a may be omitted.

Referring again to FIG. 25, the transmission/reception unit 11A of the display apparatus 10A1 transmits viewing response information as a response to the viewing request information received in step S94 to the communication management apparatus 50A (step S97). Thereby, the transmission/reception unit 51 of the communication management apparatus 50A receives the viewing response information transmitted by the display apparatus 10A1. Then, the transmission/reception unit 51 transmits the viewing response information received in step S97 to the display apparatus 10C (step S98). Thereby, the transmission/reception unit 11C of the display apparatus 10C receives the viewing response information transmitted by the communication management apparatus 50A. Subsequently, the display control unit 13C of the display apparatus 10C displays a result for the viewing request (step S99). Thus, the display apparatus 10C notifies the user C of the result for the viewing request.

Figure 27A:
FIG. 27A is an illustration of an example of a viewing permission notification, according to an embodiment of the present disclosure.
Figure 27B:
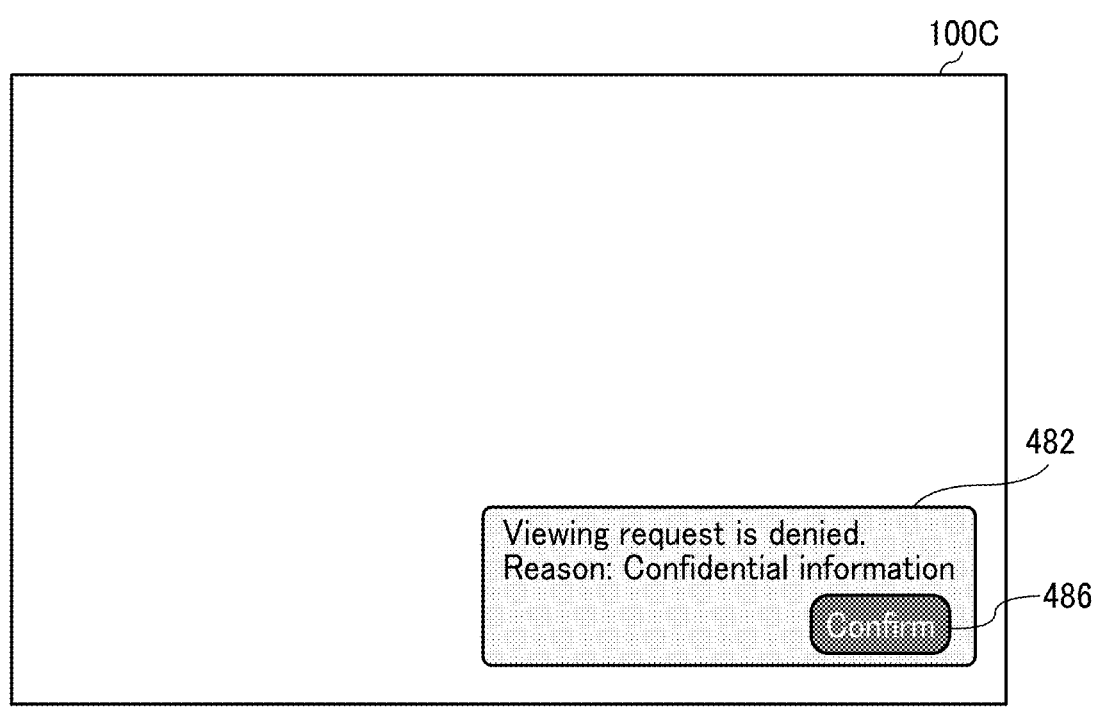
FIG. 27B is an illustration of an example of a viewing denial notification, according to an embodiment of the present disclosure.

FIG. 27A is an illustration of an example of a viewing permission notification 481. The viewing permission notification 481 illustrated in FIG. 27A includes a confirmation button 486, which, when selected, allows a user (e.g., the user C) as the request sender to confirm a notification indicating that the user C is permitted to view the handwriting content. FIG. 27B is an illustration of an example of a viewing denial notification 482. The viewing denial notification 482 illustrated in FIG. 27B includes a confirmation button 486, which, when selected, allows a user (e.g., the user C) as the request sender to confirm a notification indicating that the viewing by the user C as the request sender is rejected.

Figure 28:
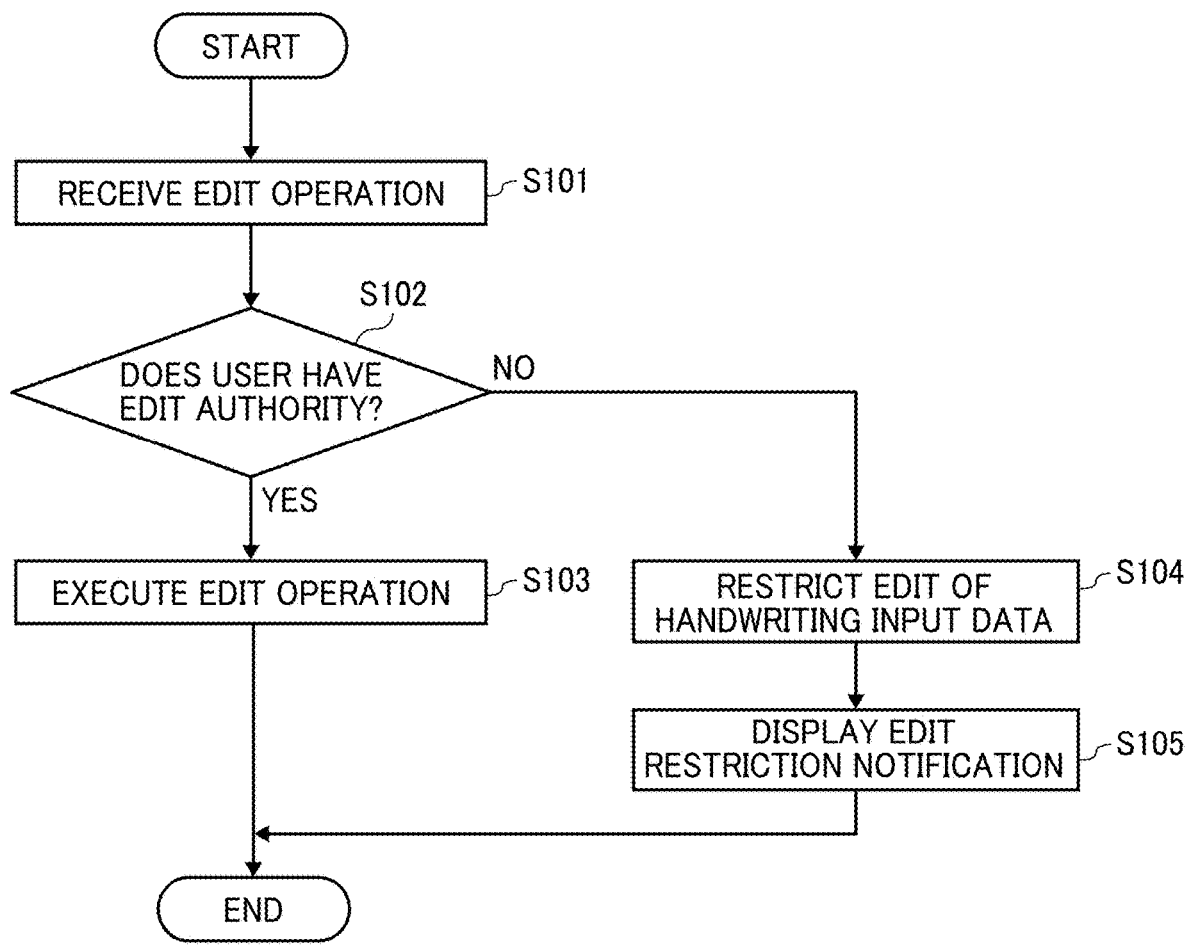
FIG. 28 is a flowchart illustrating an example of an operation of editing handwriting input data that is input by another user, according to an embodiment of the present disclosure.

Edit of Handwriting Input Data:

Referring to FIG. 28 to FIGS. 32A and 32B, an operation of editing handwriting input data input by another user on a display screen according to the viewing authority of each user. FIG. 28 is a flowchart illustrating an example of an operation of editing handwriting input data that is input by another user. A description provided with reference to FIG. 28 is of an example in which handwriting input data that is input to the display apparatus 10A1 used by the user A is edited at the display apparatus 10B used by the user B. However, such a combination of the display apparatus 10B and the display apparatus 10A1 is merely one example of the display apparatuses between which editing of handwriting input data is performed. The same or substantially the same operation is performed in any other combinations of the display apparatuses 10 used by the users participating the event.

First, the reception unit 12B of the display apparatus 10B receives an edit operation on handwriting input data displayed on the display screen 100B according to an input operation on the display screen 100B by the user B (step S101).

Next, the determination unit 14B determines whether the edit authority is assigned for the handwriting input data to be edited according to the edit operation received in step S101 (step S102). Specifically, the determination unit 14C refers to the authority information set by the setting unit 17C, to determine whether the user B has the edit authority for the user A who has input the handwriting input data to be edited. When the determination unit 14B determines that the user B has the edit authority for the handwriting input data to be edited (YES in step S102), the operation proceeds to step S103. Then, the display control unit 13B performs an edit operation on the handwriting input data, and displays the edited handwriting input data on the display screen 100B (step S103).

By contrast, when the determination unit 14B determines that the user B does not have the edit authority for the handwriting input data to be edited (NO in step S102), the operation proceeds to step S104. In step S104, the edit restriction unit 18B restricts editing of the handwriting input data to be edited. Further, the edit restriction unit 18B displays, on the display screen 100B, an edit restriction notification indicating that edit of the handwriting input data that is input by the user A is restricted (step S105).

As described above, in response to receiving an editing operation on the displayed handwriting input data, the display apparatus 10 checks whether the edit authority for the handwriting input data to be edited is assigned, and executes the editing operation only when the edit authority is assigned. Thus, the screen sharing system 1 restricts a user who does not have edit authority from editing handwriting input data (written content), thereby preventing handwriting input data from inadvertently edited by the display apparatus 10 for which the edit authority is not set. Further, when the display apparatus 10 does not have the edit authority for the received handwriting input data, the display apparatus 10 displays an edit restriction notification described below on the display screen.

Figure 29:
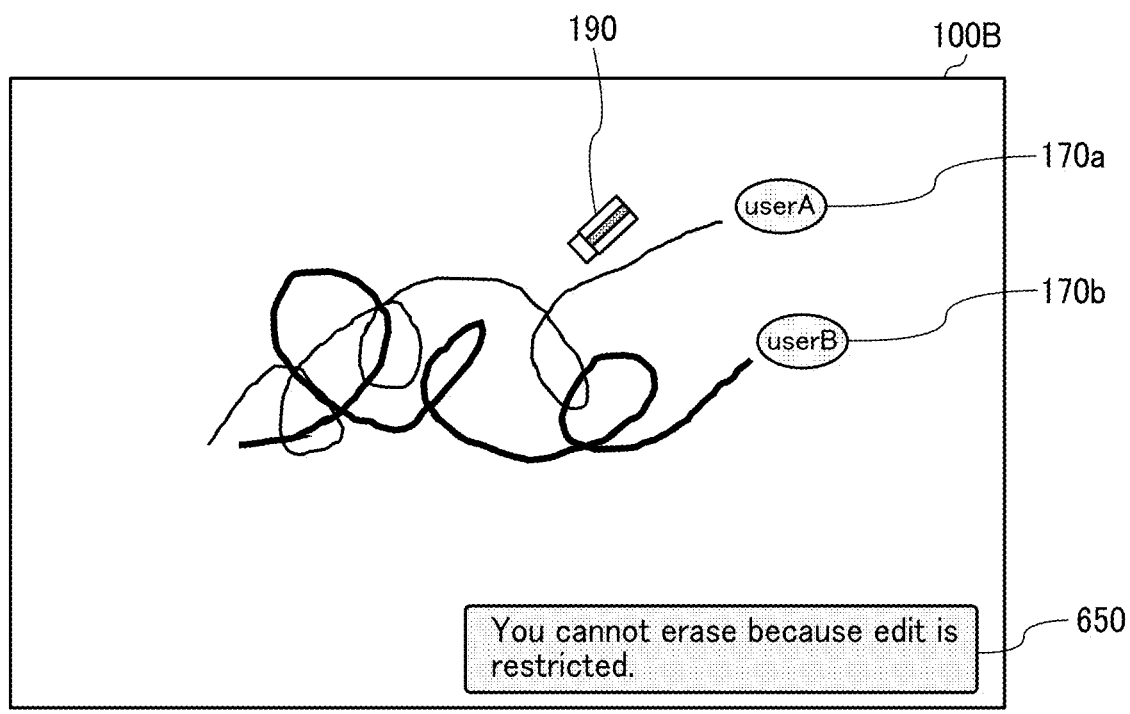
FIG. 29 is an illustration of an example of an edit restriction notification, according to an embodiment of the present disclosure.

FIG. 29 is an illustration of an example of the edit restriction notification. FIG. 29 illustrates the display screen 100B displayed on the display apparatus 10B as an example of a display screen displayed when the user B is restricted from editing handwriting input data that is input by the user A. The display screen 100B illustrated in FIG. 29 includes a user indication image 170a and a user indication image 170b, each identifying a user who has input handwriting input data being displayed, and an edit tool 190 used for editing the handwriting input data. The edit tool 190 is, for example, an erasing tool used when erasing handwriting input data. The display screen 100B illustrated in FIG. 29 further includes an edit restriction notification 650 indicating that edit of the handwriting input data that is input by the user A is restricted. In the example of FIG. 29, the edit restriction notification 650 is displayed on the display screen 100B of the display apparatus OB, for example, when the user B tries to erase the handwriting input data that is input by the user A using the edit tool 190. Thus, the display apparatus 10B displays the edit restriction notification 650 when the user B does not have the edit authority so that the user B recognizes a reason why the user B cannot edit the handwriting input data.

Operation of Requesting Edit Authority:

Referring to FIG. 30 to FIGS. 32A and 32B, an operation of requesting edit authority for handwriting input data for which edit is restricted is described. FIG. 30 is a sequence diagram illustrating an example of an operation of requesting edit authority to another user. A description provided with reference to FIG. 30 is of an example in which the display apparatus 10B used by the user B who is restricted from editing handwriting input data that is input by the user A requests the display apparatus 10A1 used by the user A for edit authority. However, such a combination of the display apparatus 10B and the display apparatus 10A1 is merely one example of the display apparatuses exchanging the request for edit authority therebetween. The same or substantially the same operation is performed in any other combinations of the display apparatuses 10 used by the users participating the event.

Figure 31A:
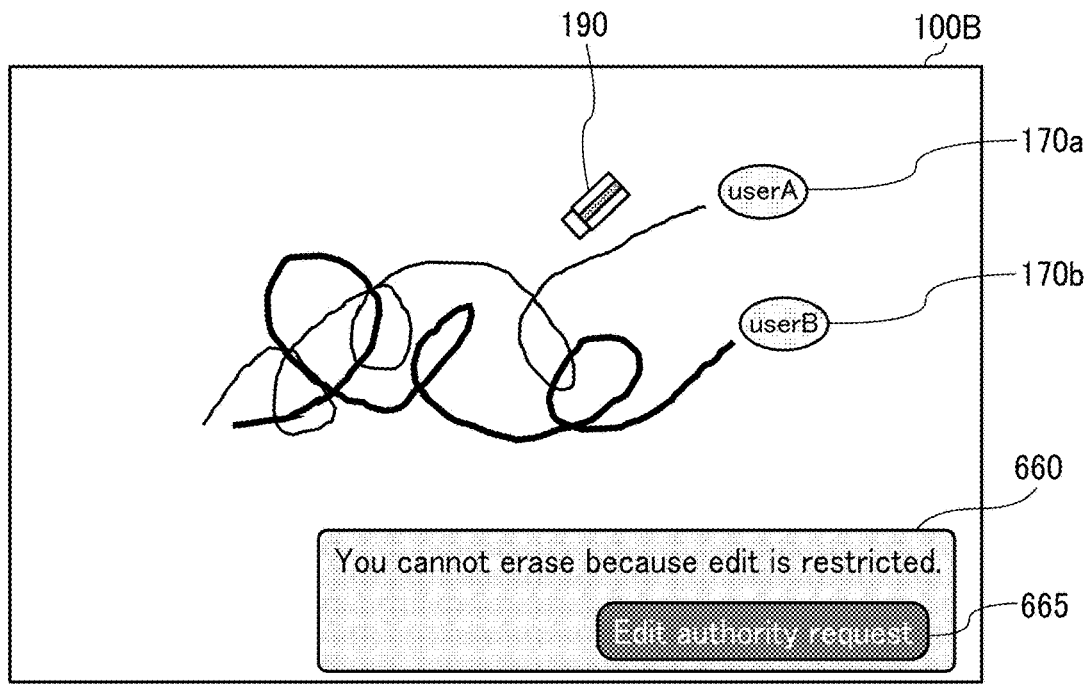
FIG. 31A is an illustration of another example of the edit restriction notification, according to an embodiment of the present disclosure.

The edit restriction unit 18B of the display apparatus 10B displays an edit restriction notification 660 on the display screen 100B (step S111). FIG. 31A is an illustration of an example of the edit restriction notification 660. The edit restriction notification 660 illustrated in FIG. 31A includes an edit authority request button 665, which, when selected (pressed), allows the user B to request edit authority for handwriting input data of which editing is restricted.

Next, the reception unit 12B receives selection of the edit authority request button 665 included in the edit restriction notification 660 in response to an input operation by the user B (step S112). The transmission/reception unit 11B transmits, to the communication management apparatus 50A, edit authority request information indicating a request for edit authority to handwriting input data that is input the user A for which editing is restricted (step S113). This edit authority request information includes a user ID of a user as a destination user who is to receive the edit authority request information. In this case, the transmission/reception unit 11B transmits the edit authority request information including the user ID of the user A. Thereby, the transmission/reception unit 51 of the communication management apparatus 50A receives the edit authority request information transmitted by the display apparatus 10B. Then, the transmission/reception unit 51 of the communication management apparatus 50A transmits (transfers) the edit authority request information transmitted by the display apparatus LOB to the display apparatus 10A1 used by the user A as the request destination of the edit authority request information (step S114). Thereby, the transmission/reception unit 11A of the display apparatus 10A1 receives the edit authority request information transmitted by the display apparatus 10B as a request source.

In response to receiving the edit authority request information in step S114, the edit authority request notification unit 22A of the display apparatus 10A1 displays an edit authority request notification 560 indicating that the edit authority is requested from the user B on the display screen 100A (step S115).

Figure 31B:
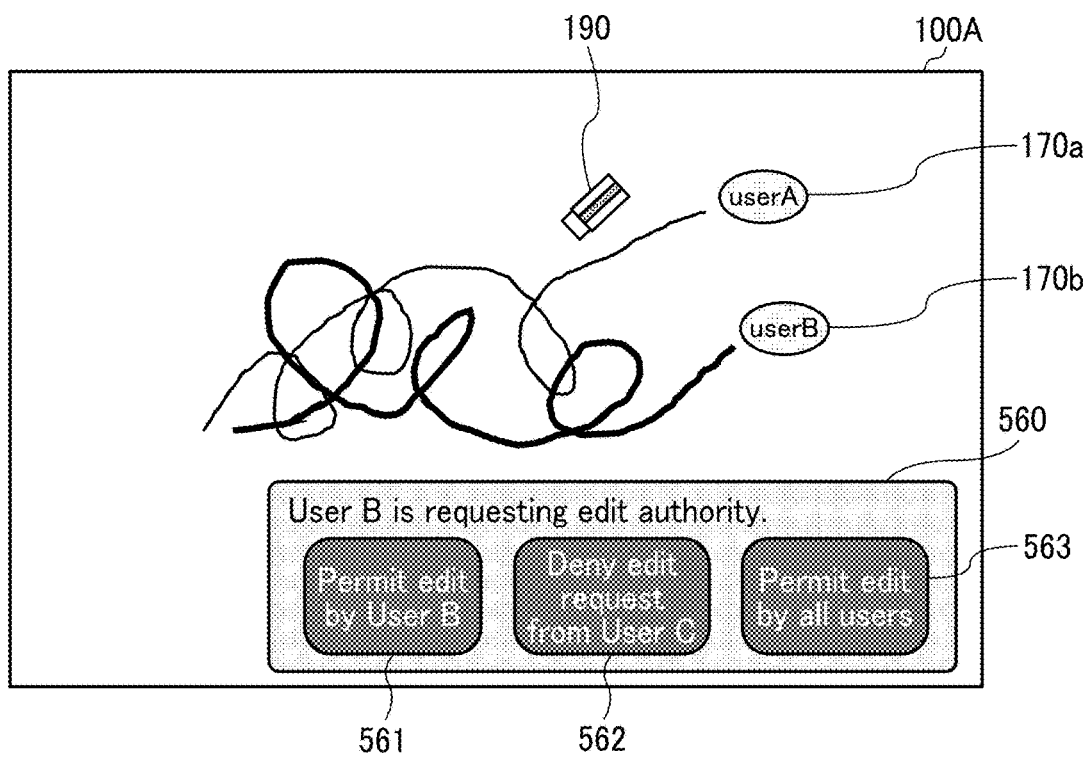
FIG. 31B is an illustration of an example of an edit authority request notification, according to an embodiment of the present disclosure.

Subsequently, the reception unit 12A of the display apparatus 10A1 receives an operation to buttons (step S116). FIG. 31B is an illustration of an example of the edit authority request notification 560. The edit authority request notification 560 illustrated in FIG. 31B includes an individual edit permission button 561, an individual edit denial button 562, and a batch edit permission button 563. The individual edit permission button 561 allows, when selected (pressed), the user A to permit edit by the user B as the request sender. The batch edit permission button 563 allows, when selected (pressed), the user A to permit edit by all the users. In response to pressing of the individual edit permission button 561 or the batch edit permission button 563 by the user A, the setting unit 17A of the display apparatus 10A1 changes the edit authority so that a particular user (e.g., the user B) corresponding to the selected button or all the users are permitted to edit the handwriting input data that is input by the user A. In another example, the display apparatus 10A1 is configured to display the authority setting screen 400 or the authority setting screen 400a in response to pressing of the individual edit permission button 561 or the batch edit permission button 563 by the user A.

By contrast, in response to pressing of the individual edit denial button 562 by the user A, the setting unit 17A of the display apparatus 10A1 rejects edit of handwriting input data that is input by the user A by a particular user (e.g., the user B) corresponding to the selected button, and maintains the edit authority unchanged. In this case, in one example, the user A determines whether to press the individual edit denial button 562. e.g., whether to reject the edit authority request made by another user (e.g., the user B) in view of content of handwriting input that is input by the user A. Further, in another example, the user A determines whether to reject the edit authority in view of an attribute of another user who has sent the edit authority request and content of handwritten strokes. Examples of the attribute of another user include, but are not limited to, a department to which another user belongs, work in which another user is charge, and a job title of another user. In still another example, instead of or in addition to the determination by the user A, the determination unit 14A of the display apparatus 10A1 determines whether to reject the edit authority request based on the attribute of another user who has sent the edit authority request and content of a handwritten stroke. Examples of the attribute of another user include, but are not limited to, a department to which another user belongs, work in which another user is charge, and a job title of another user. The edit restriction unit 18A may reject edit by another user who has requested the edit authority based on the determination result. Based on individual edit rejection information generated by the individual edit denial button 562 being pressed according to a determination criterion as described above, the setting unit 17A of the display apparatus 10A1 rejects edit of handwriting input data that is input by the user A by a particular user (e.g., the user B) corresponding to the selected button, and maintains the edit authority unchanged. When the individual edit denial button 562 is pressed, a transition to the authority setting screen 400 or the authority setting screen 400a may be omitted.

Referring again to FIG. 30, the transmission/reception unit 11A of the display apparatus 10A1 transmits edit authority response information as a response to the edit authority request information received in step S14 to the communication management apparatus 50A (step S117). Thereby, the transmission/reception unit 51 of the communication management apparatus 50A receives the edit authority response information transmitted by the display apparatus 10A1. Then, the transmission/reception unit 51 transmits the edit authority response information received in step S117 to the display apparatus 10B (step S118). Thereby, the transmission/reception unit 11B of the display apparatus 10B receives the edit authority response information transmitted by the communication management apparatus 50A. Subsequently, the display control unit 13B of the display apparatus 10B displays a result for the edit authority request (step S119). Thus, the display apparatus 10B notifies the user B of the result for the edit authority request.

Figure 32A:
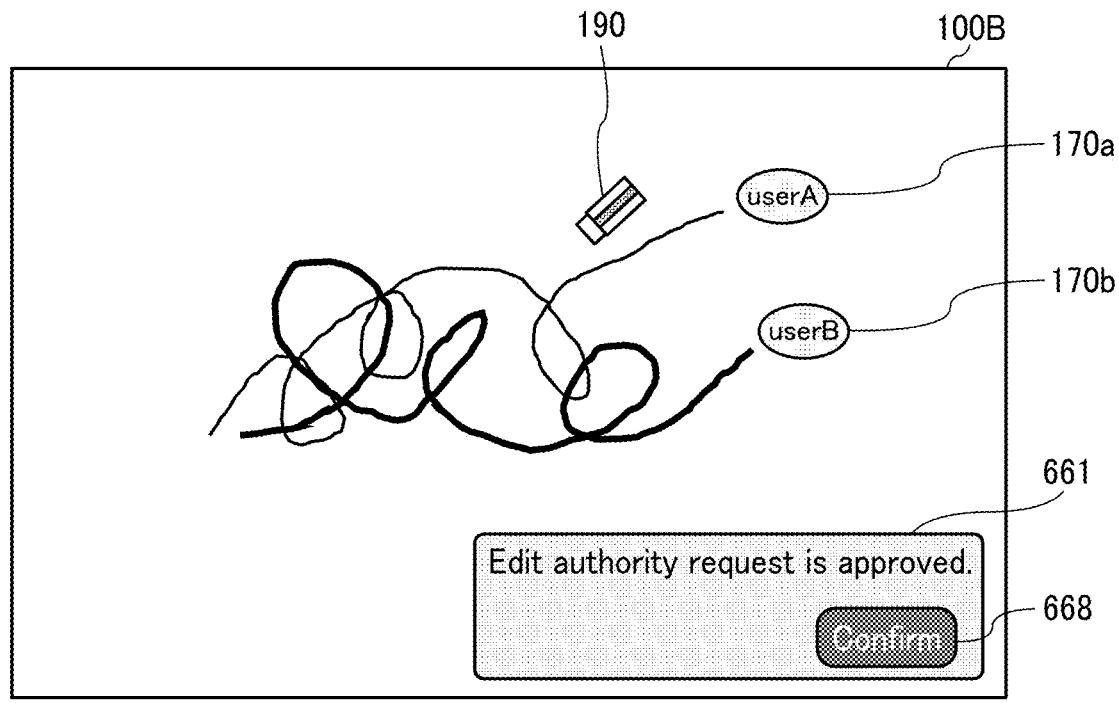
FIG. 32A is an illustration of an example of an edit authority approval notification, according to an embodiment of the present disclosure.
Figure 32B:
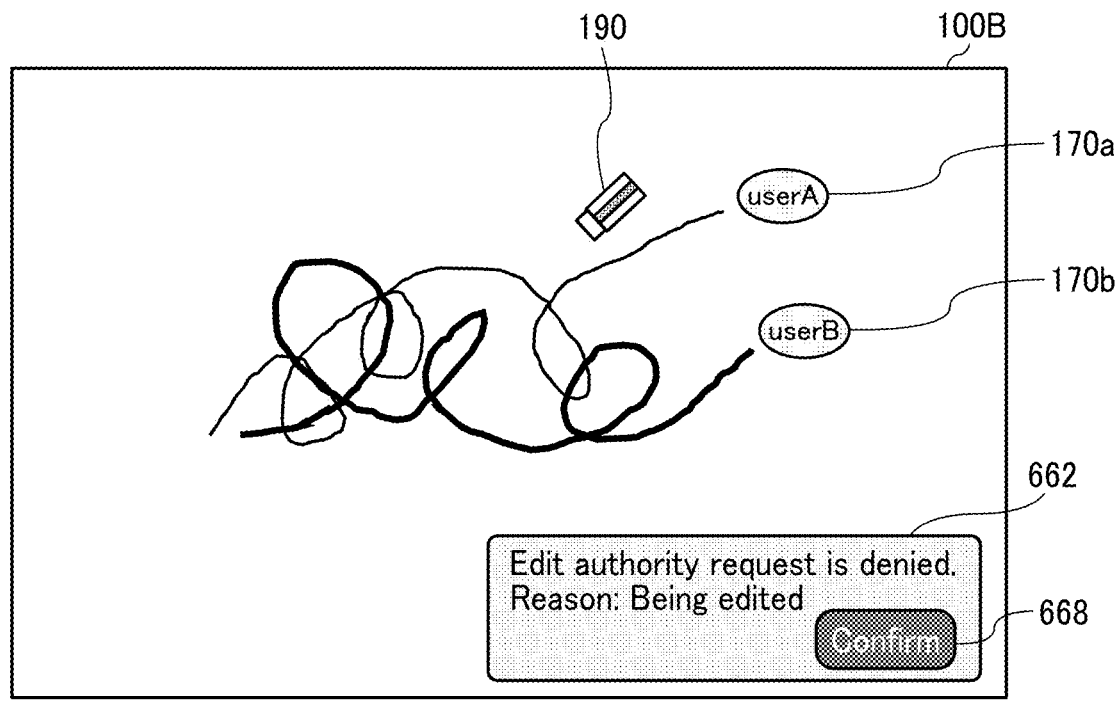
FIG. 32B is an illustration of an example of an edit authority denial notification, according to an embodiment of the present disclosure.

FIG. 32B is an illustration of an example of an edit authority approval notification 661. The edit authority approval notification 661 illustrated in FIG. 32 includes a confirmation button 668, which, when selected, allows a user (e.g., the user B) as the request sender to confirm a notification indicating that the user B is permitted to edit the handwriting content. FIG. 32B is an illustration of an example of an edit authority denial notification 662. The edit authority denial notification 662 illustrated in FIG. 32B includes a confirmation button 668, which, when selected, allows a user (e.g., the user B) as the request sender to confirm a notification indicating that the request for edit authority by the user B as the request sender is rejected.

Edit Restriction on Handwriting Input Data by Another User:

Referring to FIG. 33 to FIG. 37, an operation of setting edit authority for the handwriting input data that is input by another user is described. FIG. 33 is a flowchart illustrating an example of an operation of editing handwriting input data that is input by another user. A description provided with reference to FIG. 33 is of an example in edit authority for editing handwriting input data that is input by another user (e.g., the user B) is set at the display apparatus 10A1 used by the user A. In another example, the same or substantially the same operation is performed in any of the display apparatuses 10 used by the users participating the event.

First, the reception unit 12A of the display apparatus 10A1 receives an edit operation on handwriting input data displayed on the display screen 100A according to an input operation on the display screen 100A by the user A (step S151).

Next, the determination unit 14A determines whether edit of content written by a user who has input the handwriting input data to be edited on which the edit operation is received in step S151 is restricted (step S152). When the determination unit 14A determines that edit of the content written by the user who has input the handwriting input data to be edited is restricted (YES in step S152), the operation proceeds to step S153. Then, the display apparatus 10A1 displays, on the display screen 100A, a predetermined notification described below (step S153). By contrast, when the determination unit 14A determines that edit of the content written by the user who has input the handwriting input data to be edited is permitted (NO in step S152), the operation proceeds to step S154. Then, the display control unit 13A performs an edit operation on the handwriting input data, and displays the edited handwriting input data on the display screen 100A (step S154).

Figure 34:
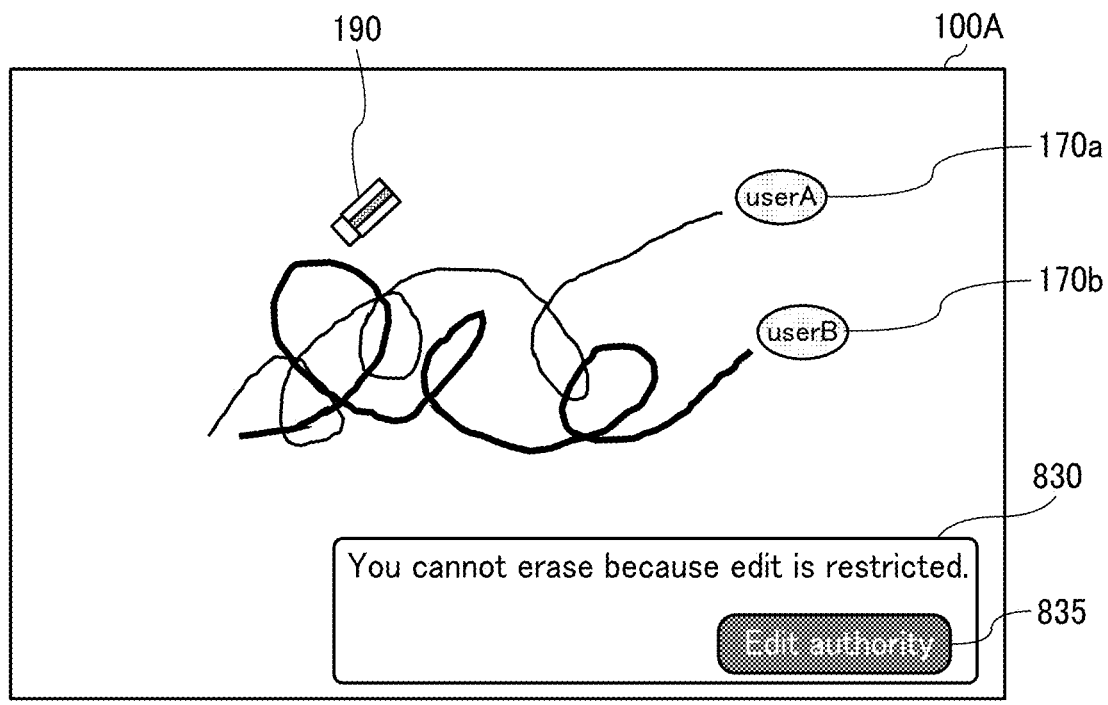
FIG. 34 is an illustration of another example of the edit restriction notification, according to an embodiment of the present disclosure.
Figure 35:
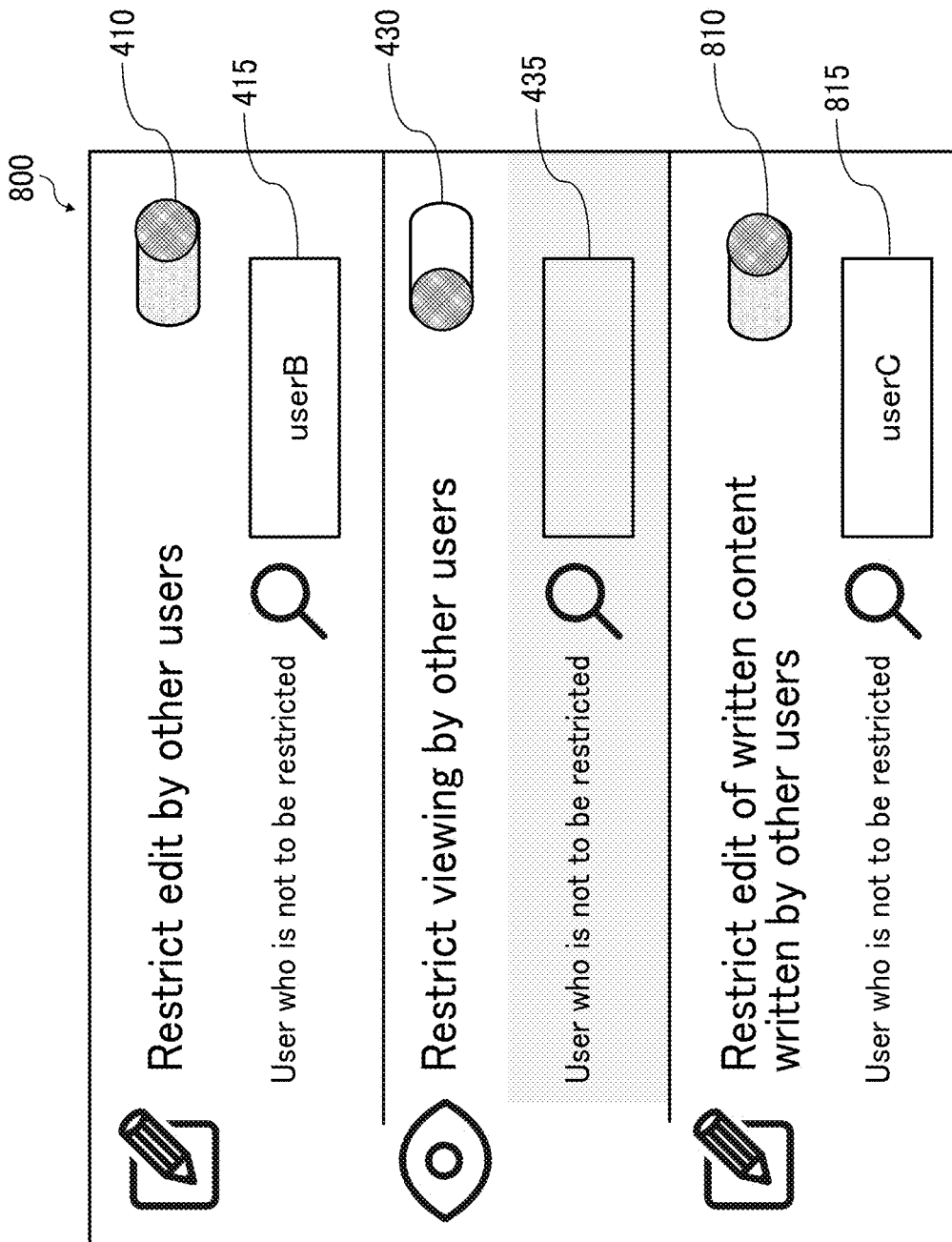
FIG. 35 is an illustration of another example of the authority setting screen, according to an embodiment of the present disclosure.
Figure 36:
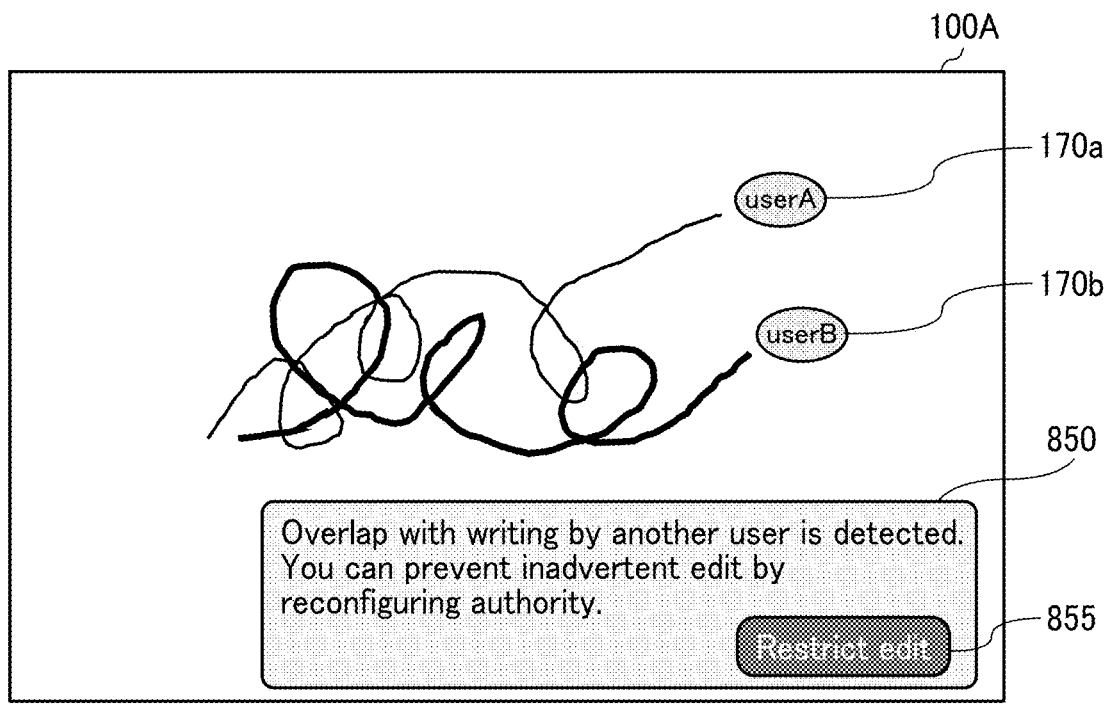
FIG. 36 is an illustration of an example of an authority change recommendation screen, according to an embodiment of the present disclosure.

Referring to FIG. 34 to FIG. 36, the predetermined notification displayed on the display screen 10A in step S153 is described in detail. FIG. 34 is an illustration of an example of an edit restriction notification 830 displayed in step S153. FIG. 34 illustrates the display screen 100A displayed on the display apparatus 10A1 as an example of a display screen displayed when the user A does not have the edit authority for editing handwriting input data to be edited on which the user A has performed the edit operation, the handwriting input data being input by the user B. The display screen 100A illustrated in FIG. 34 includes the user indication image 170a and the user indication image 170b, each identifying a user who has input handwriting input data being displayed. On the display screen 100A, handwriting input data that is input by the user A and the user B is displayed. On the display screen 100A illustrated in FIG. 34, when the user A uses the edit tool 190 to perform an edit operation of erasing the handwriting input data that is input by the user B, the edit restriction unit 18A displays, on the display screen 100A, the edit restriction notification 830 indicating that edit of the handwriting input data that is input by the user B is restricted. The edit restriction notification 830 includes an authority edit button 835, which, when selected (pressed), allows the user A to edit authority for handwriting input data that is input by the user B.

In response to pressing of the authority edit button 835 by the user A, the display control unit 13A of the display apparatus 10A1 displays an authority setting screen 800 illustrated in FIG. 35. Thus, the display apparatus 10A1 allows the user A to change authority for the handwriting input data that is input by another user. In another example, the display apparatus 10A1 directly cancels the edit restriction in response to pressing of the authority edit button 835 by the user A. In this case, the setting unit 17A changes the edit authority so that edit by the user A is permitted for a user who has input the corresponding handwriting input data.

Thus, the display apparatus 10A1 displays the edit restriction notification 830 when the user A does not have the edit authority so that the user A recognizes a reason why the user A cannot edit the handwriting input data such as the user's attribute including a department to which the user belongs, work in which the user is charge, and a job title. Further, the display apparatus 10A1 allows the user A to change the edit authority for handwriting input data that is input by another user.

FIG. 35 is an illustration of an example of the authority setting screen 800. The authority setting screen 800 illustrated in FIG. 35 includes, in addition to content of the authority setting screen 400 illustrated in FIG. 17, an edit authority setting button 810 and a user information input area 815. The edit authority setting button 810 allows, when selected, the user A to set edit authority for editing handwriting input data (written content) that is input by another user. The user information input area 815 is an area in which the user A enters a user for whose handwriting input data the user A is to be permitted to edit. The example of FIG. 35 illustrates an example state in which the user A is restricted from editing handwriting input data that is input by users except for the user C. The setting unit 17A changes the edit authority of the user A for writing by one or more other users according to an input operation by the user A on the authority setting screen 800.

As described above, the screen sharing system 1 allows a user to set not only various authorities of other users for writing by the user but also the user's own edit authority for writing by other users on the authority setting screen 800. Thus, the screen sharing system 1 prevents content written by other users from being inadvertently edited. In another example, the authority setting screen 800 allows a user to set, for each user, the user's own edit authority for handwriting input data that is input by other users, in substantially the same manner as the authority setting screen 400a illustrated in FIG. 19. In still another example, the authority setting screen 800 is displayed on the display screen 100A in response to the user A's pressing of the setting button 150 on the display screen 100A illustrated in FIG. 17A, in substantially the same manner as described above.

FIG. 36 is an illustration of an example of an authority change recommendation notification 850 displayed in step S153. FIG. 36 illustrates the display screen 100A displayed on the display apparatus 10A1 as an example of a display screen displayed when an edit operation by the user A overlaps with handwriting input data that is input by another user. When the overlap between the edit operation by the user A and handwriting input data that is input by the user B is detected, the recommendation notification unit 23 displays, on the display screen 100A, the authority change recommendation notification 850 that recommends the user A to change the authority.

In detecting the overlap between the edit operation of the user A and the handwriting input data that is input by the user, for example, each time a coordinate position (Point) of an object included in a handwriting input data file is added, a path (trajectory) between point sequences (coordinate positions) of the object is defined, and the overlap between the handwriting input data is detected in response to detection of an intersection point of the defined paths. In a case that the format of the object is a stamp instead of a stroke but a stamp or the like, for example, the overlap between the handwriting input data is detected by detecting whether a point sequence is added to an area of the object specified by the coordinate position (Point) and size (Size) of the stamp.

The authority change recommendation notification 850 includes an edit restriction button 855, which, when selected (pressed), to allow the user A to restrict the user A from editing an input by another user who inputs handwriting input data for which the overlap is detected. In response to pressing edit restriction button 855 by the user A, the setting unit 17A changes the edit authority so that the user A is restricted from editing an input by another user who inputs handwriting input data for which the overlap is detected. In another example, the display apparatus 10A1 is configured to display the authority setting screen 800 in response to pressing of the edit restriction button 855 by the user A. Thus, the display apparatus 10A1 displays the authority change recommendation notification 850 when the overlap with the handwriting input data by another user is detected, thereby allowing the user A to input (write) a new object without affecting the writing by another user.

Figure 37:
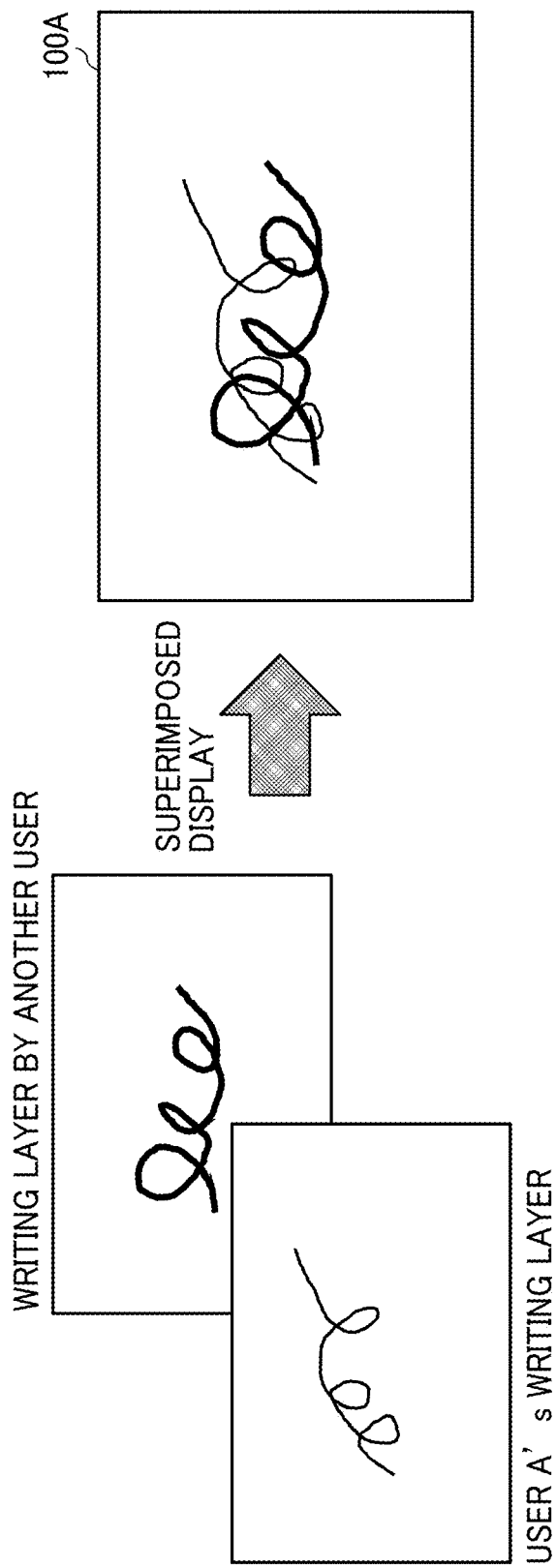
FIG. 37 is a diagram illustrating an example of how for explaining an example of how writing layers of users are superimposed one on the other, according to an embodiment of the present disclosure.

Further, to distinguish writing by a given user from writing by another user than the given user as illustrated in FIG. 36, as illustrated in FIG. 37, a layer on which the given user performs handwriting input and another layer on which another user performs handwriting input are provided. The two layers are superimposed one on the other and displayed, to display the display screen 100A. FIG. 37 illustrates an example of the display screen 100A on which a writing layer of the user A including writing by the user A and a writing layer of another user including writing by another user are superimposed and displayed. In this case, the display apparatus 10A1 applies the authority information that is set by the setting unit 17A for each user to each writing layer of each user. The edit restriction unit 18 restricts a user who does not have the edit authority to perform editing to the writing layer for which edit is restricted.

Thus, the screen sharing system 1 sets edit authority for editing handwriting input data that is input by another user in addition to the various authorities of another user for handwriting input data input by the user himself/herself, thereby preventing the user from inadvertently editing written content by another user.

Figure 38:
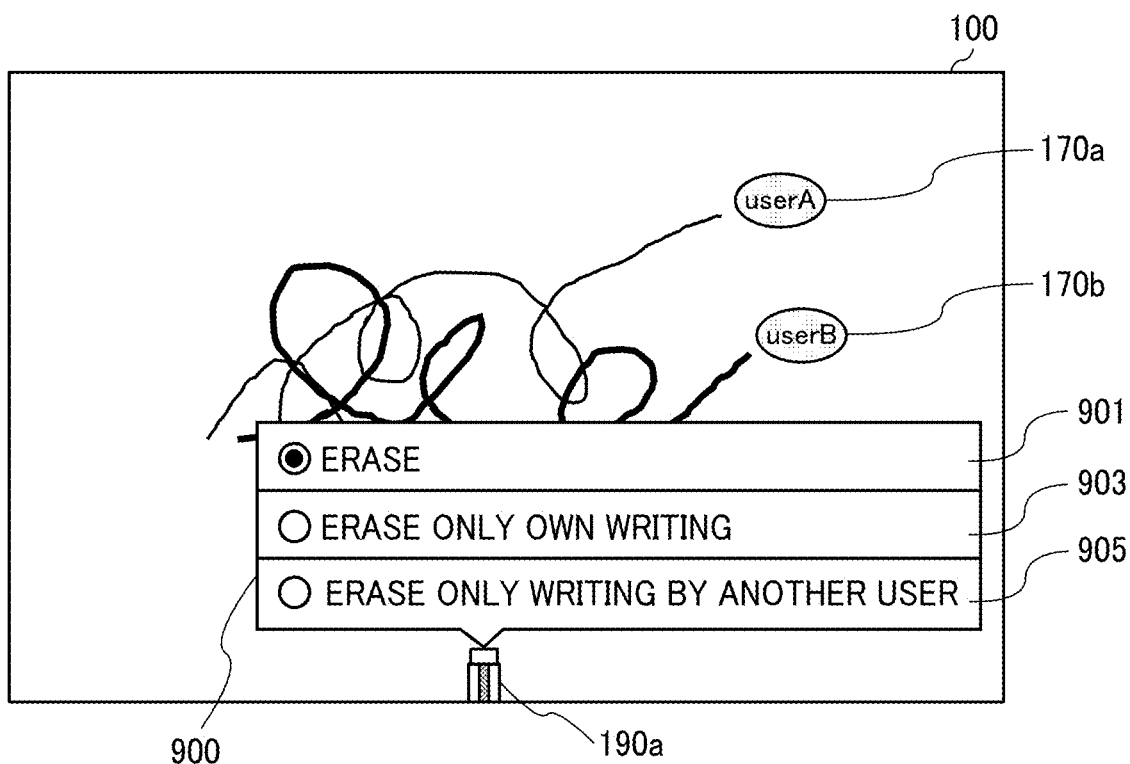
FIG. 38 is an illustration of an example of an edit operation selection screen, according to an embodiment of the present disclosure.
Figure 39:
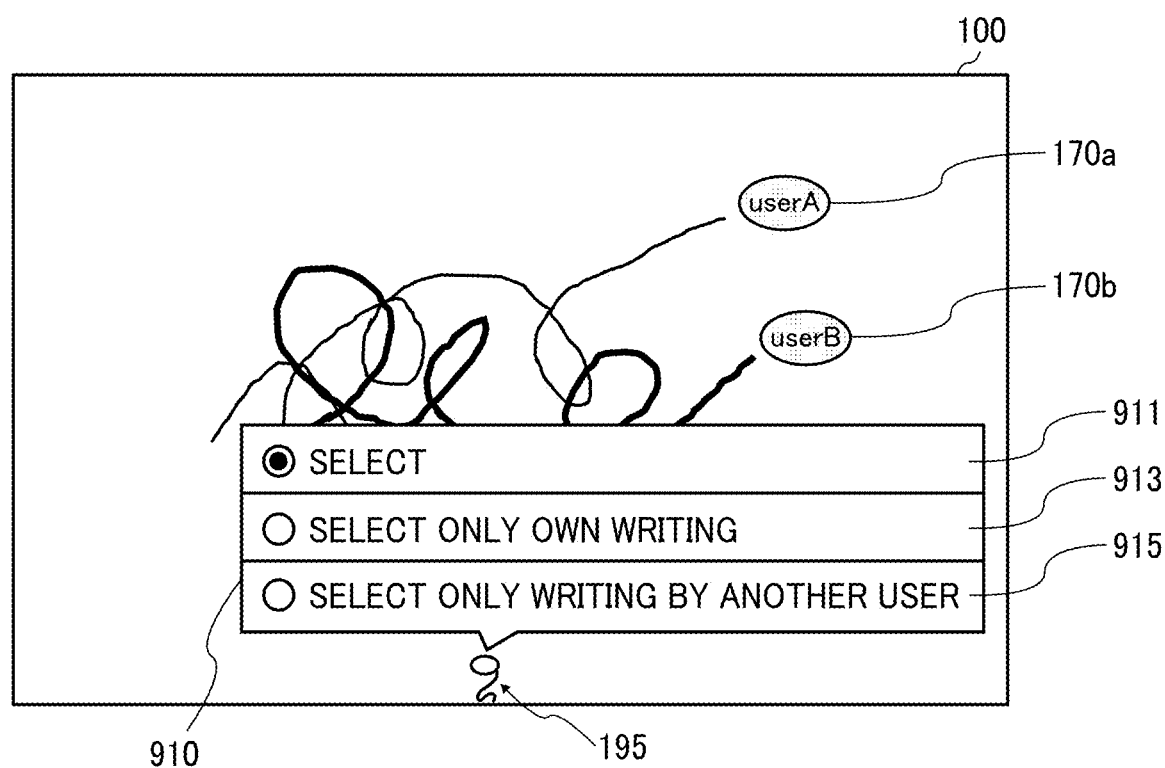
FIG. 39 is an illustration of another example of the edit operation selection screen, according to an embodiment of the present disclosure.

Application Example of Editing Operation:

Referring to FIG. 38 to FIGS. 40A and 40B, an application example of an edit operation on handwriting input data is described. Referring to FIG. 38 and FIG. 39, an example in which handwriting input data to be edited using an edit tool is described. FIG. 38 and FIG. 39 are illustrations of examples of edit operation selection screens.

The display screen 10) illustrated in FIG. 38 includes an edit operation selection screen 900 for selecting handwriting input data to be erased. The edit operation selection screen 900 is displayed in response to a user's operation of selecting an edit tool 190a displayed on the display screen 100. The edit tool 190a is a selection tool used for selecting handwriting input data to be erased, for example. The edit operation selection screen 900 includes a selection area 901, a selection area 903, and a selection area 905. The selection area 901 is selected when an erasing operation is to be performed on all input handwriting input data. The selection area 903 is selected when an erasing operation is to be performed on only handwriting input data that is input by the user himself/herself. The selection area 905 is selected when an erasing operation is to be performed on only handwriting input data that is input by another user. When the user selects any one of the selection area 901, the selection area 903, and the selection area 905, the selection unit 24 of the display apparatus 10 switches a mode from a mode in which writing is performed to a mode in which written content is erased, for example, and selects particular handwriting input data to be erased based on the selected condition. For example, when the selection area 901 is selected, all of the handwriting input data is selected as data to be erased. When the selection area 903 is selected, only the handwriting input data that is input by the user himself/herself is selected as data to be erased. When the selection area 905 is selected, only the handwriting input data that is input by another user is as data to be erased.

The display screen 100 illustrated in FIG. 39 includes an edit operation selection screen 910 for selecting handwriting input data to collectively selected. The edit operation selection screen 910 is displayed in response to a user's operation of selecting an edit tool 195 displayed on the display screen 100. The edit tool 195 is a selection tool used for selecting handwriting input data to be edited, for example. The edit operation selection screen 910 includes a selection area 911, a selection area 913, and a selection area 915. The selection area 911 is selected when a selection operation is to be performed on all input handwriting input data. The selection area 913 is selected when a selection operation is to be performed on only handwriting input data that is input by the user himself/herself. The selection area 915 is selected when a selection operation is to be performed on only handwriting input data that is input by another user. When the user selects any one of the selection area 911, the selection area 913, and the selection area 915, the selection unit 24 of the display apparatus 10 switches a mode from a mode in which writing is performed to a mode in which selection of written content is performed, for example, and selects particular handwriting input data to be selected based on the selected condition. For example, when the selection area 911 is selected, all of the handwriting input data is selected as data to be selected. When the selection area 913 is selected, only the handwriting input data that is input by the user himself/herself is selected as data to be selected. When the selection area 915 is selected, only the handwriting input data that is input by another user is as data to be selected.

Thus, when an edit operation such as erase or selection is to be performed on handwriting input data that is input to the display screen 100, the display apparatus 10 switches handwriting input data to be edited for each user who has input the handwriting input data using the edit tool 190a or the edit tool 195.

Referring to FIG. 40A and FIG. 40B, an operation of switching an edit operation according to a writing pressure that is input to the display screen 100 is described. FIG. 40A and FIG. 40B are illustrations for describing an example of switching of an edit operation based on writing pressure. When the user is going to erase handwriting input data that is input to the display screen 100, if the writing pressure on the display screen 100 is light, only the handwriting input data of the user is erased. By contrast, if the writing pressure on the display screen 100 is heavy, all handwriting input data including handwriting input data of another user are erased.

FIG. 40A illustrates an edit operation performed when the display screen 100 is touched with light writing pressure. The detection unit 25 of the display apparatus 10 detects writing pressure that is input by the user to the display screen 100. As illustrated in the left figure of FIG. 40A, when the writing pressure detected by the detection unit 25 is light, the display screen 100 displays an edit area 180a having a relatively small size. In this state, when the user performs an operation using the edit tool 190, only the handwriting input data that is input by the user is erased. On the other hand, FIG. 40B illustrates an edit operation performed when the display screen 100 is touched with heavy writing pressure. As illustrated in the left figure of FIG. 40B, when the writing pressure detected by the detection unit 25 is heavy, the display screen 100 displays an edit area 180b having a relatively large size. In this state, when the user performs an operation using the edit tool 190, all handwriting input data including handwriting input data that is input by another user are erased. In one example, the size (e.g., the length of the radius) of each of the edit area 180a and the edit area 180b is changed in proportion to the writing pressure.

When the detected writing pressure is light, the display apparatus 10 displays a small erase circle such as the edit area 180a and erases only the user's own handwriting input data. On the other hand, when the detected writing pressure is heavy, the display apparatus 10 displays a large erase circle such as the edit area 180b and erases all the handwriting input data. In the disclosure, for example, a device configured to receive an input with writing pressure is used to detect writing pressure, and the writing pressure is acquired as an input of a numerical value of "0 to 1". The detection unit 25 process a first acquired input as light writing pressure. When the writing pressure exceeds "0.6", the detection unit 25 processes the input as heavy writing pressure. When the writing pressure becomes below "0.4", the detection unit 25 processes the input as light writing pressure. In another example, in detection of the writing pressure, the display apparatus 10 sets a writing pressure threshold value (in the above example, "0.6" and "0.4") for each user who performs handwriting input. This is because the writing pressure of handwriting varies depending on users. Such a setting of the writing pressure detection threshold value for each user implements an edit operation on handwriting input data according to the writing pressure intended by each user. This prevents handwriting input data from being erased inadvertently. Further, this prevent a situation from occurring in which handwriting input data is not even if the user tries to erase the handwriting input data.

Accordingly, the display apparatus 10 can switch the handwriting input data to be edited according to the writing pressure that is input to the display screen 100 as a handwriting input screen. Erasing handwriting input data is merely one example of the edit operation. In another example, the edit operation includes other editing contents such as selection of handwriting input data. In still another example, the display apparatus 10 is configured to switch handwriting input data to be edited from one to another based on, in addition to the writing pressure, other operation contents such as a contact time with the display screen 100.

As described above, according to the present embodiment, the screen sharing system 1 sets edit authority assigned to other users for editing handwriting input data that is input by a certain user, thereby allowing only a user having the edit authority to perform an edit operation. Further, the screen sharing system 1 sets viewing authority assigned to other users for viewing handwriting input data that is input by a certain user, thereby allowing only a user having the viewing authority to view the handwriting input data. Thus, the screen sharing system 1 can set authority for handwriting input data for each user, thereby allowing a user to extensively use the handwriting input screen without worrying about operations by other users, while preventing inadvertent edit.

Further, in the screen sharing system 1, the display apparatus 10 displays the authority setting screen 400, the authority setting screen 400a, and the authority setting screen 800 on which authority can be set for each user, to allow a user to configure settings of authority for handwriting input data. Thus, the screen sharing system 1 enhances a user's operability in configuring settings of the authority.

In the above-described embodiment, the display apparatus 10 performs the viewing restriction and the edit restriction on the handwriting input data. In another example, the communication management apparatus 50A performs the viewing restriction process and the edit restriction process on the handwriting input data. In this case, the communication management apparatus 50A performs the viewing restriction and the edit restriction on handwriting input data to be displayed on the display apparatus 10 used by each user based on the authority information of each user stored in the authority information management DB 5003.

Second Embodiment

A second embodiment is described below. In the second embodiment, the communication management apparatus 50B determines whether to approve a viewing request and an edit authority request made by a user. Since the screen sharing system 1 according to the second embodiment has the same or substantially the same overall configuration of the screen sharing system 1 according to the first embodiment, redundant descriptions of the apparatuses or terminals of the system are omitted below. Further, since the apparatuses of the screen sharing system 1 according to the second embodiment have the same or substantially the same hardware configurations of the apparatuses or terminals of the screen sharing system 1 according to the first embodiment, redundant descriptions of the hardware resources of the apparatuses or terminals are omitted below.

Figure 41:
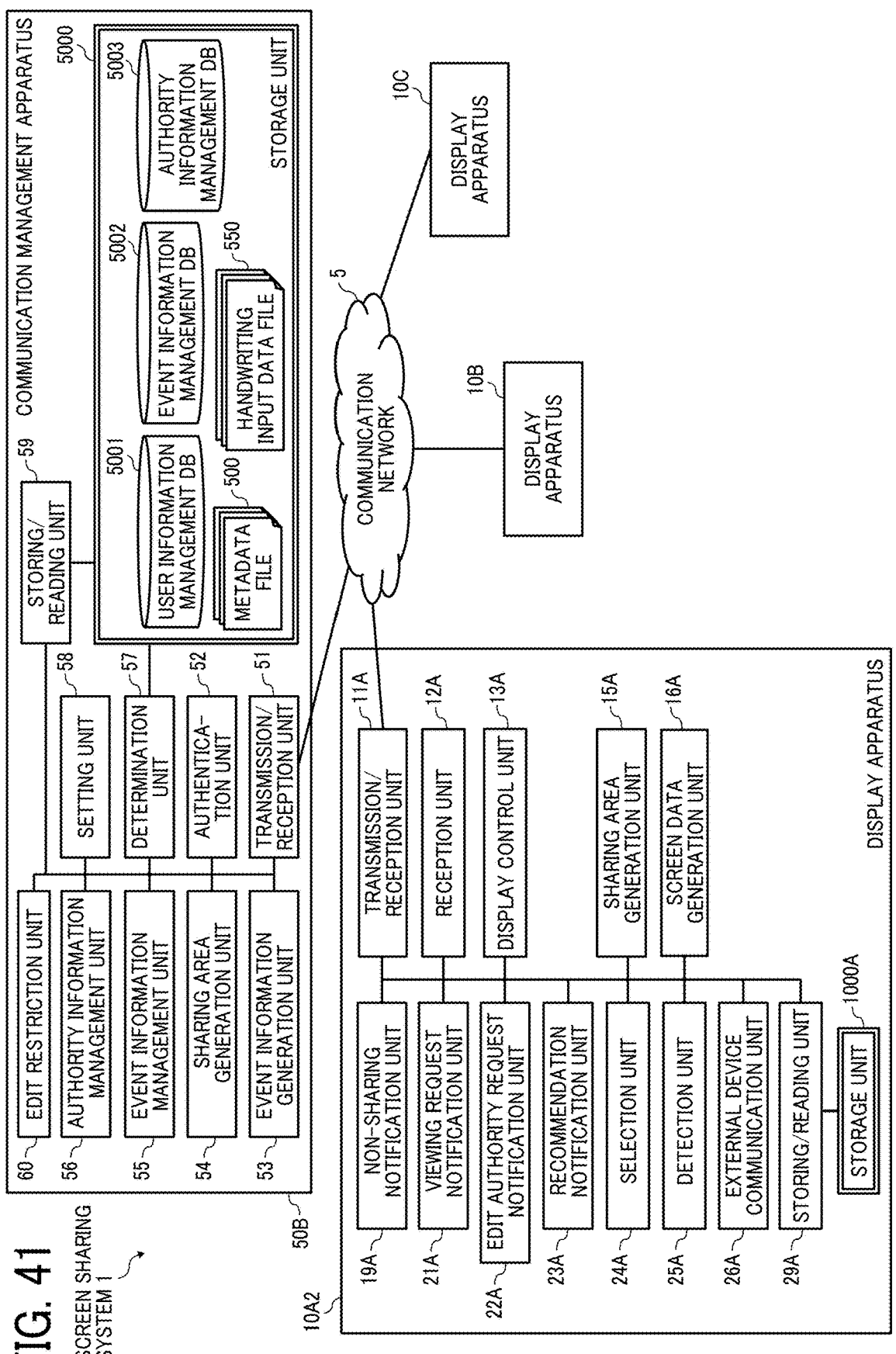
FIG. 41 is a block diagram illustrating an example of a functional configuration of the screen sharing system, according to the second embodiment of the present disclosure.

Functional Configuration:

Next, a functional configuration of the screen sharing system 1 is described according to the second embodiment. FIG. 41 is a block diagram illustrating an example of a functional configuration of the screen sharing system 1 according to the second embodiment. As illustrated in FIG. 41, some of functional units illustrated in FIG. 8 are exchanged between a display apparatus 10A2 and the communication management apparatus 50B. Specifically, the determination unit 14A, the setting unit 17A, and the edit restriction unit 18A of the display apparatus 10A1 of FIG. 8 are replaced with a determination unit 57, a setting unit 58, and an edit restriction unit 60 of the communication management apparatus 50B, respectively. The functional configuration of each functional unit in the display apparatus 10A2 and the communication management apparatus 50B including the replaced functions is the same or substantially the same as that described in the first embodiment except for the determination unit 57, the setting unit 58, and the edit restriction unit 60 described below, and thus detailed description thereof is omitted below.

The determination unit 57, which is mainly implemented by instructions of the CPU 501, performs various determinations in the communication management apparatus 50B. The setting unit 58, which is mainly implemented by instructions of the CPU 501, sets various authorities for handwriting input data input by a user who uses the display apparatus 10 to another user who use another display apparatus 10. For example, the setting unit 58 sets viewing authority based on which another user is authorized to view handwriting input data input by the user using the display apparatus 10. Further, for example, the setting unit 58 sets edit authority based on which another user is authorized to edit handwriting input data input by the user using the display apparatus 10. Furthermore, for example, the setting unit 58 sets edit authority based on which the user who uses the display apparatus 10 is authorized to edit handwriting input data input by another user who uses another display apparatus 10.

The edit restriction unit 60, which is mainly implemented by instructions of the CPU 501, restricts edit of handwriting input data that is input by another user who does not have the edit authority based on authority information set by the setting unit 17 of the display apparatus 10. Further, for example, when the user does not have the edit authority for editing handwriting input data that is input by another user, the edit restriction unit 60 edits an edit restriction notification indicating that the user does not have the edit authority, the edit restriction notification being displayed on the display screen of the display apparatus 10. In the present disclosure, the term "edit" refers to controlling an operation such as selecting, inputting, adding, changing, deleting, enlarging, reducing, or moving an image, text, or handwriting input data displayed on the display screen of the display apparatus 10 according to an input operation received by the reception unit 12 of the display apparatus 10.

In another example, the screen sharing system 1 has both functions of the functional configuration (see FIG. 8) of the display apparatus 10A1 (display apparatus 10) described in the first embodiment and the functional configuration (see FIG. 41) of the communication management apparatus 50B described in the second embodiment. In other words, as for the determination unit, the setting unit, and the edit restriction unit in the screen sharing system 1, a functional configuration may be configured in which any one of the determination unit 14A and the determination unit 57, any one of the setting unit 17A and the setting unit 58, and any one of the edit restriction unit 18A and the edit restriction unit 60 has a function and executes the function. In still another example, in addition to the determination unit, the setting unit, and the edit restriction unit described above, a functional configuration is configured in which one or more other functions are allocated to any one of the display apparatus 10A2 (the display apparatus 10) and the communication management apparatus 50B, and the display apparatus 10A2 and the communication management apparatus 50B executes the allocated functions.

Processes or Operation of Embodiment:

Referring to FIG. 42 to FIG. 45, processes and operations by the screen sharing system according to the second embodiment are described. Since the screen sharing system according to the second embodiment performs the same or substantially the same operation performed at the start of an event and operation of setting authority as described in the first embodiment, redundant descriptions of such operations are omitted below.

Figure 42:
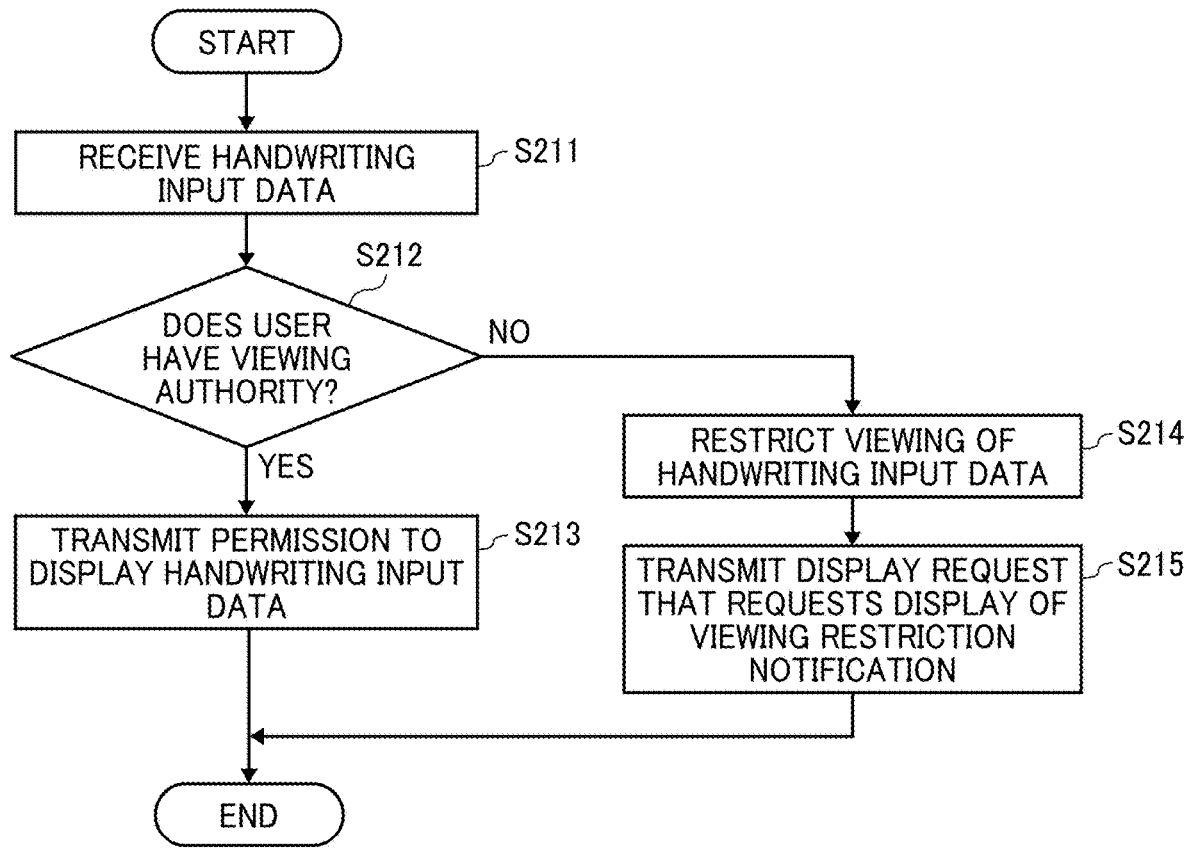
FIG. 42 is a flowchart illustrating an example of an operation of restricting viewing of handwriting input data that is input by another user, according to the second embodiment of the present disclosure.

Request for Displaying Handwriting Input Data:

Referring to FIG. 42, an operation of causing another display apparatus to display handwriting input data that is input on a display screen by another user according to viewing authority of each user. FIG. 42 is a flowchart illustrating an example of an operation of restricting viewing of handwriting input data that is input by another user, according to the second embodiment. A description provided with reference to FIG. 42 is of an example in which the display apparatus 10C used by the user C receives handwriting input data that is input to the display apparatus 10A2 used by the user A. However, such a combination of the display apparatus 10C and the display apparatus 10A2 is merely one example of the display apparatuses exchanging the handwriting input data therebetween. The same or substantially the same operation is performed in any other combinations of the display apparatuses 10 used by the users participating the event.

First, the transmission/reception unit 51 of the communication management apparatus 50B receives handwriting input data transmitted by the display apparatus 10A2 (step S211). This handwriting input data is handwriting input data that is input by the user A. As illustrated in FIG. 21A of the first embodiment, the handwriting input data that is input by the user A is displayed on the display screen 100A of the display apparatus 10A2.

Next, the determination unit 57 determines whether the viewing authority is assigned for the handwriting input data received in step S211 (step S212). Specifically, the determination unit 57 refers to the authority information set by the setting unit 58, to determine whether the user C has the viewing authority for the user A who has input the received handwriting input data. When the determination unit 57 determines that the user C has the viewing authority for the received handwriting input data (YES in step S212), the operation proceeds to step S213. Then, the transmission/reception unit 51 transmits, to the display apparatus 10C, display permission information indicating that display of the handwriting input is permitted so that the display apparatus 10C displays the received handwriting input data on the display screen 100C (step S213).

By contrast, when the determination unit 57 determines that the user C does not have viewing authority for the received handwriting input data (NO in step S212), the operation proceeds to step S214. Then, the edit restriction unit 60 restricts viewing of the handwriting input data (step S214). Then, the edit restriction unit 60 transmits, to the display apparatus 10C via the transmission/reception unit 51, viewing restriction display request information indicating a request for displaying a viewing restriction notification, the viewing restriction notification indicating that viewing of the handwriting input data that is input by the user A is restricted (step S215). Since each screen example displayed on the display apparatus 10 can be implemented in substantially the similar manner to the contents illustrated in FIG. 21A to FIG. 24 of the first embodiment, redundant illustrations and descriptions thereof are omitted below.

As described above, in response to receiving handwriting input data displayed at a certain display apparatus 10, the communication management apparatus 50B determines whether the viewing authority for the received handwriting input data is assigned to another display apparatus 10, and transmits, to another display apparatus, the display permission information of the handwriting input data only when the viewing authority is assigned to another display apparatus. Thus, the screen sharing system 1 restricts a user who does not have viewing authority from viewing handwriting input data (written content), thereby preventing handwriting input data from inadvertently viewed by the display apparatus 10 for which the viewing authority is not set. Further, when the display apparatus 10 does not have the viewing authority for the received handwriting input data, the display apparatus 10 displays the viewing restriction notification on the display screen. Thus, in the second embodiment, the communication management apparatus 50B determines whether the viewing authority is assigned and whether display of the handwriting input data is to be performed. This reduces the processing load on the display apparatus 10.

Figure 43:
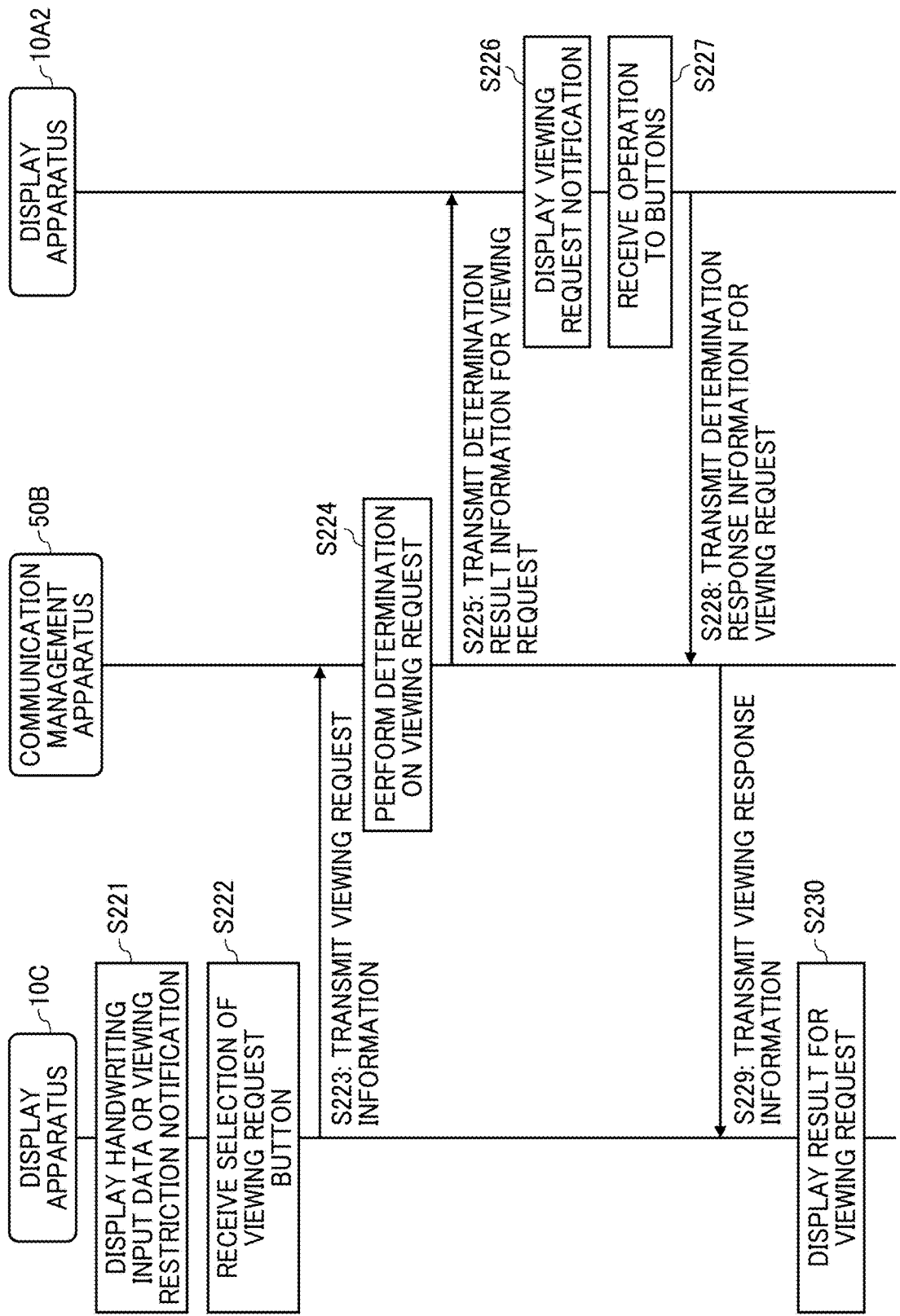
FIG. 43 is a sequence diagram illustrating an example of an operation of requesting viewing to another user, according to the second embodiment of the present disclosure.

Operation of Requesting Viewing:

Referring to FIG. 43, an operation of requesting viewing of handwriting input data for which viewing is restricted is described. FIG. 43 is a sequence diagram illustrating an example of an operation of requesting viewing to another user, according the second embodiment. A description provided with reference to FIG. 43 is of an example in which the display apparatus 10C used by the user C who is restricted from viewing handwriting input data that is input by the user A requests the display apparatus 10A2 used by the user A for viewing. However, such a combination of the display apparatus 10C and the display apparatus 10A2 is merely one example of the display apparatuses exchanging the viewing request therebetween. The same or substantially the same operation is performed in any other combinations of the display apparatuses 10 used by the users participating the event.

First, the display control unit 13C of the display apparatus 10C displays the viewing restriction notification 480 on the display screen 100C (step S221). The viewing restriction notification 480 is as illustrated in FIG. 26A.

Next, the reception unit 12C receives selection of the viewing request button 485 included in the viewing restriction notification 480 in response to an input operation by the user C (step S222). The transmission/reception unit 11C transmits, to the communication management apparatus 50B, viewing request information indicating a request to view handwriting input data that is input the user A for which the viewing is restricted (step S223). This viewing request information includes a user ID of a user as a destination user who is to receive the viewing request. In this case, the transmission/reception unit 11C transmits the viewing request information including the user ID of the user A. Thereby, the transmission/reception unit 51 of the communication management apparatus 50B receives the viewing request information transmitted by the display apparatus 10C.

Next, the determination unit 57 of the communication management apparatus 50B performs determination on the viewing request information received in step S223 (step S224). Specifically, in response to the received viewing request information, the determination unit 57 determines whether the user who uses the display apparatus 10C is to be permitted to view the handwriting input data based on the attribute of the user who uses the display apparatus 10C that has transmitted the viewing request and a content of the handwritten stroke displayed on the display apparatus 10A2. Examples of the attribute of the user who uses the display apparatus 10C include, but are not limited to, a department to which the user belongs, work in which the user is charge, and a job title of the user.

Next, the transmission/reception unit 51 of the communication management apparatus 50B transmits (transfers) determination result information indicating a result of the determination performed on the viewing request transmitted by the display apparatus 10C to the display apparatus 10A2 used by the user A as the request destination of the viewing request (step S225). Thereby, the transmission/reception unit 11A of the display apparatus 10A2 receives the determination result information for the viewing request transmitted by the display apparatus 10C as a request source.

In response to receiving the determination result information for the viewing request in step S225, the viewing request notification unit 21A of the display apparatus 10A2 displays the viewing request notification 380 indicating that the viewing request has been made by the user C on the display screen 100A (step S226). Then, the reception unit 12A of the display apparatus 10A2 receives an operation to buttons (step S227).

The transmission/reception unit 11A of the display apparatus 10A2 transmits, to the communication management apparatus 50B, determination response information for the viewing request, as a response to the determination result information for the viewing request, the determination result information being received in step S225 (step S228). Thereby, the transmission/reception unit 51 of the communication management apparatus 508 receives the determination response information for the viewing request, the determination response information transmitted by the display apparatus 10A2. Then, the transmission/reception unit 51 transmits, to the display apparatus 10C, viewing response information corresponding to the determination response information for the viewing request, the determination response information being received in step S228 (step S229). Thereby, the transmission/reception unit 11C of the display apparatus 10C receives the viewing response information transmitted by the communication management apparatus 50B. Subsequently, the display control unit 13C of the display apparatus 10C displays a result for the viewing request (step S230). Thus, the display apparatus 10C notifies the user C of the result for the viewing request.

Figure 44:
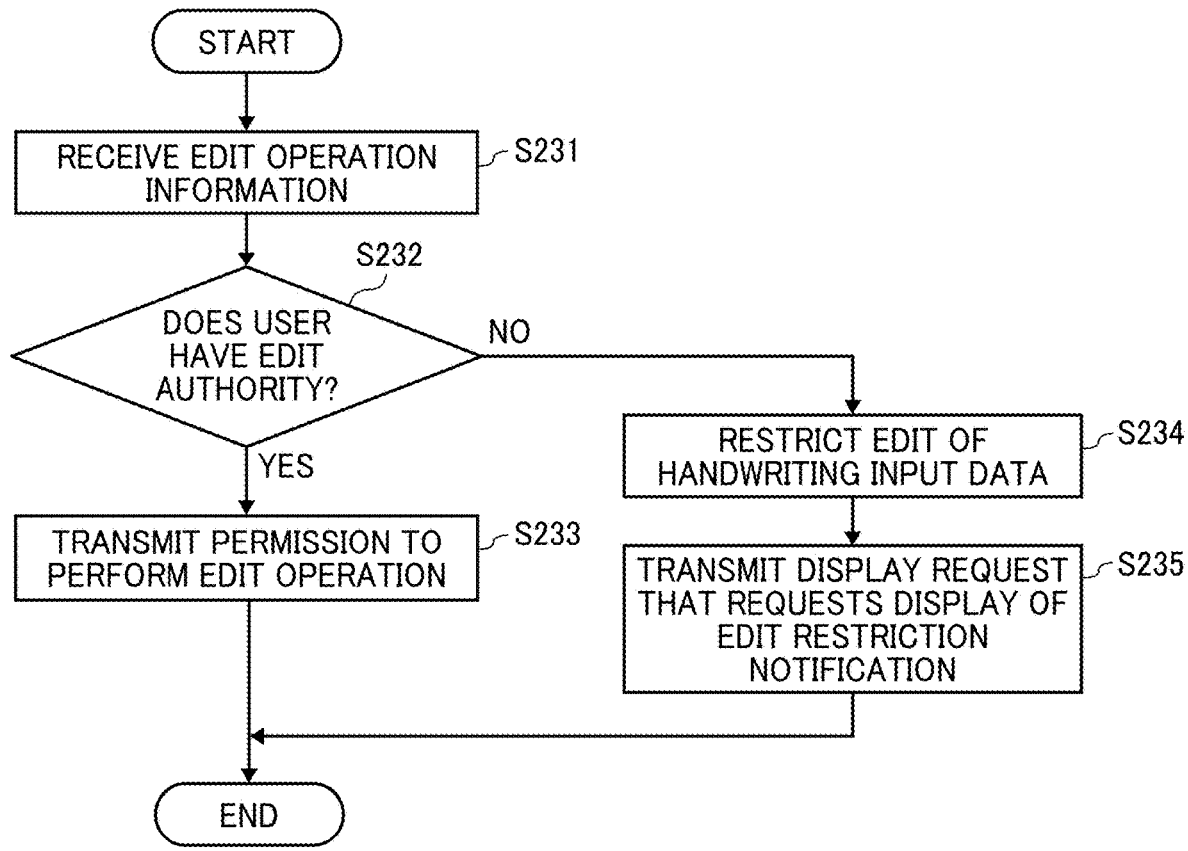
FIG. 44 is a flowchart illustrating an example of an operation of restricting edit of handwriting input data that is input by another user, according to the second embodiment of the present disclosure.

Request for Editing Handwriting Input Data:

Referring to FIG. 44, an operation of editing handwriting input data that is input by another user on a display screen according to the viewing authority of each user. FIG. 44 is a flowchart illustrating an example of an operation of restricting edit of handwriting input data that is input by another user, according to the second embodiment. A description provided with reference to FIG. 44 is of an example in which handwriting input data that is input to the display apparatus 10A2 used by the user A is edited at the display apparatus 10B used by the user B. However, such a combination of the display apparatus 10B and the display apparatus 10A2 is merely one example of the display apparatuses between which editing of handwriting input data is performed. The same or substantially the same operation is performed in any other combinations of the display apparatuses 10 used by the users participating the event.

First, the transmission/reception unit 51 of the communication management apparatus 50B receives handwriting input data transmitted by the display apparatus 10A2 (step S231). This handwriting input data is handwriting input data that is input by the user A. As illustrated in FIG. 21A of the first embodiment, the handwriting input data that is input by the user A is displayed on the display screen 10A of the display apparatus 10A2.

Next, the determination unit 57 determines whether the edit authority is assigned for the handwriting input data received in step S231 (step S232). Specifically, the determination unit 57 refers to the authority information set by the setting unit 58, to determine whether the user B has the edit authority for the user A who has input the received handwriting input data. When the determination unit 57 determines that the user B has the edit authority for the received handwriting input data (YES in step S232), the operation proceeds to step S233. Then, the transmission/reception unit 51 transmits, to the display apparatus 10C, execution permission information indicating permission to perform edit operation so that performing the edit operation on the received handwriting input data is permitted (step S233).

By contrast, when the determination unit 57 determines that the user B does not have the edit authority for the handwriting input data to be edited (NO in step S232), the operation proceeds to step S234. In step S234, the edit restriction unit 60 restricts editing of the handwriting input data to be edited. Then, the edit restriction unit 60 transmits, to the display apparatus 10B via the transmission/reception unit 51, edit restriction display request information indicating a request for displaying an edit restriction notification, the edit restriction notification indicating that editing of the handwriting input data that is input by the user A is restricted (step S235).

As described above, in response to receiving an edit operation information to handwriting input data displayed at a certain display apparatus 10, the communication management apparatus 50B determines whether the edit authority for the handwriting input data to be edited is assigned to another display apparatus 10, and transmits, to another display apparatus, the execution permission information only when the edit authority is assigned to another display apparatus. Thus, the screen sharing system 1 restricts a user who does not have edit authority from editing handwriting input data (written content), thereby preventing handwriting input data from inadvertently edited by the display apparatus 10 for which the edit authority is not set. Further, when the display apparatus 10 does not have the edit authority for the received handwriting input data, the display apparatus 10 displays the edit restriction notification on the display screen. Thus, in the second embodiment, the communication management apparatus 50B determines whether the edit authority is assigned and whether edit of the handwriting input data is to be performed. This reduces the processing load on the display apparatus 10.

Figure 45:
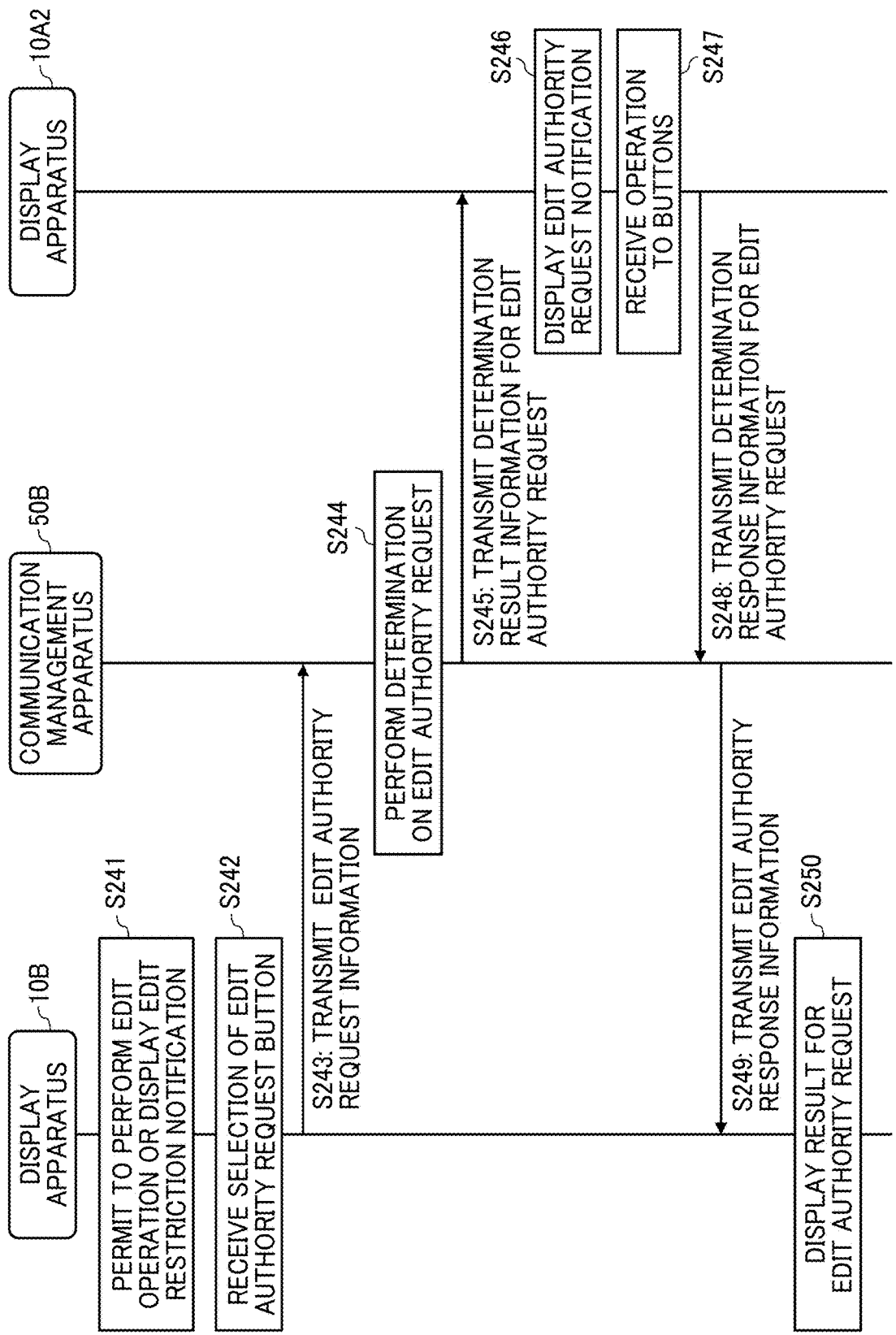
FIG. 45 is a sequence diagram illustrating an example of an operation of requesting edit authority to another user, according to the second embodiment of the present disclosure.

Operation of Requesting Edit Authority:

Referring to FIG. 45, an operation of requesting edit authority for handwriting input data for which edit is restricted is described. FIG. 45 is a sequence diagram illustrating an example of an operation of requesting edit authority to another user, according the second embodiment. A description provided with reference to FIG. 45 is of an example in which the display apparatus 10B used by the user B who is restricted from editing handwriting input data that is input by the user A requests the display apparatus 10A2 used by the user A for edit authority. However, such a combination of the display apparatus 10B and the display apparatus 10A2 is merely one example of the display apparatuses exchanging the request for edit authority therebetween. The same or substantially the same operation is performed in any other combinations of the display apparatuses 10 used by the users participating the event.

First, the display control unit 13B of the display apparatus 10B displays information indicating that an edit operation is permitted or the edit restriction notification 660 on the display screen 100B (step S241). The edit restriction notification 660 is as illustrated in FIG. 31A.

Next, the reception unit 12B receives selection of the edit authority request button 665 included in the edit restriction notification 660 in response to an input operation by the user B (step S242). The transmission/reception unit 11B transmits, to the communication management apparatus 50B, edit authority request information indicating a request for edit authority to handwriting input data that is input the user A for which editing is restricted (step S243). This edit authority request information includes a user ID of a user as a destination user who is to receive the edit authority request information. In this case, the transmission/reception unit 11B transmits the edit authority request information including the user ID of the user A. Thereby, the transmission/reception unit 51 of the communication management apparatus 50B receives the edit authority request information transmitted by the display apparatus 10B.

Next, the determination unit 57 of the communication management apparatus 50B performs determination on the edit authority request information received in step S243

(step S244). Specifically, in response to the received edit authority request information, the determination unit 57 determines whether the user who uses the display apparatus 10B is to be permitted to edit the handwriting input data based on the attribute of the user who uses the display apparatus 10B that has transmitted the edit authority request and a content of the handwritten stroke displayed on the display apparatus 10A2. Examples of the attribute of the user who uses the display apparatus 10B include, but are not limited to, a department to which the user belongs, work in which the user is charge, and a job title of the user.

Next, the transmission/reception unit 51 of the communication management apparatus 50B transmits (transfers) determination result information indicating a result of the determination performed on the edit authority request transmitted by the display apparatus 10B to the display apparatus 10A2 used by the user A as the request destination of the edit authority request (step S245). Thereby, the transmission/reception unit 11A of the display apparatus 10A2 receives the determination result information for the edit authority request transmitted by the display apparatus 10B as a request source.

In response to receiving the determination result information for the edit authority request information in step S245, the edit authority request notification unit 22A of the display apparatus 10A2 displays the edit authority request notification 560 indicating that the edit authority is requested from the user B on the display screen 100A (step S246). Then, the reception unit 12A of the display apparatus 10A2 receives an operation to buttons (step S247).

The transmission/reception unit 11A of the display apparatus 10A2 transmits, to the communication management apparatus 50B, determination response information for the edit authority request, as a response to the determination result information for the viewing request, the determination result information being received in step S245 (step S248). Thereby, the transmission/reception unit 51 of the communication management apparatus 50B receives the determination response information for the edit authority request, the determination response information transmitted by the display apparatus 10A2. Then, the transmission/reception unit 51 transmits, to the display apparatus 10B, the edit authority response information for the edit authority request, the edit authority response information being received in step S248 (step S249). Thereby, the transmission/reception unit 11B of the display apparatus 10B receives the edit authority response information transmitted by the communication management apparatus 50B. Subsequently, the display control unit 13B of the display apparatus 10B displays a result for the edit authority request (step S250). Thus, the display apparatus 10B notifies the user B of the result for the edit authority request.

The allocation of the functions of the display apparatus 10 and the communication management apparatus 50B in the screen sharing system 1 described above in the second embodiment is merely one example. In another example, the functions can be allocated in any other suitable manner.

As described above, according to the second embodiment, the screen sharing system 1 is configured such that the communication management apparatus 50B includes various determination functions on a viewing request and an edit authority request from another display apparatus 10 (10B or 10C), such determination functions being provided in the display apparatus 10 in the first embodiment. Thus, the display apparatus 10 does not need to perform various determination processing. Accordingly, the display apparatus 10 can mainly concentrate on processing of screen display and data communication. Such a system configuration reduces a processing load on the display apparatus 10, and thus, for example, a comfortable use environment is provided to a user who uses the display apparatus 10.

Variations of Embodiment:

Referring to FIG. 46 to FIG. 50, a variation of the screen sharing system according to an embodiment is described. In the variation, the same reference numbers are allocated to elements (members or components) having the same function as those of the above-described embodiments, and redundant description thereof is omitted below. The screen sharing system 1 according to the variation is an example of a system in which a sharing area shared and displayed by the plurality of display apparatuses 10 includes multiple pages.

Figure 46:
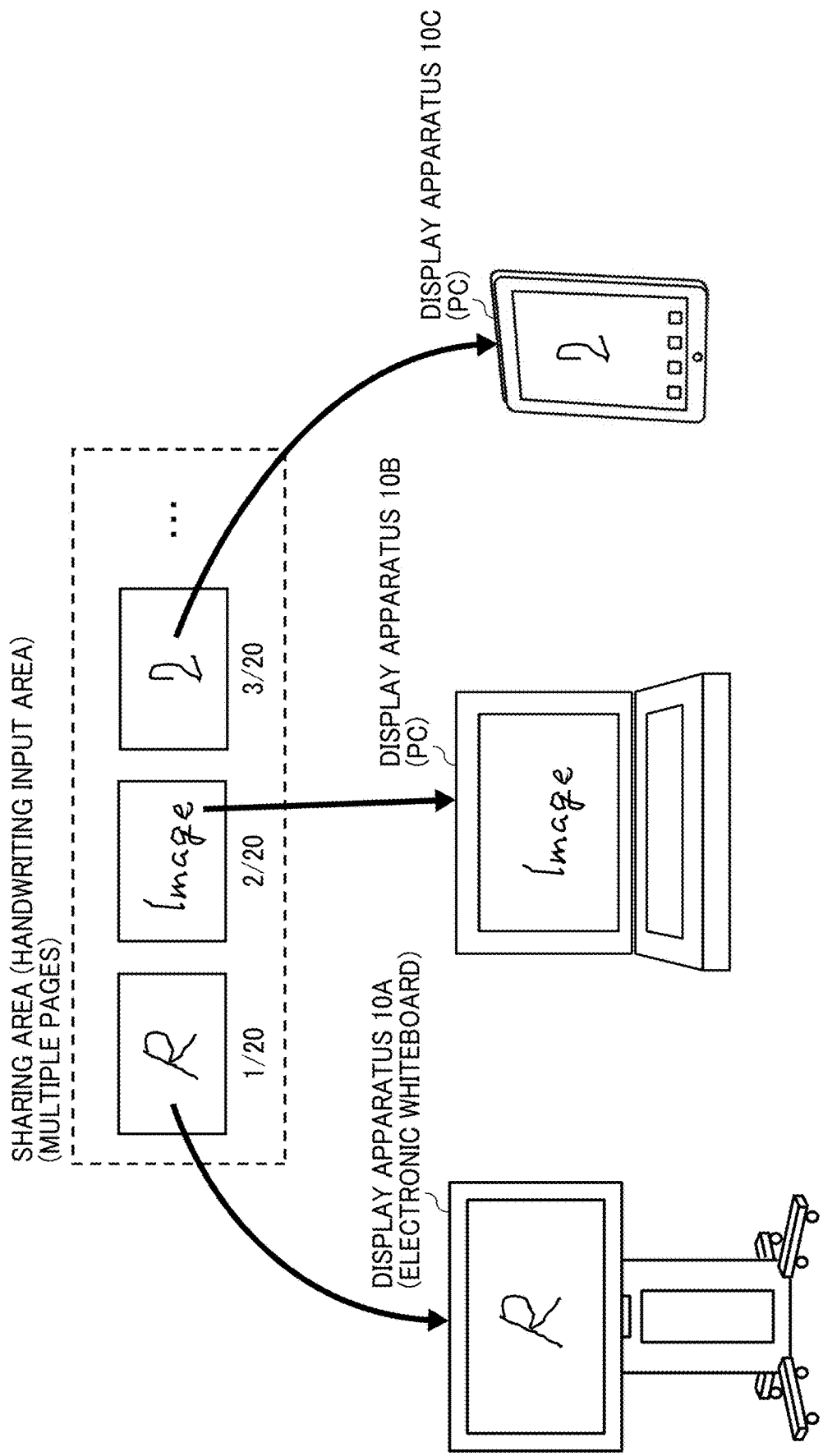
FIG. 46 is a schematic diagram illustrating an example of how a sharing area is displayed at a plurality of display apparatuses, according to a variation of the embodiments of the present disclosure.

FIG. 46 is a schematic diagram illustrating an example of how the sharing area is displayed at the display apparatuses 10 according to the variation of the embodiments. In FIG. 46, the display apparatus 10A, the display apparatus 10B, and the display apparatus 10C share the sharing area divided into multiple pages, to conduct an event such as a teleconference. Each of the display apparatus 10A, the display apparatus 10B, and the display apparatus 10C displays a desired page among the multiple pages included in the sharing area on the display screen. Further, since the display apparatus 10A, the display apparatus 10B, and the 10C display different pages respectively, the users can view desired pages respectively during the event. For example, each page of the multiple pages included in the sharing area is an area having the same size as that of the display screen of the display apparatus 10. In another example, each page is an expandable area in which handwriting can be input without any size restrictions as in the above-described embodiments.

Figure 47:
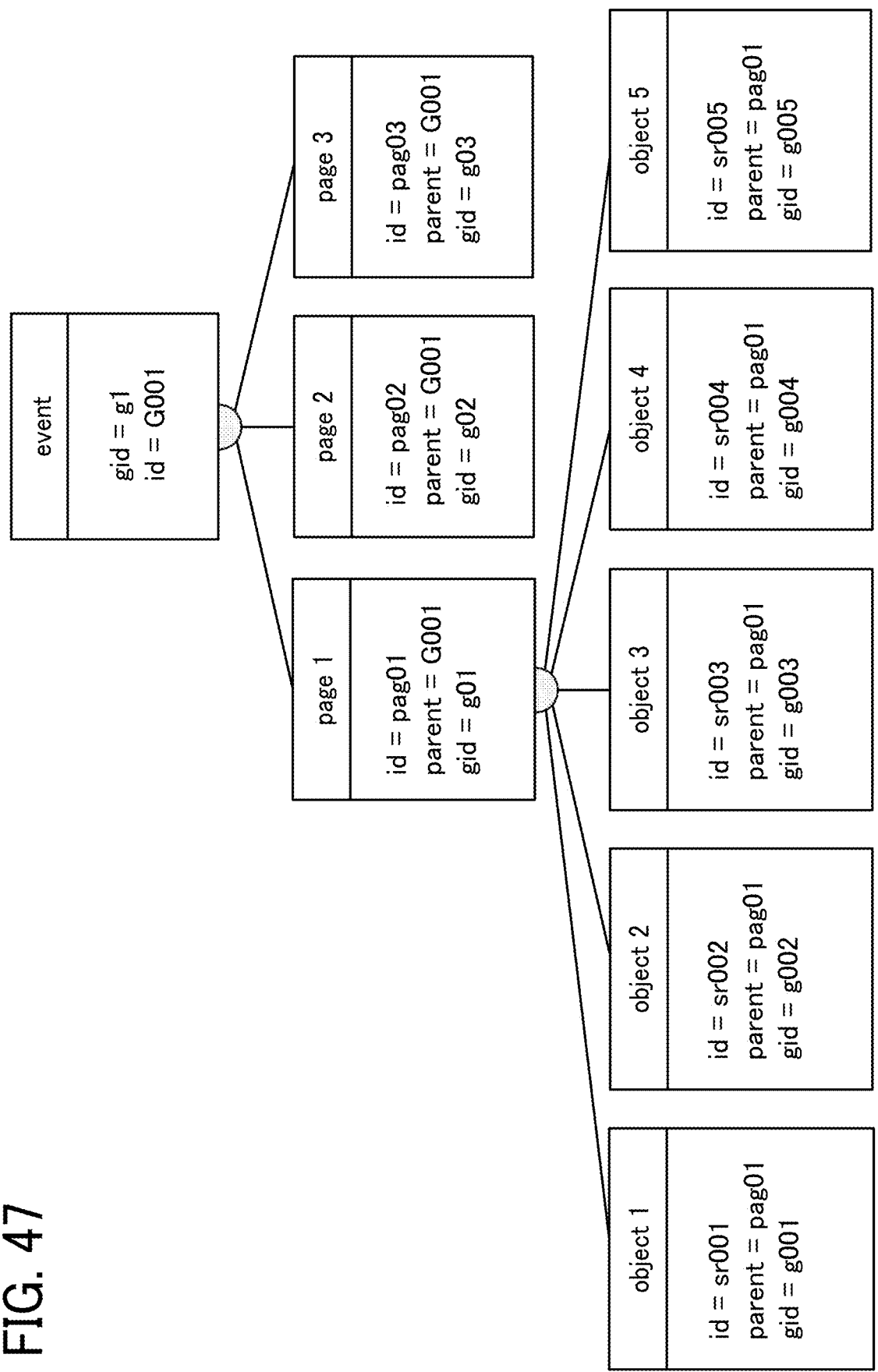
FIG. 47 is a diagram schematically illustrating an example of display screen information, according to a variation of the embodiments of the present disclosure.

FIG. 47 is a diagram schematically illustrating an example of display screen information according to the variation of the embodiments. FIG. 47 illustrates an example of a state of a display screen displayed on the display apparatus 10. In the example of FIG. 47, the display screen has a hierarchical structure of "event", "page (page 1 to page 3)", and "object (object 1 to object 5)". The "Object" corresponds to handwriting input data, and is managed for each "page". The "Page" represents a one-page image displayed on the display screen. Further, the "event" indicates information of an event executed by the display apparatus 10. For example, Object 1 includes an object ID (id=sr001) identifying Object 1, information (parent=pag01) identifying Page 1 in which Object 1 is present, and a global id (gid) "g001" of Object 1. For example, when an operation such as movement is performed on an image represented by Object 1, the object ID (id=sr001) is unchanged, while the gid "g001" of Object 1 is updated.

The display apparatus 10 can switch from one page to other page, and the "page" corresponds to each page of screens displayed at the display apparatus 10. For example, Page 1 includes a page ID (id=pag01) identifying Page 1, information (parent=G001) identifying an "event" executed at the display apparatus 10, and gid "g01" of Page 1. The "event" corresponds to an event executed by the display apparatus 10, and is managed by an event ID (id=G001) identifying the event and the gid "g1" of the event. The gid in each layer is assigned by the communication management apparatus 50A or the communication management apparatus 50B when the screen data is shared with other display apparatuses 10. Further, the hierarchical structure of the display screen information illustrated in FIG. 47 is shared between the plurality of display apparatuses 10 when screen data is shared.

FIG. 48 is a view of an example of a metadata file according to the variation of the embodiments. The metadata file 500a illustrated in FIG. 48 is stored in the storage unit 5000 of the communication management apparatus 50A or the communication management apparatus 50B, in substantially the same manner as the metadata file 500 illustrated in FIG. 11. Compared with the metadata file 500 illustrated in FIG. 11, the metadata file 500a includes, as the area information indicated in the display area ("ViewArea") for each user, information of a page number ("Page") in addition to the coordinate position ("X", "Y") and the size ("Width", "Height") of the display area.

Figure 49:
FIG. 49 is a view of an example of an object data file, according to a variation of the embodiments of the present disclosure.

FIG. 49 is a view of an example of a handwriting input data file 550a according to the variation of the embodiments. The handwriting input data file 550a illustrated in FIG. 49 is stored in the storage unit 5000 of the communication management apparatus 50A or the communication management apparatus 50B, in substantially the same manner as the handwriting input data file 550 illustrated in FIG. 12. Compared with the handwriting input data file 550 illustrated in FIG. 12, the handwriting input data file 550a includes information of a page number ("Page") on which an object is input as the detailed data information ("Data") indicated in the object data ("Objects").

FIG. 50 is a conceptual diagram illustrating an example of a screen information management table, according to the variation of the embodiments. In the storage unit 5000 of the communication management apparatus 50A or the communication management apparatus 50B, a screen information management DB is stored, for example, in the form of the screen information management table as illustrated in FIG. 50. The screen information management table stores and manages, for each event ID identifying an event executed by each of the display apparatuses 10, various data relating to a display screen shared by the display apparatuses 10. Data indicated in the screen information management table corresponds to the state of the display screen (see FIG. 47) described as the display screen information in the display apparatus 10.

For example, the data indicated in the screen information management table includes an ID for identifying each data, a sequence number indicating an order determined by time when each data was generated, information ("body") indicating the content of each data, and information ("parent") for identifying a parent of each data. The screen information management table includes, for example, an event ID for identifying an event being conducted and information ("children") indicating a page generated in the event. Further, for example, for page data, the screen information management table includes a page ID for identifying a page (page data) and information (parent) for identifying an event as a parent.

Furthermore, for example, for object data, the screen information management table includes an object ID for identifying object data generated in an event, information indicating a content of the object data, and information (parent) for identifying a parent page (page data). In this case, the information (body) indicating the content of the object data includes the color of the input object, the width indicating the thickness of the line of the input object, the vertices (x, y) of the input object, and information on a user who has input the object. The color of the object is represented in a data format of RGBA (Red Green Blue Alpha), and each element is represented by a numerical value of 0 to 255. The width of the thickness of the line of the object is represented by the number of pixels. The vertices of the object are represented by X-Y coordinates. A Bezier curve obtained from the vertices forms a line segment indicating the object.

As described above, the screen sharing system 1 according to the variation can conduct an event using multiple display apparatuses 10 even when the sharing area includes multiple pages.

As described above, the screen sharing system 1 according to an embodiment of the present disclosure shares a handwriting input screen between a first display apparatus (e.g., the display apparatus 10A) used by a first user (e.g., the user A) and a second display apparatus (e.g., the display apparatus 10B or the display apparatus 10C) used by a second user (e.g., the user B or the user C). The first display apparatus sets edit authority of a second user for first handwriting input data that is input by the first user, and the second display apparatus restricts edit of the first handwriting input data based on the edit authority set by the first display apparatus. Thus, the screen sharing system 1 can set the edit authority of the user for the handwriting input data on a user-by-user basis.

Further, in the screen sharing system according to an embodiment of the present disclosure, a first display apparatus (e.g., a display apparatus 10A) used by a first user (e.g., a user A) sets viewing authority of a second user (e.g., a user B or a user C) for a first handwriting input data that is input by the first user, and a second display apparatus (e.g., the display apparatus 10B or the display apparatus 10C) used by the second user displays the first handwriting input data based on the viewing authority set by the first display apparatus. Thus, the screen sharing system 1 can set the viewing authority of the user for the handwriting input data on a user-by-user basis.

Furthermore, in the screen sharing system according to an embodiment of the present disclosure, a first display apparatus (e.g., the display apparatus 10A) used by a first user (e.g., the user A) sets edit authority of the first user for second handwriting input data that is input by a second user (e.g., the user B or the user C) and restricts edit of the second handwriting input data based on the set edit authority when the first user does not have the edit authority for the second handwriting input data. Thus, the screen sharing system 1 can set the edit authority for editing handwriting input data the input by another user in addition to the authority of another user for handwriting input data that is input by the user himself/herself. This prevents the user from inadvertently editing written content by another user.

According to the method of the related art, authority for editing handwriting input data that is input to a shared handwriting input screen cannot be set for each of multiple users.

According to an embodiment of the present disclosure, authority for editing handwriting input data is set for each user.

According to one or more embodiments, a screen sharing system includes a first display apparatus used by a first user, and a second display apparatus used by a second user. The first display apparatus and the second display apparatus share a handwriting input screen. The first display apparatus includes first circuitry to set an edit authority of the second user for first handwriting input data that is input by the first user. The second display apparatus includes second circuitry to restrict edit of the first handwriting input data based on the edit authority set by the first display apparatus.

In the above screen sharing system, the first circuitry of the first display apparatus sets an edit authority of the first user for second handwriting input data that is input by the second user, and restricts edit of the second handwriting input data based on the edit authority that is set, when the first user does not have the edit authority for the second handwriting input data.

In the above screen sharing system, the first circuitry of the first display apparatus displays a first layer including writing by the first user and a second layer including writing by the second user as superimposed one on the other, and restricts edit on the second layer when the first user does not have the edit authority on the writing by the second user.

In the above screen sharing system, when the first user does not have the edit authority for the second handwriting input data, the first circuitry of the first display apparatus displays a second edit restriction notification indicating that the edit on the second layer is restricted.

In the above screen sharing system, the first circuitry of the first display apparatus changes the edit authority for the second handwriting input data according to an input to the displayed second edit restriction notification.

In the above screen sharing system, the first circuitry of the first display apparatus displays an authority change recommendation notification recommending a change of a setting of the edit authority when the first handwriting input data and the second handwriting input data overlap each other.

In the above screen sharing system, the first circuitry of the first display apparatus changes the setting of the edit authority for the second handwriting input data according to an input to the displayed authority change recommendation notification.

In the above screen sharing system, the first circuitry of the first display apparatus selects handwriting input data to be edited from the first handwriting input data and the second handwriting input data for each of the first user and the second user who input the first handwriting input data and the second input data respectively.

In the above screen sharing system, the first circuitry of the first display apparatus detects a writing pressure of an input to the handwriting input screen, and switches handwriting input data to be edited from the between the first handwriting input data and the second handwriting input data based on the detected writing pressure.

According to one or more embodiments, a display control method is provided that is performed by a display apparatus that shares a handwriting input screen with another display apparatus used by another user. The display control method includes receiving authority information indicating an edit authority for handwriting input data input by said another user. The method includes restricting edit of the handwriting input data based on the received authority information.

According to one or more embodiments, a non-transitory computer-executable medium storing a program storing instructions is provided, which, when executed by a processor of a display apparatus that shares a handwriting input screen with another display apparatus used by another user, causes the display apparatus to perform a method. The method includes receiving authority information indicating an edit authority for handwriting input data input by said another user. The method includes restricting edit of the handwriting input data based on the received authority information.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), a system on a chip (SOC), a graphics processing unit (GPU), and conventional circuit components arranged to perform the recited functions.

Each of the tables of the above-described embodiments may be generated by learning effect of machine learning. In addition, in alternative to using the tables, the data of each related item may be classified by the machine learning. In the present disclosure, the machine learning is defined as a technology that makes a computer to acquire human-like learning ability. In addition, the machine learning refers to a technology in which a computer autonomously generates an algorithm required for determination such as data identification from learning data loaded in advance and applies the generated algorithm to new data to make a prediction. Any suitable learning method is applied for the machine learning, for example, any one of supervised learning, unsupervised learning, semi-supervised learning, reinforcement learning, and deep learning, or a combination of two or more of these learning.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The invention claimed is:

1. A screen sharing system comprising:
a first display apparatus including first circuitry; and
a second display apparatus including second circuitry, wherein
both of the first display apparatus and the second display apparatus display an input screen,
the first circuitry of the first display apparatus is configured to
receive first hand drafted input data that is input to the first display apparatus, and
set an edit authority, of a user of the second display apparatus, for the first hand drafted input data, and
the second circuitry of the second display apparatus is configured to restrict editing of the first hand drafted input data based on the edit authority of the user set by the first display apparatus.

2. The screen sharing system of claim 1, wherein
the first circuitry of the first display apparatus transmits authority information, indicating the edit authority that is set for the user, to the second display apparatus, and
the second circuitry of the second display apparatus restricts the editing of the first hand drafted input data based on the authority information transmitted by the first display apparatus.

3. The screen sharing system of claim 1, wherein the first circuitry of the first display apparatus sets the edit authority according to an input to a setting screen that accepts an input of setting of the edit authority on a user-by-user basis.

4. The screen sharing system of claim 1, wherein the second circuitry of the second display apparatus restricts the editing of the first hand drafted input data in a case that the user does not have the edit authority for the first hand drafted input data.

5. The screen sharing system of claim 1, wherein in a case that the user does not have edit authority for the first hand drafted input data, the second circuitry of the second display apparatus is further configured to control a display to display an edit restriction notification indicating that the user does not have the edit authority.

6. The screen sharing system of claim 5, wherein the second circuitry of the second display apparatus is further configured to
receive an edit authority request for the first hand drafted input data according to an input to the displayed edit restriction notification, and
transmit the edit authority request for the first hand drafted input data to the first display apparatus.

7. The screen sharing system of claim 6, wherein the first circuitry of the first display apparatus is further configured to control a display to display an edit authority request notification indicating that the second display apparatus transmits the edit authority request.

8. The screen sharing system of claim 7, wherein the first circuitry of the first display apparatus is further configured to change the edit authority of the user according to an input to the displayed edit authority request notification.

9. The screen sharing system of claim 1, wherein
the first circuitry of the first display apparatus sets a viewing authority of the user for the first hand drafted input data, and
the second circuitry of the second display apparatus is further configured to control a display to display the first hand drafted input data based on the viewing authority set by the first display apparatus.

10. The screen sharing system of claim 9, wherein the second circuitry of the second display apparatus controls the display to display the first hand drafted input data in a case that the user has the viewing authority for the first hand drafted input data.

11. The screen sharing system of claim 9, wherein the second circuitry of the second display apparatus is further configured to control the display to display a viewing restriction notification indicating that viewing of the first hand drafted input data is restricted in a case that the user does not have the viewing authority for the first hand drafted input data.

12. The screen sharing system of claim 11, wherein the second circuitry of the second display apparatus is further configured to
receive a viewing request for the first hand drafted input data according to an input to the displayed viewing restriction notification, and
transmit the viewing request for the first hand drafted input data to the first display apparatus.

13. The screen sharing system of claim 12, wherein the first circuitry of the first display apparatus is further configured to control a display to display a viewing request notification indicating that the second display apparatus transmits the viewing request.

14. The screen sharing system of claim 13, wherein the first circuitry of the first display apparatus changes the viewing authority of the user according to an input to the displayed viewing request notification.

15. The screen sharing system of claim 9, wherein the first circuitry of the first display apparatus is further configured to control the display to display a non-sharing notification indicating that the first hand drafted input data is not shared by the user in a case that the user does not have the viewing authority for the first hand drafted input data.

16. The screen sharing system of claim 1, wherein
the first display apparatus is used by a first user, and
the first circuitry of the first display apparatus is further configured to
set a first edit authority of the first user for second hand drafted input data that is input to the second display apparatus, and
restrict editing of the second hand drafted input data based on the first edit authority in a case that the first user does not have authority to edit the second hand drafted input data.

17. The screen sharing system of claim 16, wherein the first circuitry of the first display apparatus is further configured to
control a display to display a first layer including input of the first user and a second layer including input of the user as superimposed one on the other, and
restrict editing of the second layer in a case that the first user does not have authority to edit the input of the user.

18. The screen sharing system of claim 16, wherein the first circuitry of the first display apparatus is further configured to control a display to display an authority change recommendation notification recommending a change of a setting of the first edit authority in a case that the first hand drafted input data and the second hand drafted input data overlap each other.

19. A screen sharing method performed by a screen sharing system including a first display apparatus and a second display apparatus, both of the first display apparatus and the second display apparatus displaying an input screen, the screen sharing method comprising:
receiving, by the first display apparatus, first hand drafted input data that is input to the first display apparatus;
setting, by the first display apparatus, an edit authority of a user of the second display apparatus for first hand drafted input data; and
restricting, by the second display apparatus, editing of the first hand drafted input data based on the edit authority of the user set by the first display apparatus.

20. A display apparatus, comprising:
a display that displays an input screen which is displayed by another display apparatus; and
circuitry configured to:
receive authority information from the another display apparatus, the authority information indicating an edit authority of a user of the display apparatus for editing hand drafted input data input to the another display apparatus; and
restrict editing of the hand drafted input data by the user based on the received authority information.

* * * * *